United States Patent [19]

Fuhrmann

[11] Patent Number: 5,745,837
[45] Date of Patent: Apr. 28, 1998

[54] APPARATUS AND METHOD FOR DIGITAL DATA TRANSMISSION OVER A CATV SYSTEM USING AN ATM TRANSPORT PROTOCOL AND SCDMA

[75] Inventor: Amir Michael Fuhrmann, Santa Clara, Calif.

[73] Assignee: Terayon Corporation, Santa Clara, Calif.

[21] Appl. No.: 616,071

[22] Filed: Mar. 14, 1996

Related U.S. Application Data

[63] Continuation-in-part of Ser. No. 588,650, Jan. 19, 1996, which is a continuation-in-part of Ser. No. 519,630, Aug. 25, 1995.

[51] Int. Cl.$^6$ .................................................. H04N 7/173
[52] U.S. Cl. .......................... 455/5.1; 348/7; 348/12; 348/13
[58] Field of Search .......................... 348/6, 7, 13, 14, 348/15, 16, 17, 12; 455/3.1, 4.1, 4.2, 6.1, 6.2, 6.3; 375/395, 396, 397, 398, 399, 905, 369, 370; 395/200.01, 200.02, 200.03, 200.04, 200.05, 200.06, 200.1, 200.09, 200.11, 200.12–200.18

[56] References Cited

U.S. PATENT DOCUMENTS

| 4,460,992 | 7/1984 | Gutleber | 370/19 |
| 4,470,138 | 9/1984 | Gutleber | 370/18 |
| 4,475,208 | 10/1984 | Ricketts | 375/1 |
| 4,553,161 | 11/1985 | Citta | 358/86 |
| 4,554,579 | 11/1985 | Citta | 358/86 |
| 4,635,274 | 1/1987 | Kubota | 375/1 |
| 4,688,210 | 8/1987 | Eizenhofer et al. | 370/335 |
| 4,723,164 | 2/1988 | Nienaber | 358/148 |
| 4,748,681 | 5/1988 | Schmidt | 455/33 |
| 4,757,460 | 7/1988 | Bione et al. | 364/514 |
| 4,773,066 | 9/1988 | Kirkman | 370/85 |
| 4,811,365 | 3/1989 | Manno | 375/107 |

(List continued on next page.)

FOREIGN PATENT DOCUMENTS

| PCT/US95/ 04329 | 10/1995 | WIPO . |
| PCT/US95/ 10899 | 3/1996 | WIPO . |

*Primary Examiner*—John K. Peng
*Assistant Examiner*—Nathan J. Flynn
*Attorney, Agent, or Firm*—Ron Fish; Falk & Fish LLP

[57] ABSTRACT

A method and apparatus for carrying an ATM communication protocol on a hybrid fiber coax CATV system. Point to point communication is supported by use of synchronous code division multiplexing on the physical and by assigning on the MAC layer one or more orthogonal SCDMA codes exclusively for use by pairs of devices needing to communicate such the head end and any customer premises equipment. Quality of service or guaranteed bandwidth availability is implemented by controlling the code space at the MAC layer such that certain CPEs having in use peripherals which cannot tolerate interruptions in data flow may reserve one or more SCDMA codes for use exclusively by them. Standard ATM cells are modified by the addition of a two byte virtual link header which identifies to which CPE a particular ATM packet is destined. This virtual header also makes possible broadcast and multicast of packets from the head end to all CPEs. Each byte in each ATM cell has 8 bits of data and a 9th bit which is encoded with to indicate where the ATM cell starts and includes CRC data for error detection and correction. Bandwidth is allocated by the head end computer which executes algorithms on the MAC layer to collect actual bandwidth usage information and requests for bandwidth and prioritize them in accordance with the channel allocation/reservation scheme currently use. The channel allocation/reservation scheme can be changed on the fly and reallocation calculations to adjust bandwidth allocations are calculated every 10 milliseconds and the new allocations are distributed in downstream messages which are transmitted to all CPEs.

3 Claims, 40 Drawing Sheets

U.S. PATENT DOCUMENTS

| | | | |
|---|---|---|---|
| 4,912,721 | 3/1990 | Pidgeon, Jr. et al. | 375/1 |
| 4,926,130 | 5/1990 | Weaver | 328/14 |
| 4,933,930 | 6/1990 | Lien et al. | 370/18 |
| 5,090,024 | 2/1992 | Vander Mey et al. | 375/1 |
| 5,193,094 | 3/1993 | Viterbi | 371/43 |
| 5,224,122 | 6/1993 | Bruckert | 375/1 |
| 5,231,664 | 7/1993 | Bestler et al. | 380/20 |
| 5,233,630 | 8/1993 | Wolf | 375/67 |
| 5,235,615 | 8/1993 | Omura | 375/1 |
| 5,235,619 | 8/1993 | Beyers, II et al. | |
| 5,239,557 | 8/1993 | Dent | 371/1 |
| 5,280,472 | 1/1994 | Gilhousen et al. | 370/18 |
| 5,295,154 | 3/1994 | Gudmundson et al. | 375/1 |
| 5,297,162 | 3/1994 | Lee et al. | 375/1 |
| 5,305,308 | 4/1994 | English et al. | 370/32.1 |
| 5,309,474 | 5/1994 | Gilhousen et al. | 375/1 |
| 5,313,454 | 5/1994 | Bustini et al. | 370/13 |
| 5,319,634 | 6/1994 | Bartholomew et al. | 370/18 |
| 5,325,394 | 6/1994 | Bruckert | 375/1 |
| 5,327,455 | 7/1994 | De Gaudenzi et al. | 375/1 |
| 5,345,439 | 9/1994 | Marston | 370/18 |
| 5,345,472 | 9/1994 | Lee | 375/1 |
| 5,347,304 | 9/1994 | Moura et al. | 348/12 |
| 5,353,300 | 10/1994 | Lee et al. | 375/1 |
| 5,359,624 | 10/1994 | Lee et al. | 375/1 |
| 5,363,403 | 11/1994 | Schilling et al. | 375/1 |
| 5,363,404 | 11/1994 | Kotzin et al. | 370/352 |
| 5,373,502 | 12/1994 | Turban | 370/18 |
| 5,390,166 | 2/1995 | Rohani et al. | 370/335 |
| 5,394,391 | 2/1995 | Chen et al. | 370/18 |
| 5,398,258 | 3/1995 | Su et al. | 375/200 |
| 5,404,570 | 4/1995 | Charas et al. | 455/22 |
| 5,414,699 | 5/1995 | Lee | 370/18 |
| 5,416,797 | 5/1995 | Gilhousen et al. | 375/705 |
| 5,418,813 | 5/1995 | Schaffner et al. | 375/205 |
| 5,425,027 | 6/1995 | Baran | 370/69.1 |
| 5,440,585 | 8/1995 | Partridge, III | 375/261 |
| 5,442,625 | 8/1995 | Gitlin et al. | 370/18 |
| 5,442,627 | 8/1995 | Viterbi et al. | 370/22 |
| 5,442,662 | 8/1995 | Fukasawa et al. | 375/205 |
| 5,442,700 | 8/1995 | Snell et al. | 348/10 X |
| 5,448,555 | 9/1995 | Bremer et al. | 370/20 |
| 5,452,328 | 9/1995 | Rice | 375/210 |
| 5,463,660 | 10/1995 | Fukasawa et al. | 375/205 |
| 5,467,342 | 11/1995 | Logston et al. | 370/17 |
| 5,481,533 | 1/1996 | Honig et al. | 375/206 |
| 5,511,067 | 4/1996 | Miller | 370/18 |
| 5,533,013 | 7/1996 | Leppanen | 370/206 |
| 5,539,730 | 7/1996 | Dent | 370/320 |
| 5,557,316 | 9/1996 | Hoarty et al. | 348/7 |

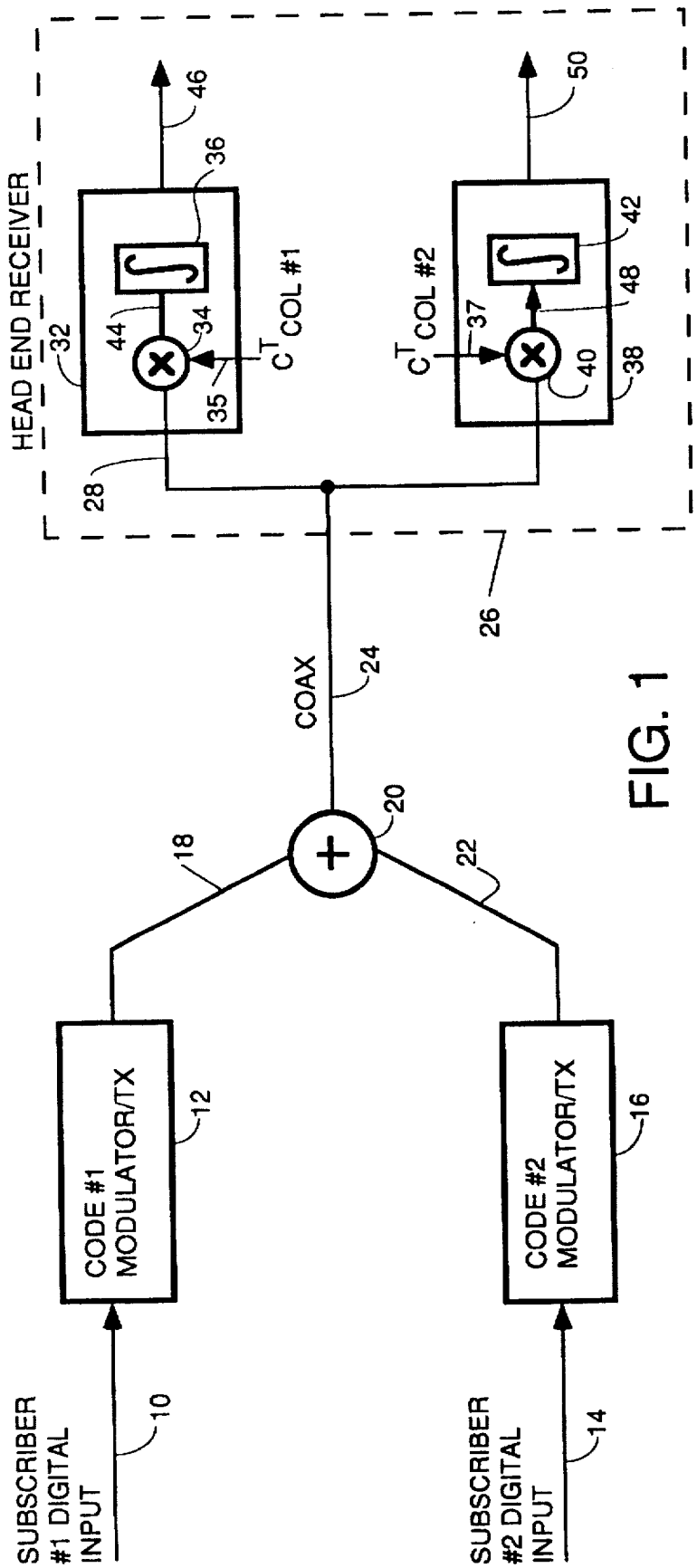

CODE 1 = [1, 1]
CODE 2 = [1, -1]

FIG. 3B

$$C = \begin{bmatrix} \overbrace{\begin{bmatrix} \frac{1}{\sqrt{2}} \\ \frac{1}{\sqrt{2}} \end{bmatrix}}^{\text{CODE \#1}} & \overbrace{\begin{bmatrix} \frac{1}{\sqrt{2}} \\ -\frac{1}{\sqrt{2}} \end{bmatrix}}^{\text{CODE \#2}} \end{bmatrix}$$

FIG. 3C

USER 1 FIRST FRAME DATA = 1

USER 2 FIRST FRAME DATA = -1

FIG. 3D

INFORMATION VECTOR FOR FIRST FRAME = $\beta$ = [1, -1]

FIG. 3E

COMBINED SIGNAL TO TRANSMIT DURING FIRST FRAME $$R = B \cdot C = \begin{matrix} B \\ [1, -1] \end{matrix} \begin{matrix} C \\ \begin{bmatrix} \frac{1}{\sqrt{2}} & \frac{1}{\sqrt{2}} \\ \frac{1}{\sqrt{2}} & \frac{-1}{\sqrt{2}} \end{bmatrix} \end{matrix}$$

$$= \left[ \left( \frac{1}{\sqrt{2}} + \frac{-1}{\sqrt{2}} \right), \left( \frac{1}{\sqrt{2}} + \frac{1}{\sqrt{2}} \right) \right] = R$$

$$= \left[ 0, \frac{2}{\sqrt{2}} \right] = R$$

TRANSMIT SIDE MATRIX MULTIPLICATION

FIG. 3F $$R \cdot C^T = \begin{matrix} R \\ \left[ 0, \frac{2}{\sqrt{2}} \right] \end{matrix} \cdot \begin{matrix} C^T \\ \begin{bmatrix} \frac{1}{\sqrt{2}} & \frac{1}{\sqrt{2}} \\ \frac{1}{\sqrt{2}} & \frac{-1}{\sqrt{2}} \end{bmatrix} \end{matrix} = \left[ \left( 0 + \frac{2}{2} \right) \left( 0 + \frac{-2}{2} \right) \right]$$

$$= [1, -1]$$

RECOVERED [B] AT RECEIVER = [1, -1]

FIG. 3G

GENERAL RANGING PROCESS

DEAD RECKONING RE-SYNC

PRECURSOR EMBODIMENT

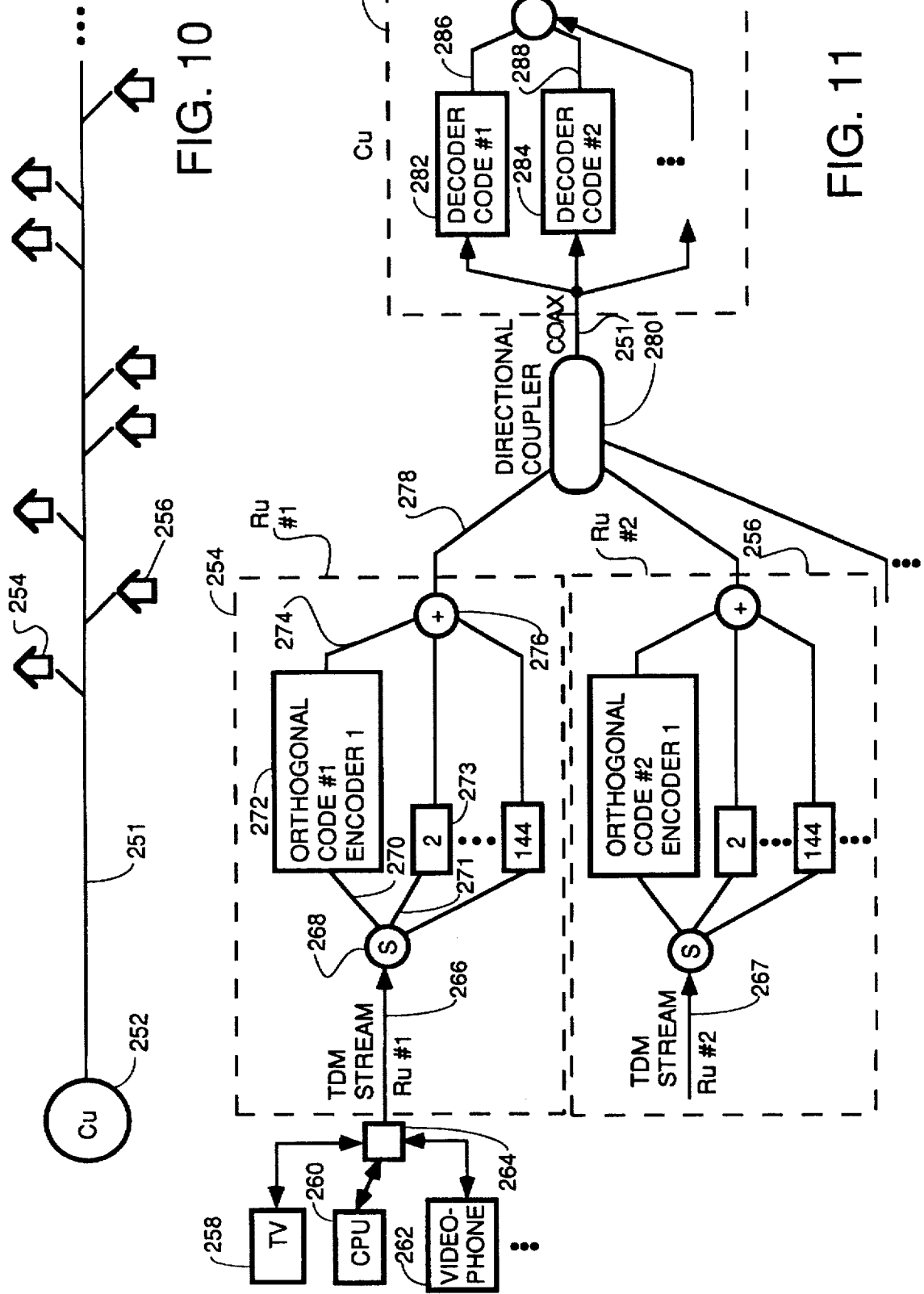

| CODE | INPHASE | QUADRATURE | |
|---|---|---|---|
| 0000 | 111 | 111 | = -1 - j |
| 0001 | 001 | 111 | = 1 - j |
| 0010 | 001 | 001 | = 1 + j |
| 0011 | 111 | 001 | = -1 + j |
| 0100 | 011 | 111 | = 3 - j |
| 0101 | 001 | 011 | = 1 + 3*j |
| 0110 | 101 | 001 | = -3 + j |
| 0111 | 111 | 101 | = -1 - 3*j |
| 1000 | 011 | 011 | =+3 + 3*j |
| 1001 | 101 | 011 | = -3 + 3*j |
| 1010 | 101 | 101 | = -3 - 3*j |
| 1011 | 011 | 101 | = 3 - 3*j |
| 1100 | 111 | 011 | = -1 + 3*j |
| 1101 | 101 | 111 | = -3 - j |
| 1110 | 001 | 101 | = 1 - 3*j |
| 1111 | 011 | 001 | = 3 + j |

REAL PART OF INFO VECTOR [b] FOR FIRST SYMBOL

REAL PART OF RESULT VECTOR $$405 \begin{bmatrix} +3 \\ -1 \\ -1 \\ +3 \end{bmatrix} \cdot \begin{bmatrix} 1 & 1 & 1 & 1 \\ -1 & -1 & 1 & 1 \\ -1 & 1 & -1 & 1 \\ -1 & 1 & 1 & -1 \end{bmatrix}_{407} = \begin{bmatrix} 4 \\ 0 \\ 0 \\ -8 \end{bmatrix} 409$$

$$[b_{REAL}] \times [CODE\ MATRIX] = [R_{REAL}] = \text{"CHIPS OUT" ARRAY-REAL}$$

FIG. 23

INFORMATION
VECTOR [B]
FOR EACH
SYMBOL

ORTHOGONAL
CODE MATRIX $$483 \sim \begin{bmatrix} 0\ 1\ 1\ 0 \\ 1\ 1\ 1\ 1 \\ 1\ 1\ 0\ 1 \\ 0\ 1\ 0\ 0 \\ \vdots \end{bmatrix} \times \begin{bmatrix} c_{1,1} & c_{1,2} & \cdots & c_{1,144} \\ c_{2,1} & c_{2,2} & \cdots & c_{2,144} \\ \vdots & \vdots & & \vdots \end{bmatrix}$$

REAL PART OF INFO VECTOR [b] FOR FIRST SYMBOL

REAL PART OF RESULT VECTOR $$405 \sim \begin{bmatrix} +3 \\ -1 \\ -1 \\ +3 \end{bmatrix} \cdot \begin{bmatrix} 1\ \ 1\ \ 1\ \ 1 \\ -1\ -1\ \ 1\ \ 1 \\ -1\ \ 1\ -1\ \ 1 \\ -1\ \ 1\ \ 1\ -1 \end{bmatrix} = \begin{bmatrix} 4 \\ 0 \\ 0 \\ -8 \end{bmatrix} \sim 409$$

407

$$[b_{REAL}] \times [\text{CODE MATRIX}] = [R_{REAL}] = \text{"CHIPS OUT" ARRAY-REAL}$$

FIG. 23B

PHY UPSTREAM MULTIPLE ACCESS ARCHITECTURE

PHY INITIALIZATION SEQUENCE

MULTIPLEXER/DEMULTIPLEXER

DATA FRAMER PROCESS

CELL OUTPUT CONTROLLER PROCESS

APPARATUS AND METHOD FOR DIGITAL DATA TRANSMISSION OVER A CATV SYSTEM USING AN ATM TRANSPORT PROTOCOL AND SCDMA

This is a continuation-in-part of a United States Patent Application entitled, "APPARATUS AND METHOD FOR DIGITAL DATA TRANSMISSION OVER VIDEO CABLE USING RTHOGONAL CYCLIC CODES", Ser. No. 08/588,650, Filed Jan. 19, 1996, which was a continuation-in-part of a United States Patent Application entitled, "APPARATUS AND METHOD FOR DIGITAL DATA TRANSMISSION OVER VIDEO CABLE USING ORTHOGONAL CYCLIC CODES", Ser. No. 08/519,630, Filed Aug. 25, 1995, both of which are hereby corporated by reference.

FIELD OF THE INVENTION

The invention pertains to the field of bidirectional communication of digital data over coaxial cable or other transmission media using an ATM protocol. More particularly, the invention pertains to the field of provision of multiple channels of digital data including interactive TV services, digital telephony, video teleconferencing, video on demand, internet access at 10 megabit/second or media data rates etc., all provided to home or business establishments over cable TV coax or combinations of coaxial cable, fiber optic links, microwave or satellite links or other wireless systems using synchronous CDMA multiplexing and ATM transport protocol.

BACKGROUND OF THE INVENTION

In order to provide bidirectional digital data communication over a cable TV coaxial network to multiple subscribers with multiple services available over a single coax cable (hereafter called interactive systems), several problems have to be solved. First, there is the problem of noise and interference. A second major problem, but related to the first problem, is synchronization of data transmission so that effective, error-free communication can be achieved. Cable networks typically involve a so-called head end or central unit from which video is transmitted to subscribers coupled to one or more main trunk lines from which extend numerous branch lines which may enter subscriber homes or which may couple to other branch lines. At each junction of a branch line to the trunk line or another branch line there is a directional coupler which is intended to direct transmissions from the head end to the subscribers in one direction and to direct transmissions from the subscribers back to the head end without leaking energy intended for transmission to the head end into branch lines coupled to other subscribers. In order to send digital data over video coax, a modem is necessary at both the head end and at all the subscriber locations to modulate digital data onto the coax as RF signals, and to receive RF signals carrying digital data and derive the digital data therefrom. Because RF signals are propagating along the cables, and because the couplers are not perfect, reflections occur at the directional couplers that cause noise and interference. This is because the reflections are frequently of the opposite polarity depending upon the impedance mismatch and the distances involved. These reflections are therefore sometimes additive and sometimes subtractive, thereby resulting in random variations in the amplitudes of the RF signals. These random variations make discrimination during the demodulation process to derive the digital data more difficult.

Further, because the subscribers are at physically different distances from the head end, the signals from each subscriber's modem arrive at the head end at different times because of different propagation delays. Because digital data is transmitted in frames and because all subscribers must be synchronized to the same frame timing, these different propagation delays for each subscriber cause problems in synchronizing data.

In the typical interactive system, there are bidirectional amplifiers. Each amplifier has two channels, one of which amplifies signals in a high frequency range from 45–750 mHz for transmission of data from the head end to subscribers, and the other of which amplifies signals in a low frequency range from 5–42 mHz for transmission of data from the subscribers to the head end.

Interactive systems typically involve in excess of one hundred different channels on which separate digital data streams can flow in addition to the separate channels on which the video signals are provided for normal cable TV service. To send digital data as RF signals, very complex constellations of separate amplitude and phase combinations are used to encode the digital characters being transmitted. Because of the large number of data points, the differences in phase and amplitude between the different points are not large. Therefore, the impairments described above can cause errors by causing misinterpretation by demodulators of what characters were actually sent.

All of the above applies to the physical layer of the OSI model for data interchange between computers. At the higher protocol levels in the OSI model there are several standard protocols that are currently known. One of these protocols is the TCP/IP protocol used on the internet. This protocol is not satisfactory for provision of high demand services such as video teleconferencing and video on demand since TCP/IP has no provision to guarantee quality of service and provide guaranteed bandwidth capacity. Because there is no concept of reservation of bandwidth in TCP/IP protocol, it is not suitable for delivery simultaneously of audio, video and data services to multiple subscribers.

The ATM protocol is the currently favored local area network protocol which is designed to simultaneously deliver integrated voice, video and data services. However, the ATM protocol was designed for local area networks where there is no shared media which is used to simultaneously deliver ATM cells between more than one pair of communicating devices. ATM is a point to point communication protocol that cannot be directly used on a CATV plant with its point to multipoint/multipoint to point topology.

Therefore, a need has arisen for a method and apparatus that can support interactive digital systems that is characterized by a high immunity to noise, high throughput, an ability to appear to be a virtual point to point topology with the ability to reserve bandwidth to users who have high demand applications running such as video teleconferencing where no interruption in data flow is tolerable.

SUMMARY OF THE INVENTION

A method and apparatus for carrying an ATM communication protocol on a hybrid fiber coax CATV system. Point to point communication is supported by use of synchronous code division multiplexing on the physical and by assigning on the MAC layer one or more orthogonal SCDMA codes exclusively for use by pairs of devices needing to communicate such as the head end and any customer premises equipment. This control of the code space allows virtual point to point links to be established in the physical point to multipoint environment of the CATV HFC cable plant thereby allowing effective implementation of the ATM protocols. The virtual link structure is coded in a two byte header containing the virtual link ID of the virtual link to which each cell belongs. This virtual link header is attached to the front end of each ATM cell's regular header. This virtual header also makes possible broadcast and multicast of packets from the head end to all CPEs for management and control purposes in resolving contentions on shared access channels, distributing code allocation (also called timeslot allocation) decisions and other management functions.

ATM Quality of Service guarantees or guaranteed bandwidth availability is implemented by controlling the code space at the MAC layer such that one or more SCDMA spreading codes can be reserved to certain CPEs needing guaranteed bandwidth. In this way, if certain CPEs have in use peripherals which cannot tolerate interruptions in data flow, these CPEs may reserve one or more SCDMA codes for use exclusively by them such that virtual links are reserved exclusively. to them to support the peripherals needing guaranteed bandwidth.

ATM cell boundary synchronization is achieved using a 9th bit on each 8-bit byte in each ATM cell. Specifically, each byte in each ATM cell has 8 bits of data and a 9th bit which is encoded with data to indicate where the ATM cell starts and includes CRC data for error detection and correction on the payload data in the cell. Bandwidth is allocated by the head end computer which executes algorithms on the MAC layer to collect actual bandwidth usage information and requests for bandwidth as well as recommendations to add to or take away bandwidth from CPEs having actual usage which does not justify the amount of bandwidth they are currently allocated. These factors are prioritized and arbitrated based upon a number of factors and based upon the channel allocation/reservation scheme currently use. The channel allocation/reservation scheme can be changed on the fly between reservation, first-come, first-serve, fixed or any combination of these methodologies.

Reallocation calculations to adjust bandwidth allocations are calculated every 10 milliseconds and the new allocations are distributed in downstream messages which are transmitted to all CPEs.

Bandwidth allocation is done with a zero overhead algorithm in that, other than access requests, the CPEs need generate no upstream communications to aid in the adaptive algorithm to reallocate bandwidth. The head end computer measures actual usage by each CPE by counting cells directed to and coming from each CPE using the virtual link information and compares this information to the actual bandwidth allocated to each CPE to generate suggestions to the adaptive allocation process for redistributing bandwidth on each calculation.

According to another aspect of the teachings of the invention, there is provided a physical layer implementing synchronous code division multiplexing multiple access (SCDMA) scheme using orthogonal codes to encode the digital data being transmitted. Framing Timing Alignment of multiple subscribers at diverse locations is accomplished through alignment transmissions with variable delays into guardbands or gaps between frames. This keeps all subscribers in synchronization to the same frame timing used by the head end.

The ranging/alignment scheme disclosed herein is useful for any other modulation scheme which transmits digital data in frames, requires frame synchronization and can insert a guardband in each frame.

Use of SCDMA allows byte wide interleaving of bytes from multiple CPEs with very low overhead to allow multiple CPEs to simultaneously communicate with devices and networks coupled to the head end. A single byte is basically the lowest packet size. Although single bytes from different CPEs can be transmitted in each SCDMA frame, the amount of overhead data necessary to transmit necessary to accomplish this is very small. In other words, because the network is fully synchronized with frame boundaries determined in the ranging process and code assignments send in the downstream data, no header is needed for transmission of each byte.

Any method or apparatus that uses these inventive concepts is within the teachings of the invention and is deemed to be equivalent to the apparatus and methods described herein.

BRIEF DESCRIPTION OF THE DRAWINGS

FIG. 1 is a block diagram of the functional elements needed for simultaneous transmission of digital data from multiple subscribers to a head end receiver over a shared coaxial cable using orthogonal codes and for recovery of the separate data streams from each subscriber at the head end receiver.

FIG. 2 is the mathematical relationship that defines the property of orthogonality of the codes used by the modulator/transmitters in FIG. 1.

FIG. 3A is the mathematical relationship that the system of FIG. 1 uses to recover the individual data streams sent by the subscribers at the head end and vice versa, and FIGS. 3B through 3G illustrate a specific working example of how the mathematical relationship of FIG. 3A could be used to transmit two channels of data simultaneously over the same shared media.

FIG. 10 shows a typical cable television system arrangement in which the teachings of the invention find utility in a multi-RU, multichannel environment.

FIG. 11 is a block diagram of one multichannel embodiment for the internal structure of each RU modem's transmit channel circuitry for transmitting data to the CU.

FIG. 13 also shows a number of other signals generated by time base generator 350 in FIG. 12.

FIG. 23 is an illustration of the matrix multiplication process carried out in encoder 402 in FIG. 19 to encode each symbol using an orthogonal code matrix.

DETAILED DESCRIPTION OF THE PREFERRED EMBODIMENT

Figure 4A:
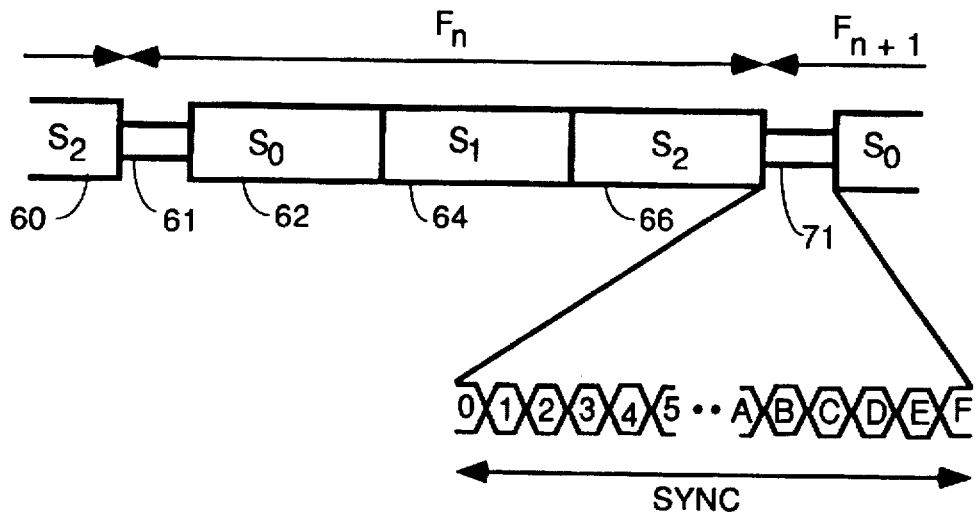
FIG. 4A shows a typical data structure for a frame.

Although the main teachings of the invention pertain to how an ATM local area network protocol can be used to implement a data link and MAC layer in a CATV plant, the degree of coupling between this technology and the SCDMA physical layer is tight.

Therefore, to properly understand how the ATM protocol can be used in a CATV cable plant, the reader must first be familiar with SCDMA applied to the CATV system to implement bidirectional digital communication in addition to the CATV one way television signal communication. To that end, the description of FIGS. 1–26 below describe in detail how SCDMA can be used in a CATV system. The description of how the ATM protocol can be implemented in a CATV system starts with the description of FIG. 27.

Referring to FIG. 1, there is shown a conceptual diagram of a system for multiple access digital communication over a cable TV coaxial conductor distribution system using orthogonal codes for CDMA. The system of FIG. 1 depicts only the circuitry to transmit data from multiple subscribers to a head end receiver. Similar circuitry to transmit data from the head end back to the subscribers exists but is not shown for simplicity.

FIG. 2 is the mathematical relationship that defines the property of orthogonality of the codes used by the modulator/transmitters in the system. The codes used in modulator/transmitters 12 and 16 are orthogonal if the summation of the product thereof over time from 0 to T is equal to 1 if the codes are the same code, i.e., if i=j where i=code #1 and j=code #2, but is zero if i is not equal to j. In other words, if the codes are different and orthogonal, the summation of the products of the signals modulated by these orthogonal codes is zero, meaning that signals modulated by the different orthogonal codes can travel over the same conductor without interference and without crosstalk. There is more that one set of orthogonal codes, but any orthogonal code will suffice to practice this aspect of the teachings of the invention.

FIG. 3A is the mathematical relationship which the system of FIG. 1 uses to send multiple channels of digital data over the same conductor without interference between channels. [b] in FIG. 3A represents an information vector that contains a symbol to be transmitted on each channel as a vector element. [c] represents a code matrix having the unique orthogonal code for each channel as its columns. $[c^T]$ represents the transpose matrix of the code matrix [c] where each column of [c] becomes a row of $[c^T]$. Finally, [i] represents the identity matrix where all entries are zeroes except for a line of 1's along the diagonal. In FIG. 1 to be described below, the matrix multiplication $[b] \times [c]$ is the processing that occurs on the transmit side of each transmission. The processing that occurs on the receiver side of the transmission is a matrix multiplication of the transpose matrix $[c^T]$ times the signals generated on the transmit side by the multiplication of the information vector [b] times the code matrix [c] to yield a matrix representing the product $[b] \times [i]$. Because the identity matrix is known, the product $[b] \times [i]$ allows recovery of the information vector [b].

To utilize these mathematical relationships of FIGS. 2 and 3A and convert them into a practical digital data communication system, symbolized by the system of FIG. 1, subscriber #1 provides a digital input stream of symbols or bits using any input device or computer (not shown). This digital data stream to be transmitted to the head end arrives on bus 10 at the data input of a code #1 modulator/transmitter 12. This digital data stream will be divided into individual symbols transmitted at the rate of three symbols/frame in the preferred embodiment. The teachings of the invention can be employed using symbols, data bytes or any other grouping of digital data. The first bit from the stream on bus 10 will be the first vector element in the information vector [b]. For the sake of simplicity, the manner in which symbols are formed from the incoming data stream will not be described here, but will be described in greater depth below herein. In the preferred embodiment, symbols are formed by filling individual address locations in a framer memory (not shown) with 9 bit bytes which arrive one per timeslot. The individual data streams on buses 10 and 14 are TDMA streams divided into multiple successive timeslots. Thus, time increases along one axis of the framer memory. Symbols are formed by reading the memory "across time", i.e., along an axis orthogonal to the axis of increasing time.

In the embodiment shown in FIG. 3A, modulator/transmitter 12 converts the digital data in the data stream arriving on bus 10 into amplitude modulations of a carrier signal using a first orthogonal code, and outputs the modulated carrier signal on feeder link coaxial conductor 18 coupled to an input of a summer 20. To do this, the modulator/transmitter 12 performs a matrix multiplication of the element of the information vector [b] from the TDMA stream on bus 10 times the appropriate element of the first column of code matrix [c], i.e., code #1 and uses the results to control a modulator which appropriately modulates an RF carrier. All other elements of the information vector [b] representing data from other TDMA streams at other locations are set to zero at the location of modulator/transmitter 12 but are set to the appropriate values at the modulator/transmitters at the locations of their respective TDMA streams. Thus, each modulator/transmitter does only the portion of the matrix multiplication $[b] \times [c]$ for data from its TDMA stream. The individual partial products from each modulator are summed by a summer 20 to give a result vector $R=[b] \times [c]$ representing the final result of the full matrix multiplication.

Likewise, subscriber #2 provides a digital data input stream on bus 14 to a code #2 modulator/transmitter 16. This digital data stream on bus 14 will be divided into individual symbols or bits to be transmitted. The first bit from the stream on bus 10 will become the second vector element in the information vector [b].

Modulator/transmitter 16 converts the digital data in the data stream arriving on bus 14 into amplitude modulations of a carrier signal by partial matrix multiplication similar to that done by modulator/transmitter 12 using a second code, i.e., another column of the code matrix [c] which is orthogonal to said first code. Modulator/transmitter 16 then outputs the modulated carrier onto a feeder link coaxial cable 22 coupled to another input of summer 20. That is, the modulator/transmitter 16 performs the multiplication of the second element of information vector [b] times the appropriate element of the second column of code matrix [c], i.e., code #2.

The effect of the multiplications by the modulator/transmitters 12 and 16 is to spread the energy of each bit or symbol to be transmitted out over time by multiplication of each bit in the information vector by the multiple code elements in the appropriate column of the code matrix [c].

Further, because the symbols are read from the framer memory "across time", the individual bits in the TDMA streams in the time domain on buses 10 and 14 are not transmitted in contiguous temporal relationship in the symbols used in the matrix multiplications to generate the signals transmitted in the code domain on coaxial/fiber data paths 18, 22 and 24. This form of spread spectrum modulation renders the system less susceptible to burst or impulse noise interference that adversely affects timeslots in the TDMA streams. The use of orthogonal codes provides simultaneous multiple access such that multiple digital channels can be simultaneously transmitted over a shared data path, and minimizes crosstalk between digital channels, especially where proper frame timing alignment among multiple subscribers is utilized. To implement this modulation scheme, each of the modulator/transmitters 12 and 16 uses the partial results of the multiplication [b]×[c], i.e., one element of the [b] vector times the appropriate element of a column of the [c] matrix, to modulate a carrier signal generated therein to generate the RF signals which are summed by summer 20 and transmitted to the head end receiver 26 on coaxial links 18 and 22.

As a specific example to illustrate how the information vector is multiplied by the code matrix in the transmittter/modulators, please refer to the following. In this hypothetical, assume that code #1 for user 1 is [1,1] and that code #2 for user 2 is [1,−1], as depicted on FIG. 3B. Thus, the first column of the code matrix will be $1/\sqrt{2}$, and $1/\sqrt{2}$ from top to bottom and the second column of the code matrix will be $1/\sqrt{2}$, and $-1/\sqrt{2}$ from top to bottom, all as shown in FIG. 3C. Note that each code element in this embodiment is divided by $\sqrt{2}$ for reasons which will be described below.

Also, assume that user 1 asked for and received one channel designated channel #1 from a head end allocation circuit (not shown) and wants to transmit a +1 during a first frame of data on transmission media 24. Also, assume that user 2 asked for and received one channel to transmit data and that channel is designated channel #2, and assume that user 2 wants to transmit a −1 during the first frame. In such a case, the information vector [b] for the first frame of data to be transmitted is [1,−1] with the first element, 1, representing the number the first user wants to send during the first frame on channel 1, and the second element, −1, representing the number the second user wants to send during the first frame on channel #2. These concepts are all represented by FIGS. 3D and 3E.

The multiplication of the information vector [b] times the code matrix [c] results in a result vector R for transmission of $[0,2/\sqrt{2}]$. This multiplication is done by multiplying information vector [1,−1] times the first column of the matrix and summing the two products $1/\sqrt{2}$ and $-1/\sqrt{2}$ to yield 0 as the first element of the result vector.

Next, the information vector [1,−1] is multiplied by the second column of the code matrix to yield two partial product results of $1/\sqrt{2}$ and $1/\sqrt{2}$. These two partial product results are summed by the summer 20 to yield the second element in the result matrix, $2/\sqrt{2}$, all as shown in FIG. 3F. Therefore, the modulator/transmitter 12 will modulate the carrier to an amplitude or frequency representing the level 0 of the first element of the result vector R=$[0,2/\sqrt{2}]$ during a first time and drive the carrier so modulated onto coaxial link 18 during the first time. Likewise, the modulator/transmitter 16 will modulate the carrier to an amplitude or frequency representing the level $2/\sqrt{2}$ of the second element of the result vector R during a second time and drives the carrier so modulated onto coaxial link 22 as the combined signal carrying the data from both channels #1 and #2 simultaneously across the shared transmission media 24.

Shared transmission media 24 can be any metallic or fiber optic media, terrestrial microwave link or satellite/cellular link. Appropriate interface circuitry to place the result signal represented by the vector $[0,2/2\sqrt{2}]$ onto the particular transmission media are known and are not critical to the invention.

The multiplication [b]×[c] is carried out by the two code modulator/transmitters 12 and 16, each doing a part of the multiplication. Modulator 12 multiplies the first element of the information vector [b] from subscriber #1 times the elements in the first row of the code matrix and outputs the resulting partial products during two successive intervals on line 18 coupled to the input of the summer 20. Likewise, the code #2 modulator 16 multiplies the second element of the information vector [b] from subscriber #2 times the two elements in the second row of the code matrix [c] and outputs the resulting two partial products on line 22 to the summer 20 during the same two successive intervals used by modulator 12. The signals output by the modulator/transmitters 12 and 16 during the first of the two successive intervals are summed by summer 20 and output on coaxial cable 24 as the first component, 0, of the result vector R=$[0,2/\sqrt{2}]$. The signals output by the modulator/transmitters 12 and 16 during the second of the two successive intervals are summed by summer 20 and output on coaxial cable 24 as the second component, $2/\sqrt{2}$, of the result vector $[0,2/2\sqrt{2}]$.

Not shown in FIG. 1 for simplicity is a modulator that takes the result vector and uses it to modulate the amplitude, phase or frequency (or some combination of these) of a radio frequency carrier, which is then input to the shared transmission media 24 for transmission to the head end.

To recover the original information vector [b], on the receiver side of the transaction, the receivers multiply the received signals times the transpose code matrix $[c^T]$ in a manner to reverse the encoding process. To derive the transpose matrix, the columns of the code matrix [c] become the rows of the transpose matrix $[c^T]$. In the hypothetical example at hand, the transpose matrix will have $[1/\sqrt{2}, 1/\sqrt{2}]$ as its first row corresponding to the first column of the code matrix [c]. The second row of the transpose matrix will be $[1/\sqrt{2},-1/\sqrt{2}]$ corresponding to the second column of the code matrix [c], as shown in FIG. 3G. Thus, in the example at hand, the transpose matrix $[c^T]$ is actually identical to the code matrix [c]. The result of multiplication of the result vector R=$[0,2/\sqrt{2}]$, representing the signal on coaxial cable 24, times the first column of the transpose matrix is 0+2/2=1 for the first element of the recovered information vector [b]. The result of multiplication of the result vector $[0,2/\sqrt{2}]$ times the second column of the transpose matrix is 0+(−2/2)=−1 for the second element of the recovered information vector [b]. The resulting recovered information vector [b] is [1,−1].

In the preferred embodiment, a normalization factor, equal to the square root of the number of separate codes in use, is used on both the transmit and receive sides as a denominator for each code matrix element and as a denominator for each transpose matrix element. This enables recovery by the receivers of an information vector [b] which has elements which are equal to the original data generated by the users. In the example of FIGS. 3B through 3G, each of the elements in the code matrix [c] (and, consequently, its transpose matrix $[c^T]$ ) are divided by this normalization factor $\sqrt{2}$.

Returning to the discussion of FIG. 1, coaxial cable 24 is coupled to a head end receiver 26. At the head end receiver, the signal on cable 24 is split onto separate coaxial cable links 28 and 30, each of which is coupled to a receiver of which receivers 32 and 38 are typical. The function of the receivers is to demodulate the received signals to derive the elements of the result vector which were used as modulation factors, and to multiply these result vector elements times the columns of the transpose matrix [$c^T$] to recover the information vector [b] originally transmitted. To accomplish this function, link 28 is coupled to the analog input of a receiver 32 which is comprised of a multiplier 34 and an integrator 36.

Not shown, for the sake of simplicity, is a demodulator/discriminator which converts the amplitude, phase or frequency variations (or some combination of the two) of the incoming RF signals received from coaxial cable/fiber optic data path 24 into analog signals representing the result vector elements which are coupled to the analog inputs of the multipliers 34 and 40.

The multiplier 34 receives as one input the demodulated analog signal on link 28 and as another input on line 35 an analog signal representing the elements in column 1 of the transpose matrix [$c^T$].

Likewise, link 30 and the demodulator/discriminator (not shown) is coupled to a receiver 38 which is comprised of a multiplier 40 and an integrator 42. The multiplier 40 has as one input, the analog demodulated signal from link 30 and has as another input a signal on line 37 representing the elements of column 2 of the transpose matrix [$c^T$].

Multiplier 34 multiplies the signals on link 28 during a first time interval times the first column element of the first column of the transpose matrix and outputs the result on line 44 to the summation input of integrator 36. During the second time interval when the second element of the result vector [0,2/√2] is arriving, the multiplier 34 multiplies the second element thereof, 2/√2, times the second element in the first column of the transpose matrix [$c^T$] and outputs the partial product result on line 44 to the summation input of the integrator 36. The integrator 36 sums the two partial products from the first and second time intervals, and outputs the sum on line 46 as the first element, 1, of the recovered information vector [b].

Likewise, multiplier 40 multiplies the signals on line 30 during a first time interval when the first element, 0, of the result vector [0,2/√2] is arriving times the first element of the second column of the transpose matrix [$c^T$] arriving on line 37. The resulting partial product is output on line 48 to the input of the integrator 42. During the second time interval, when the second element 2/√2 of the result vector [0,2/2 √2] is arriving on coaxial link 30, multiplier 40 multiplies this second element times the second element of second column of the transpose matrix. The resulting partial product during the second time interval is output on line 48 to the integrator 42. The integrator sums the two partial product results on line 48 over time, and outputs the result on line 50 as the second element, −1, of the recovered information vector [b]. The information vector [b] can then be disassembled into its components such that the TDMA data streams from which data was taken to compose the information vector can be re-created at the receiver end of the transaction.

Those skilled in the art will appreciate that the first and second conductors could also be assigned to carrying two different data streams sent on different channels both of which were originated by the same subscriber.

Throughout this example, the conductors of the distribution system have been referred to as coaxial cable. Those skilled in the art will appreciate that with suitable adjustments of the frequencies of operation and addition of appropriate transmit and receive circuitry, one or more of the various coaxial cable links described herein could be fiber optic cable, microwave links, radio frequency links, etc. since the medium of transmission is not critical to the invention.

In the preferred embodiment, the orthogonal codes used in the modulator/transmitters are cyclic codes. In cyclic orthogonal codes, all codes used are the same sequence of numbers, but each code is shifted by one or more bit positions from the preceding code. Although any set of orthogonal codes will work to implement the invention, the cyclic orthogonal codes simplify implementation issues by reducing the amount of storage needed to store the codes.

Those skilled in the art will appreciate that each subscriber transmitter may transmit multiple channels of digital data, and that the matrix multiplication and summation operations described above may be performed with digital circuitry such as suitably programmed microprocessors.

In an alternative embodiment, the separate streams of digital data are transmitted using spread spectrum frequency hopping techniques. In this embodiment, a first stream of digital data will be transmitted from one end to the other using a carrier that hops in frequency in accordance with a first predetermined coded sequence. Likewise, the second stream of digital data is transmitted on a carrier that hops in frequency in accordance with a second predetermined sequence. In this embodiment, the transmitter/modulators receive code sequence inputs that control the frequency of an oscillator that generates a carrier frequency. The codes that control the frequency of the transmitters for the various channels are orthogonal. The receiver for channel 1 receives the same code sequence that was fed to the transmitter for channel 1. This code sequence controls the frequency of a local beat frequency oscillator for receiver 1 and is synchronized with the code sequence fed to the transmitter for channel 1. Likewise, the receiver for channel 2 receives a code sequence that is orthogonal to the receiver for channel 1 code sequence and controls the beat frequency oscillator of the receiver for channel 2 to synchronously generate hops in the local oscillator frequency that track the hops in the frequency of the carrier for the transmitter for channel 2.

GENERAL DISCUSSION OF THE ALIGNMENT/RANGING PROCESS

Alignment is an important issue for optimal operation of the system of the genus represented by FIG. 1 with minimal cross talk between channels. In the system of FIG. 1, the time slots in the TDMA streams on lines 10 and 14 are the channels. The digital data in each time slot in the TDMA streams on lines 10 and 14 is data transmitted on that channel. The digital data in the TDMA streams is re-arranged into symbols, as described briefly above, and is transmitted in frames, with three symbols plus one guard band or gap per frame. The guardband or gap is reserved for transmission of alignment barker codes, and no other data is supposed to be transmitted during the gaps.

The concept in alignment is to adjust variable delays imposed at the site of each transmitter prior to transmission of a barker code so as to compensate for different propagation delays from each transmitter site such that the barker code from each subscriber transmitter trying to align arrives at the head end receiver during the same gap. When the variable delays at each subscriber transmitter are adjusted properly, each subscriber will be said to be in alignment so that the signals encoding the symbols that are simultaneously transmitted on the shared data path 24 will all be transmitted with the same frame timing.

Alignment is important to obtain pure orthogonality so as to obtain zero cross talk. If the transmitters are not perfectly aligned, the signals transmitted can still be recovered, but there is some cross talk between channels which will limit the capacity of the system to carry information.

This process of aligning all the delay circuits in the transmitters is sometimes alternatively called ranging herein and is broadly applicable to other types of multiple access digital data transmission systems also which suffer from different propagation times from different transmitter sites such as time division multiple access systems that form part of the prior art discussed above.

Referring to FIG. 4A, there is shown a diagram of the typical frame structure. Each frame is composed of three symbols of 144 chips each and a gap or guardband comprised of 16 chips for a total of 448 chips each having 278 nanoseconds duration. The chip is the basic unit of time in the "code domain", where code domain refers to the signals propagating across the shared media. In FIG. 4A, the three symbols of frame $F_n$ are symbolized by blocks 62, 64, and 66. The gap or guardband is symbolized by blocks 60 and 71. There is one guardband associated with each frame. The guardband 71 (sometimes also referred to herein as the gap) is used for synchronization and equalization purposes for the frame comprised of symbols 62, 64, 66 and guardband 71. The symbols carry the information for the various channels of digital data provided to the subscribers. The frame period is 125 microseconds. The frame data payload is 128 channels times 72 kilobits per second per channel plus 16 control and management channels each of which has a data rate of 72 kilobits per second for management and control information.

Hereafter, each subscriber transmitter will be referred to as a remote unit or RU, and the central unit or head end will be referred to as the CU.

The process of synchronization is the process wherein each RU is "trained", i.e., has a variable delay in its transmitter set using feedback from the CU on one of the management and control channels such that the transmitted frame from each RU arrives at the CU at the same time. Alignment of all frames from all RUs results in the beginning of the gap 60 for each frame from each RU occurring at the same time at the location of the CU regardless of differences in propagation delays from the various RUs to the CU. In FIG. 4A, time increases to the right. Therefore the beginning of the guardband 60 is located at point 61.

Figure 4B:
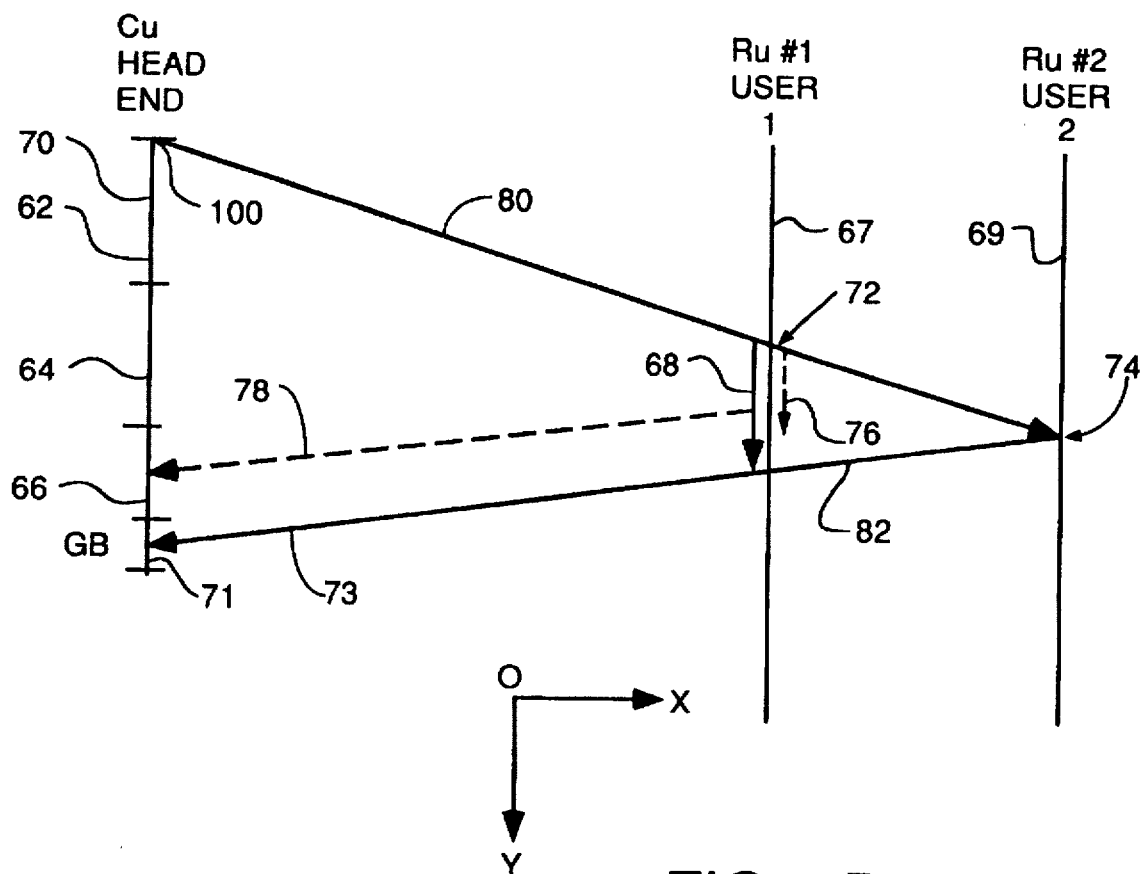
FIG. 4B is a symbolic diagram illustrating the concepts involved in alignment.

Referring to FIG. 4B, there is shown a symbolic diagram illustrating the concepts involved in alignment. In FIG. 4B points having increasing positive coordinates along the y-axis starting from the origin at 100 represent increasing time. Points along the x-axis to the right of origin represent increasing distance from the central unit which is designated at position 70. Time 100 represents the beginning of symbol 62 in FIG. 4A at the CU. The gap 71 at the end of the three symbols will be used for alignment, and the end of gap 71 will be deemed the end of the frame.

The alignment process is started asynchronously by any RU that needs to align. The central unit transmits a barker code during each frame at the same time in the frame. This barker code is received by each remote unit at a different time because of different propagation delays, but as to any particular RU, the barker code is always received at the same time during every frame until the CU changes its delay (a concept to be discussed more fully below). The barker code represents a trigger to any RU attempting to align and marks the receive frame timing reference for that RU. The time of receipt of the barker code represents the start of the variable delay interval being adjusted by the RU during the alignment process.

The barker code transmission during the frame shown in FIG. 4B is represented by line 80. The barker code is received by RU #1 at position 67 at time 72. The barker code is received by RU #2 at position 69 at time 74. The alignment process is a trial and error process of adjusting a delay from the time of receipt of the barker code to the time of transmission of the same barker code by each RU back toward the central unit 70 until the delay is properly adjusted such that the re-transmitted barker code arrives at the CU during the gap. Vector 68 represents correct delay timing for RU #1 at position 67 such that its barker code transmission 73 arrives in the middle of the gap 71. Dashed vector 76 represents an incorrect delay resulting in a barker code transmission, represented by dashed line 78, from RU #1 which arrives sometime during the middle of symbol 66 thereby missing the gap 71. This condition represents an incorrect alignment and may result in crosstalk.

Likewise, the RU #2 at position 69 uses zero delay and emits a barker code transmission 82 immediately upon receipt of the barker code trigger transmission 80 from the CU 70. This barker code transmission 82 from RU #2 also arrives during the middle of gap 71 thereby indicating that RU #1 and RU #2 are correctly aligned.

The alignment barker code transmissions are typically short bursts having energy levels which are sufficient to make detection during gap 71 easy even though gap 71 also includes random noise energy.

The alignment barker code transmissions are detected during the gap by performing a correlation mathematical operation in the CU receiver between the barker code that was transmitted and the received signal. If the received signal was the same barker code that was transmitted by the CU, the correlation operation will output a signal that peaks at the time of maximum overlap between the barker code transmitted by the CU and the received signal. The timing of this peak indicates the alignment state of the RU that transmitted the barker code which resulted in the peak. Because the barker code transmissions are relatively short in duration and their amplitudes are not excessive, arrival of a barker code transmission during the middle of a symbol will generally not cause errors in the interpretation of symbol 66 by the CU receiver. Each symbol encoded in the code domain includes error detection and correction bits (ECC bits) such that any errors that occur can usually be detected and corrected when the symbols are reconstituted by the framer circuitry in the receiver. Therefore, if the barker code alignment transmission does result in an error, that error will usually be within the detection and correction range of the ECC bits of each symbol.

Figure 5:
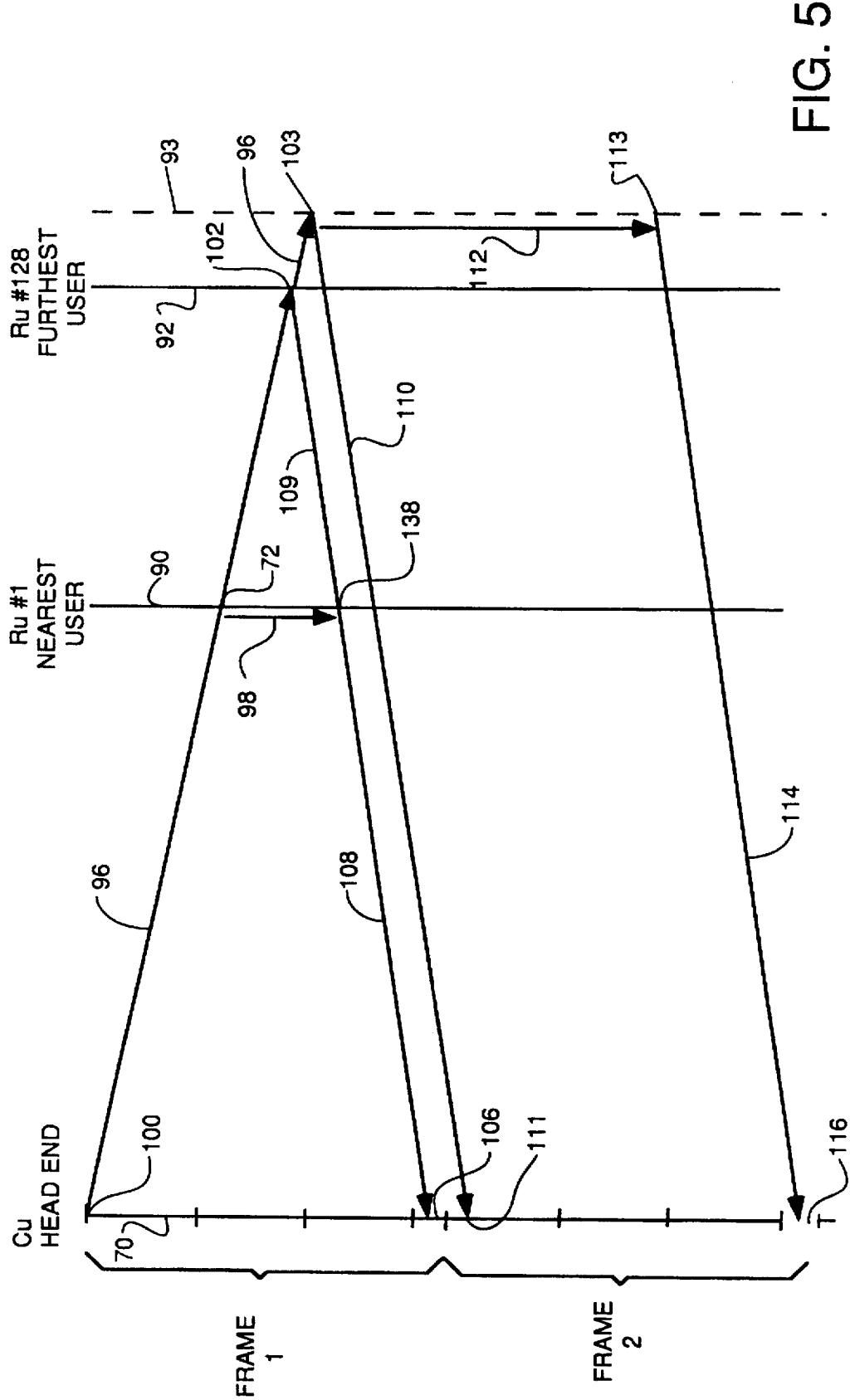
FIG. 5 is a diagram like that of FIG. 4B which illustrates a problem which occurs when the network physically expands.

Referring to FIG. 5, there is shown a diagram like that of FIG. 4B which illustrates a problem which occurs when the network physically expands. This can occur under certain circumstances such as during the heat of a summer afternoon when the physical media thermally expands thereby altering the propagation times of barker code signals from the CU to the RUs and from the RUs back to the CU. In the example shown, the CU 70 transmits barker code 96 at time 100. This barker code reaches the nearest RU, RU #1, at position 90 at time 72. The same barker code reaches the furthest RU, RU #128, located at position 92 at time 102. RU #1 uses a delay symbolized by vector 98 and retransmits the barker code 108 at time 138. This alignment transmission hits gap 106 in frame #1 indicating that RU #1 is properly aligned.

The RU #128, when located at position 92 uses no delay and immediately retransmits barker code transmission 109 at time 102. Transmission 109 also arrives during gap 106 indicating that, at least at position 92, RU #128 is properly aligned.

Now suppose that the network physically expands such that RU #128 finds itself physically at position 93. In this position, RU #128 receives barker code transmission 96 from the CU at time 103, and, because RU #128 is already using the minimum possible delay for retransmission of an alignment code, alignment transmission 110 is also transmitted at time 103. However, because of the physical expansion of the network, alignment transmission 110 reaches the CU at time 111 which is after the end of the gap 106 and sometime in the middle of the first symbol of frame #2.

When an RU properly hits the gap, it is authenticated, i.e., identified, and the CU tells it that alignment has been achieved thereby causing the RU to stop adjusting its delay by trial and error. Because RU #128 does not receive any acknowledgement from the CU that it is properly aligned, its starts incrementing its delay vector in a trial and error process. After several incrementations, the delay vector finally reaches the delay represented by vector 112. With this delay vector, an alignment transmission 114 is transmitted from RU #128 at time 113 which reaches gap 116 located at the end of frame 2. However, this means that RU #128 is synchronized with the wrong frame. It is required for proper operation of the system to have all RUs synchronized to the gap at the end of the same frame in which the barker code transmission from the CU which triggered the RUs alignment transmissions occurred. If one or more RU aligns to the gap at the end of another frame, the results can be disastrous in terms of errors generated in the CU receiver in interpreting data transmitted by the RUs.

Figure 6:
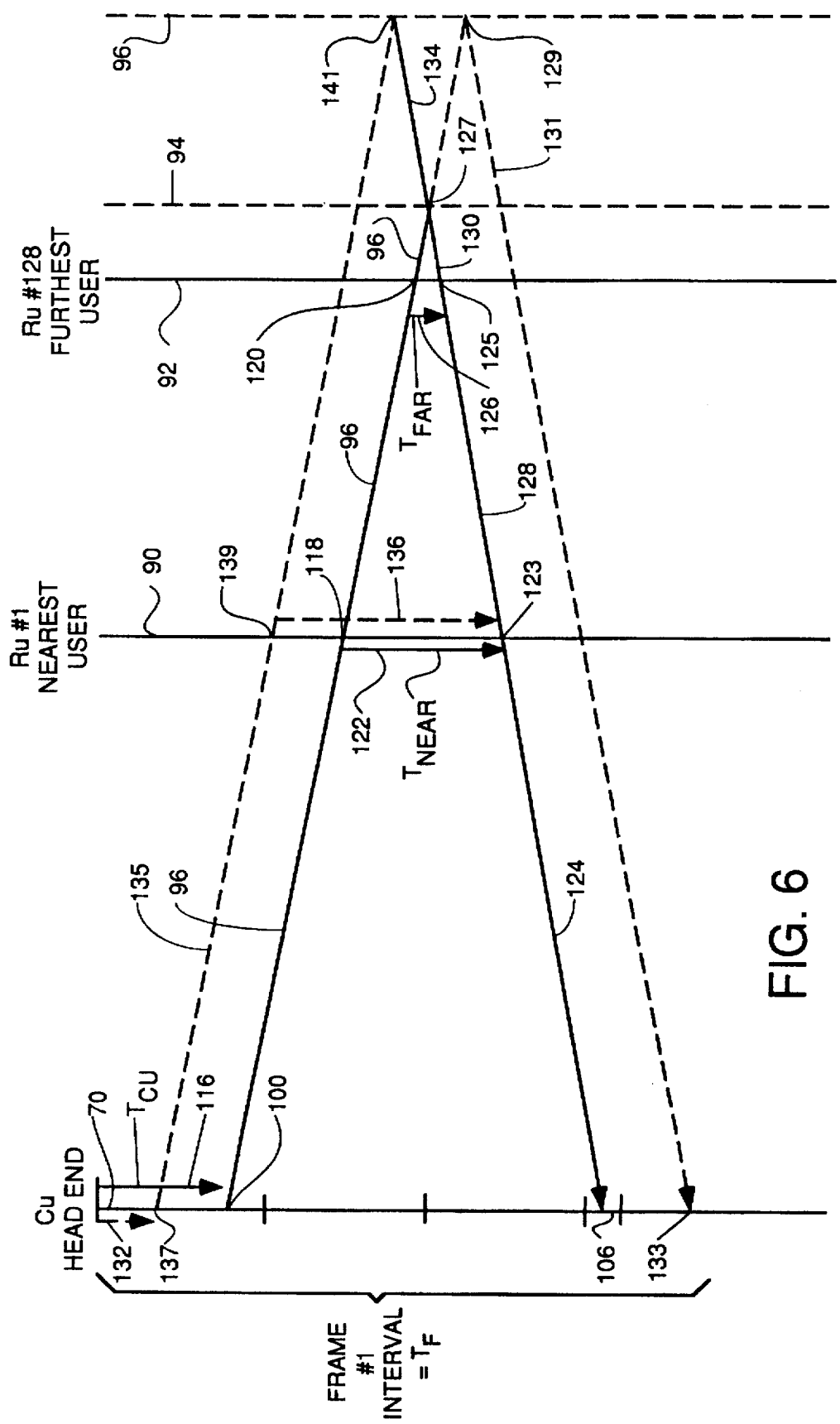
FIG. 6 is a diagram like that of FIG. 5 which illustrates the solution to the misalignment problem outlined in the discussion of FIG. 5.

Referring to FIG. 6, there is shown a diagram like that of FIG. 5 which illustrates the solution to this misalignment problem outlined in the discussion of FIG. 5. In the diagram of FIG. 6, CU 70 imposes a delay, represented by vector 116, prior to transmitting the alignment triggering transmission 96 at time 100. The barker code transmission 96 arrives at the nearest RU, RU #1, at position 90 at time 118. Time 118 establishes the receive frame timing for RU #1. RU #1 then imposes a delay represented by vector 122 and transmits the same barker code alignment transmission 124 at time 123. Time 123 establishes the transmit frame timing reference for RU #1. The time delay between times 118 and time 123 is predictable since the CU will transmit its barker code transmission 96 at the same time during every frame until such time as it is necessary to alter the timing of transmission 96 to keep all RUs in alignment. In other words, the time of reception of the barker code transmission 96 for all RUs is predictable and will be a periodic signal which happens once during each fame. The alignment transmission 124 from RU #1 reaches gap 106 at the end of frame #1.

The alignment transmission 96 from the CU reaches RU #128, the furthest RU, at time 120. Time 120 establishes the receive frame timing reference for RU #128 while at position 92. Thereafter, at time 125, the RU #128 transmits alignment transmission 128. This transmission arrives during the gap 106 at the end of the first frame thereby indicating that RU #128 is properly aligned at this position.

As in the case of RU #1, the delay between times 120 and 125 for RU #128 is predictable.

Now suppose that the network expands, and RU #128 finds itself at position 94. In this position, the CU alignment triggering transmission 96 arrives at time 127. In order to stay aligned, RU #128 will reduce its delay vector 126 to zero and immediately retransmit an alignment transmission 130 comprising the same barker code which it received. The transmission 130 arrives during gap 106 thereby indicating that RU #128 is still aligned at its new position by cutting its delay vector to zero.

Now assume that the network further expands such that RU #128 finds itself at position 96. In this new position, alignment transmission 96 from the CU would arrive at time 129. With a zero delay by RU #128, the resulting alignment transmission 131 would arrive at time 133 just after the end of the gap 106 thereby indicating the RU #128 had been taken out of alignment by the expansion of the network. RU #128 would then continue to adjust its delay vector until it aligned to the next gap following the end of frame #2 thereby causing errors.

To prevent this from happening, when the CU finds that an RU which was previously in alignment has gone out of alignment because of network expansion, the CU will reduce its initial delay from the delay represented by vector 116 to the delay represented by vector 132. With this new delay vector, a barker code alignment triggering transmission 135 will be transmitted at time 137. This alignment triggering transmission 135 will arrive at the position of RU #1 at time 139 and will establish a new receive frame timing reference. If RU #1 has not adjusted its delay vector 122 in advance by one of the mechanisms to be described below, it will go out of alignment. It may then enter a realignment phase and will ultimately, by trial and error, adjust its delay vector to that represented by dashed vector 136. After so adjusting its delay, RU #1 will transmit an alignment transmission 124 at time 123 so as to again hit gap 106 thereby reentering alignment.

The alignment triggering transmission 135 from the CU arrives at the position 96 of RU #128 at time 141. Using a zero delay vector, RU #128 transmits its alignment transmission 134. This alignment transmission 134 arrives during gap 106 thereby placing RU #128 again in alignment.

FIG. 6 shows an alignment process where the alignment is to the gap at the end of the first frame in which the alignment trigger signal 96 is transmitted. In real life systems, this may not be practical, so the alignment process is carried out to the gap following some integer number of frames in the future. The mathematical expression which defines this relationship is given in equation (1) below:

$$TTA = T_{cu} + T_{ru} + 2 \times T_p = \text{constant} = n \times T_F \qquad (1)$$

where

TTA=the total turnaround time from the CU to the farthest RU;

$T_{cu}$=the delay imposed by the CU illustrated by vector 116 in FIG. 6;

$T_{ru}$=the delay imposed by the farthest RU illustrated by vector 126 in FIG. 6 (also called $T_{far}$);

$2 \times T_p$=two times the propagation delay $T_p$ from the CU to the farthest RU; and $n \times T_F$=an integer multiple of the frame interval $T_F$.

Of course, when the network expands, there is a certain additional delay in the propagation delays which will be called $T_u$ for the uncertainty of this additional propagation delay. Therefore, three additional requirements are imposed with respect to how much delay the CU and the RUs must be able to impose. Those additional requirements are given below in equations (2), (3) and (4):

$$T_{cu}=[T_d+T_u] \text{modulo } T_F \quad (2)$$

where $T_d$=the span of the network, i.e., equal to the quantity $[TTA_2-TTA_1]$ where $TTA_2$ equals the total turnaround propagation time for a signal to propagate from the CU to the farthest RU and back, and $TTA_1$ equals the total turnaround propagation time for a signal to propagate from the CU to the nearest RU and back; and modulo $T_F$=the remainder of $[T_d+T_u]$ divided by $T_F$.

$$T_{far}>T_u \quad (3)$$

where $T_{far}$=the smallest possible $T_{ru}$ of the farthest RU and is equal to the smallest RU delay which can be imposed by the farthest RU;

$$T_{near}<T_F-T_u \quad (4)$$

where $T_{near}$=the maximum possible $T_{ru}$ of the nearest RU.

What all this means in a practical sense is that to set up the delays in the network so that all RUs are aligned, the following steps are taken and the limitations on possible delays imposed by the CU and RUs given in equations (1) through (3) are imposed so that all RUs align to the same gap. The practical network to be aligned by the following procedure has a CU coupled by a fiber optic trunk line to an optical node. The optical node is located out in the area to be served and can be coupled to as many as 2000 homes by 2000 individual coaxial links. To align such a network, step 1 would be to bring an RU to the position of the optical node and fix its delay at $T_{near}=T_F-T_u$. With this delay, the nearest RU would not hit any gap except by shear luck. Assuming the nearest RU does not hit the gap with this delay, the second step would be to adjust the delay of the CU until the nearest RU hits a gap. When this occurs, the condition $T_{cu}=[T_d+T_u]$ modulo $T_F$ would be true meaning that the CU would have adequately compensated for the uncertainty of the propagation delay increment to $T_d$ caused by network expansion.

Figure 7A:
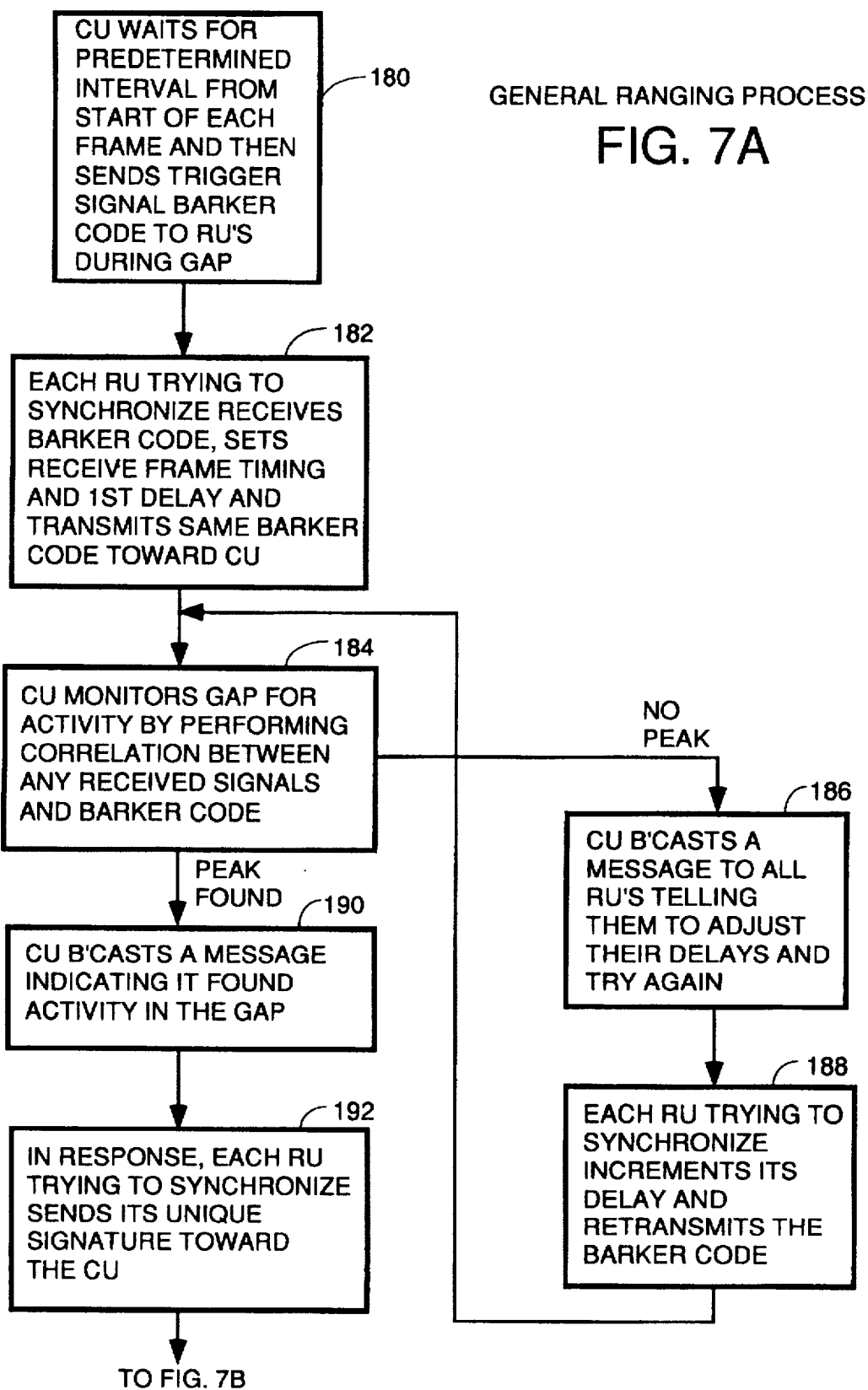
FIG. 7, which is comprised of FIGS. 7A, 7B, and 7C, is a flow chart for the general alignment process which is used in training all RUs to set their delay vectors properly so as to be in alignment within the same frame.
Figure 7B:
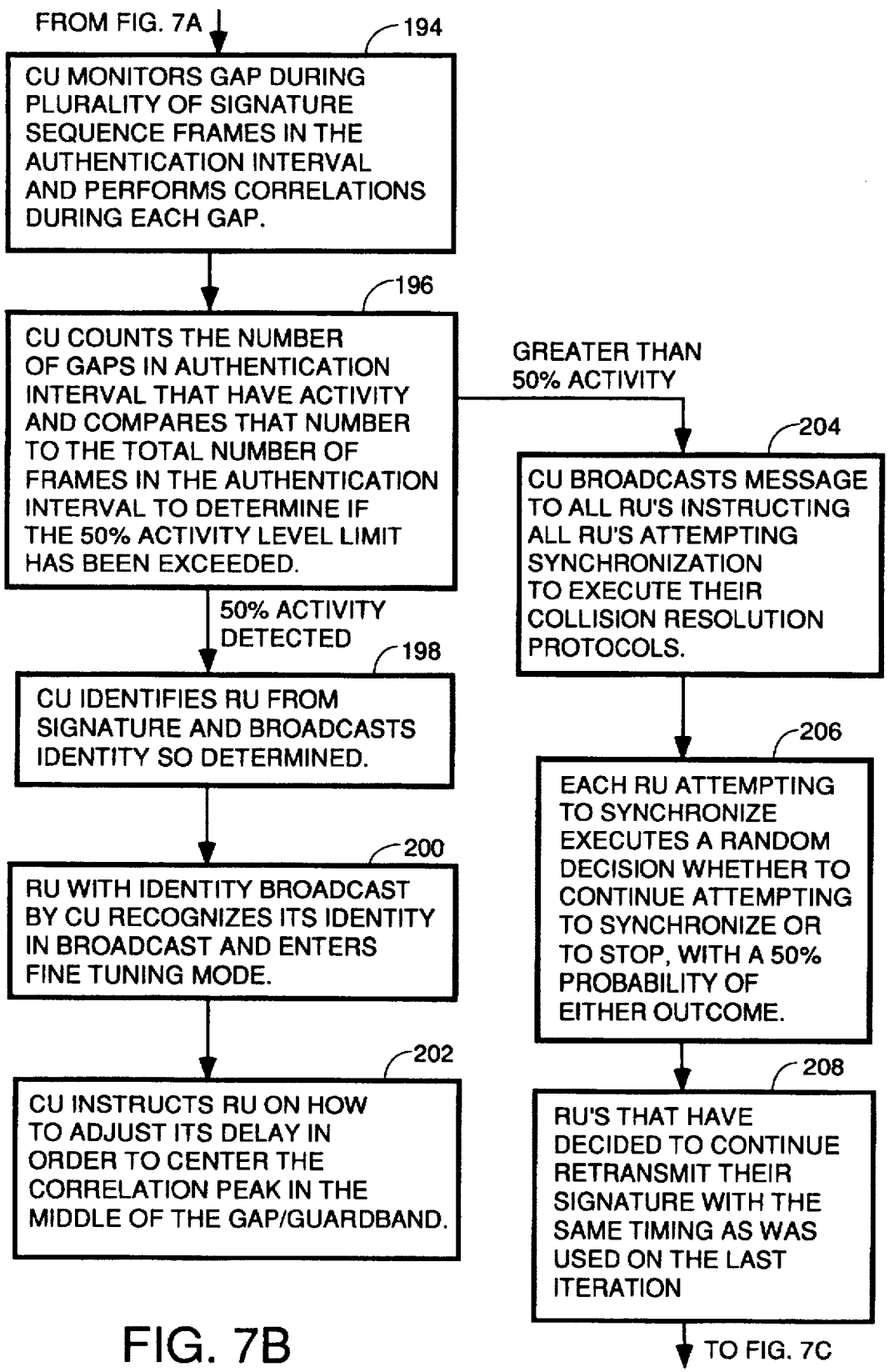
Figure 7C:
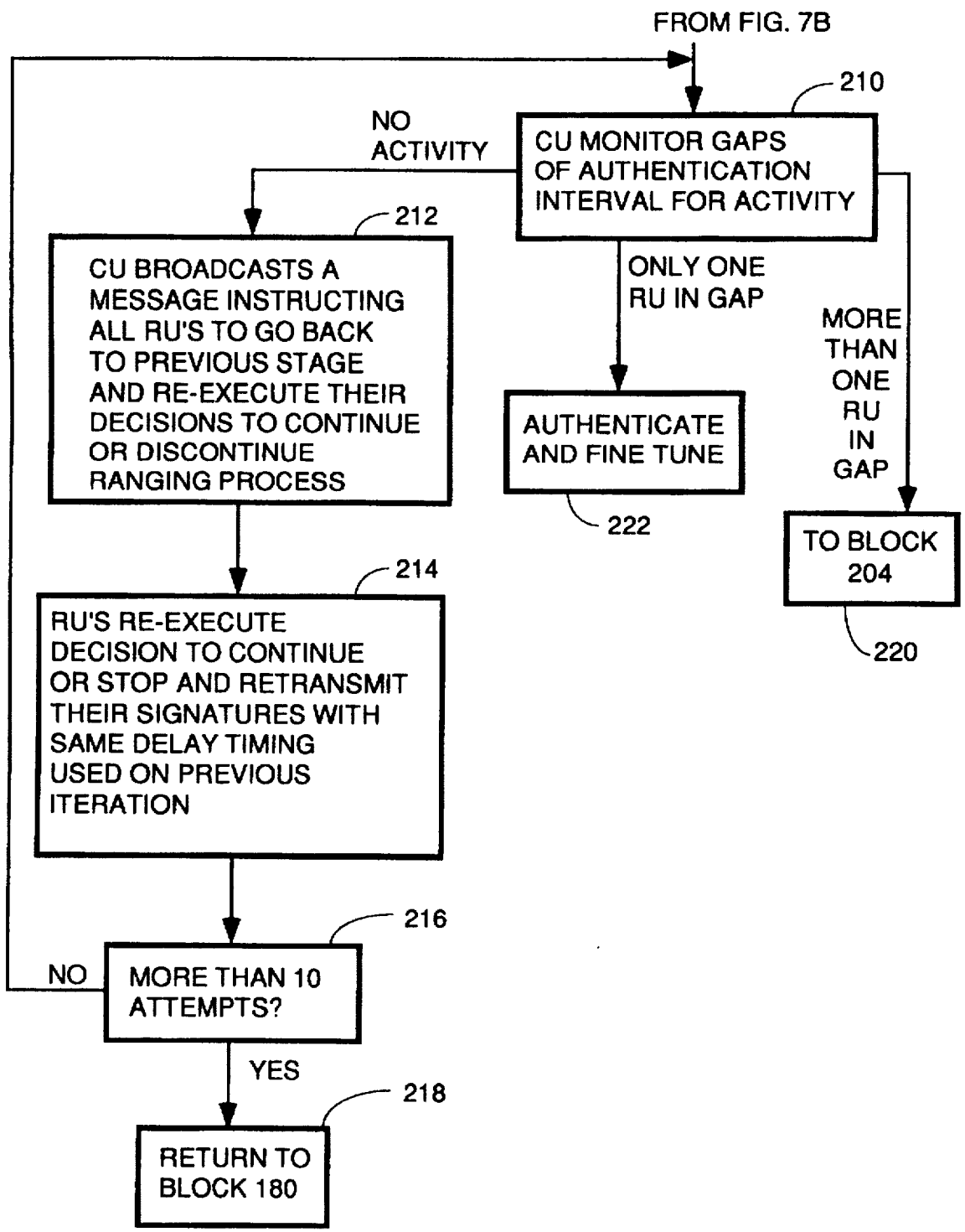

Referring to FIG. 7, which is comprised of FIGS. 7A, 7B, and 7C, there is shown a flow chart for the general alignment process which is used in training all RUs to set their delay vectors properly so as to be in alignment within the same frame. The process starts as symbolized at block 180 with the CU waiting for a predetermined interval from the start of each frame and then sending a trigger signal transmission to the RUs. The trigger signal in each frame is a unique barker code.

Block 182 symbolizes the process wherein each RU trying to synchronize (the terms "synchronize", "ranging" and "alignment" all are used synonymously to mean the process of training an RU to set its delay vector properly to get its alignment transmission in the gap) receives the barker code trigger signal transmission from the CU and sets its receive frame timing and then sets a first delay for its delay vector. Thereafter, the RU transmits the same barker code it received from the CU towards the CU as an alignment transmission.

In block 184, the CU monitors the gap for activity by performing a correlation mathematical function between any received signal during the gap and the barker code that was transmitted as the trigger signal. If a barker code identical to the trigger signal is received during the gap, the correlation calculation will result in a correlation peak being found in the gap. If the correlation calculation results in a peak being found, processing proceeds to the process symbolized by block 190. There, the CU broadcasts a message to all RUs indicating that it found activity in the gap. Then the process of block 192 is performed where each RU trying to synchronize sends its signature. That is, in response to the broadcasts from the CU, each RU trying to synchronize sends its unique signature towards the CU in order to determine if that RU's barker code is the barker code the CU found in the gap and whether it is the only RU in the gap. This process is called authentication.

The process of block 192 symbolizes the start of the authentication process. Each RU has a unique signature which comprises the transmission and nontransmission of barker codes during the gaps of a multiple frame authentication period. Specifically, the unique signature of each RU will involve transmitting the barker code during some gaps of the authentication period but not during others. The number of gaps during which the barker code is transmitted compared to the number of gaps during which the barker code is not transmitted during the authentication period is such that if only one RU is aligned to the gap and is transmitting its authentication signature, activity will be found in the gaps of the authentication interval only 50% of the time. This scheme for authentication is chosen so that the CU can detect contentions, i.e., more than one RU in the same gap, in the manner described below.

After performing the process of block 192, the process of block 194 on FIG. 7B is performed. This process involves the CU monitoring each of the gaps during the plurality of signature sequence frames in the authentication interval and performing correlations between the signals received in each of the gaps and the barker code that the CU transmitted.

Next, the process of block 196 is performed. In this process, the CU counts the number of gaps in the authentication interval that have had activity detected therein, and then compares that number to the total number frames in the authentication interval to determine if the 50% activity level limit has been exceeded.

Returning to the consideration of the process of block 184, if the CU, while monitoring the alignment gap for activity, finds no peak resulted from the correlation calculation, then the process of block 186 is performed. In the process of block 186, the CU broadcasts a message to all RUs telling them to adjust their delays and to try again to hit the gap with their barker code transmissions. Then, the process of block 188 is performed wherein each RU trying to synchronize increments its delay vector and retransmits the same barker code as was received from the CU. Thereafter, the process of block 184 is performed again wherein the CU monitors the gap for activity. The loop comprising blocks 184, 186 and 188, taken together, comprise the trial and error process which causes all RUs trying to align themselves to continually increment their delay vectors until at least one of them hits the gap.

Returning to the consideration of block 196, if 50% activity level is detected during the authentication interval, it means that only one RU is in the gap. In such a case, the process of block 198 is performed. In this process, the CU identifies the RU whose barker code transmissions are found in the gap from the unique signature sequence transmitted during the authentication interval. In other words, the CU examines exactly which gaps had correlation peaks therein and the sequence of these gaps and looks up this sequence in a lookup table listing the unique signature sequence for each RU in order to identify the particular RU that has successfully aligned itself. Block 198 is reached only if activity is detected in exactly 50% of the gaps.

After the CU identifies the RU, it broadcasts the identity so determined to all RUs as the last step of block 198.

Next, the process of block 200 is performed. In this process, the RU with the identity broadcast by the CU recognizes its identity in the broadcast message and enters a fine tuning mode.

The fine tuning mode is represented by the process of block 202. In this process, the CU instructs the RU which has aligned itself in the gap on how to adjust its delay vector in order to center the correlation peak calculated by the CU to the exact middle of the gap. In the preferred embodiment, the gap is comprised of 16 chips which comprise 8 chips in the middle of the gap and then 4 chips on either side of this middle group of 8. It is desirable during the fine tuning mode to get the correlation peak centered in the middle of the middle 8 chips. As mentioned above, a chip is a small interval of time equal to the frame period of 125 microseconds divided by the 448 chips which comprise each frame. In other words, each chip is 279 nanoseconds in duration. The fine tuning process of block 202 involves sending messages back and forth between the CU and the RU which has been identified as having aligned itself in the gap. These messages are sent over the management and control channels. Usually the exchange involves only one instruction from the CU to the RU saying, for example, "Increase your delay vector by 2 chips" or, "Decrease your delay vector by 3 chips". The RU then makes the instructed adjustment and retransmits the barker code. The CU again calculates a correlation peak and examines where the peak occurs in the gap. If the peak occurs in a suitable position, the CU sends a message to the RU telling it to stop adjusting its delay vector as satisfactory alignment has been achieved.

Returning to the consideration of the process of block 196, if the CU determines that greater than 50% of the gaps during the authentication interval had correlation peaks therein, i.e., greater than 50% activity is detected, then the process of block 204 is reached. This process is only reached if more than one RU has aligned itself to the same gap.

If this case, because each RU is transmitting its unique signature, and because each signature is a unique sequence with only 50% activity level, the result of two RU's being in the same gap will be that during more than 50% of the gaps of the authentication interval, correlation peaks will occur. It is impossible to find tune the RUs if more than one RU is trying to fine tune during the same gap. Therefore, the CU has to reduce the number of RUs that are in the gap to one, and it starts this process by performing the process of block 204. In this process, the CU broadcasts a message to all RUs instructing only the RUs attempting to synchronize to execute their collision resolution protocols.

Next, the process of block 206 is performed, to start the collision resolution protocol, wherein each RU attempting to synchronize executes a random decision whether to continue attempting to synchronize or to stop attempting to synchronize. Each RU will make this decision with a 50% probability of either outcome.

After all RUs make their random decisions whether to continue, the process of block 208 is performed. In this process, the RUs that have decided to continue to align retransmit their signature sequences without changing their timing, i.e., with the same timing as was used on the last iteration of the trial and error process. In other words, each RU that has decided to continue transmits its unique signature sequence (sometimes hereafter called a "dotted sequence") over another authentication interval using the same delay vectors that are currently set.

Next, the process of block 210 on FIG. 7C is performed wherein the CU again monitors the gaps of the authentication interval for activity.

If the random decisions whether to continue or not result in no RUs transmitting their signatures, then no activity will be found in the gaps of the authentication interval. In this event, the process of block 212 will be performed wherein the CU broadcasts a message instructing all RUs to go back to the previous stage and to reexecute their decisions to continue or discontinue the ranging process.

The RUs then re-execute their decisions whether to continue or stop attempting to align themselves and retransmit their signatures during the authentication interval with the same delay timing used on the previous iteration, as symbolized by block 214.

Following the process of block 214, the process of block 216 is performed to determine if more than 10 attempts to get one RU in the gap have occurred. If so, the process of block 218 is performed to return to block 180 and restart the ranging process from the top. If fewer than 10 attempts have been made, processing returns to the process of block 210 wherein the CU again monitors the gaps of the authentication interval for activity.

If the process of block 210 finds only one RU in the gap, i.e., 50% activity level is detected during the authentication interval, then the process of block 222 is performed. The process of block 222 authenticates the RU by broadcasting the identity of the RU found in the gap and then the RU is fine tuned in the manner previously described with reference to block 202.

If the CU finds in the process of block 210 more than one RU is still in the gap, processing returns to block 204 where the CU broadcasts a message to all RUs instructing them to execute their collision resolutions protocols. This process is symbolized by block 220.

The process of adjusting the delay vector used by the CU in transmitting its trigger signal barker code can result in loss of synchronization by all RUs in the system unless something is done to prevent this before the CU changes its delay. That is, when the CU shortens its delay vector, the RUs closer to the CU than the furthest RU will all go out of alignment unless certain measures are taken to forewarn them of the coming change. There are 3 different embodiments of processes for realigning all of the RUs when the CU changes its delay vector. The preferred one of these embodiments is symbolized by the flow chart of FIG. 9 and involves activity prior to the CU changing its delay vector to prevent loss of synchronization by all RUs when the CU changes its delay.

Figure 8:
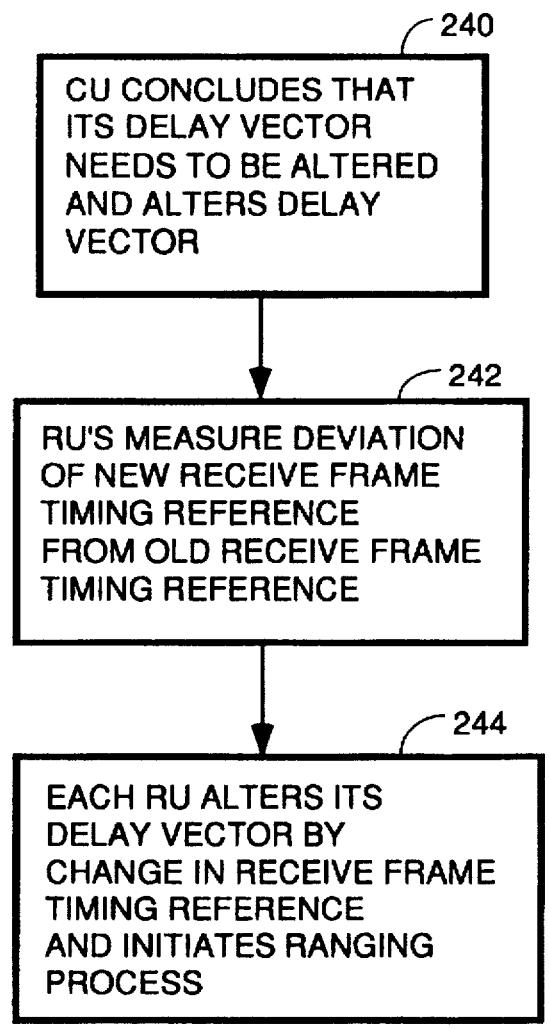
FIG. 8 is a flow chart of one embodiment of a process to resynchronize all RUs after the CU has changed its delay vector.

The first of these processes is shown in the flow chart of FIG. 8. This process will be called the dead reckoning resychronization process for lack of a better term. In this process, the CU concludes, in block 240, that its delay vector needs to be altered in order to keep the farthest RUs in alignment. This conclusion can be drawn in any one of a number of different ways such as by monitoring the farthest RU for continued alignment after the farthest RU tells the CU that it is aligned with the shortest possible delay vector in use. Or, alternatively, the CU can send out a message to the farthest RU periodically inquiring as to whether it is still aligned. This message can take the form of a request for that RU to transmit its authentication signature and then monitoring the next few frames of an authentication interval to determine if that farthest RUs authentication signature shows up in the authentication interval gaps. If the CU concludes in block 240 that it needs to alter its delay vector it then alters the delay vector.

As noted previously, because the CU uses the same delay vector during every frame in transmitting its barker code trigger signal, the RUs have a predictable periodic signal from the CU upon which they can rely to measure the timing change made by the CU. In other words, the time of arrival of the barker code from the CU during each frame is predictable to each RU, and when it changes, the RUs can measure by how much it changed. When the barker code from the CU does not arrive at the predicted time, the RUs know that the CU has just altered its delay vector. The RUs then measure the deviation of the new receive frame timing reference, i.e., the time of arrival of the barker code trigger signal from the CU, by measuring the difference between the old receive frame timing reference and the new receive frame timing reference. This process is symbolized by block 242.

Finally, each RU realigns itself in the process of block 244. In this process, each RU alters its delay vector by an amount equal to the change in the receive frame timing reference. Then each RU initiates a ranging process. The CU monitors the gap at the end of every frame so any RU can initiate ranging at any time.

Figure 9:
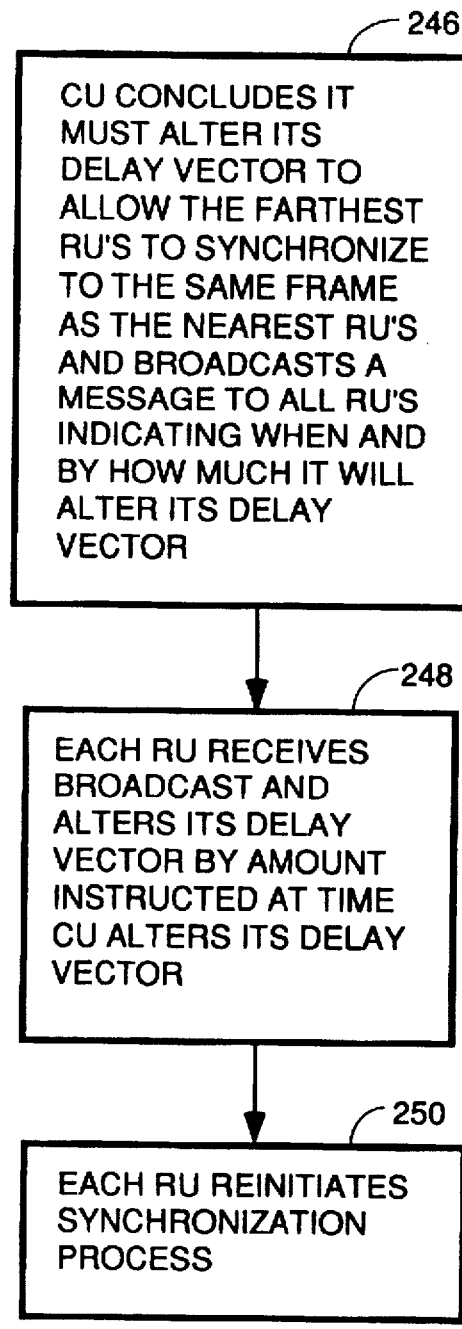
FIG. 9 represents the preferred process for resynchronizing all RUs after the CU has changed its delay vector.

FIG. 9 represents the preferred process for resychronizing all RUs after the CU has changed its delay vector. This process will be called the precursor embodiment herein.

This process starts with block 246 wherein the CU concludes that it must alter its delay vector to allow the farthest RUs to synchronize to the same frame as the nearest RUs. The CU, after reaching the conclusion that a change in its delay vector must be made, broadcasts a message to all RUs indicating when and by how much it will alter its delay vector.

Next the process of block 248 is performed wherein each RU receives the broadcast and alters its delay vector by an amount equal to the amount that the CU will be changing its delay vector at the specified time. That is, each RU alters its delay vector by the amount instructed by the CU at the time indicated in the message from the CU that the CU will alter its delay vector.

Finally, the process of block 250 is performed wherein each RU reinitiates a synchronization process.

Both of the embodiments of FIGS. 8 and 9 will result in little or no loss of data because each RU resynchronizes very rapidly. This result follows because each RU's delay vector is immediately set at the delay needed for synchronization at the time the CU alters its delay vector thereby eliminating the delay of the trial and error incrementation of the delay vectors.

The final embodiment for resynchronizing after the CU changes its delay vector is for the CU simply to broadcast the message to all RUs saying, "You must all now realign as I have just changed my delay vector." Each RU then reenters the alignment process symbolized by FIGS. 7A, 7B, and 7C. This process is repeated by each RU until all RUs are aligned.

Referring to FIG. 10, there is shown a typical cable television system arrangement in which the teachings of the invention find utility in a multi-RU, multichannel environment. The central unit or CU 252 is coupled via a coaxial cable, satellite link, microwave link, fiber optic link or some combination of these media 251 to a plurality of subscribers of which subscribers 254 and 256 are typical. The CU sends and receives digital information bidirectionally with each subscriber's RU. Each subscriber has a remote unit or RU which acts as the interface between the subscriber's television, computer, telephone and other devices and the transmission media 251. The CU has a modem therein including circuitry in a transmit channel that assembles frames of data symbols from a TDMA digital data input stream, and encodes and transmits these frames of symbols to the RUs using orthogonal codes. The modem also includes a receive channel which receives the encoded frames of symbols, decodes the symbols using the transpose of the code matrix of the orthogonal codes used by the RU's to transmit the frames, reassembles the TDMA digital data stream from the decoded results and outputs the TDMA stream for use by other equipment providing various services to the subscribers.

Each frame is comprised of symbols that are composed from digital payload data in 128 timeslots in the TDMA stream. Each time slot in the TDMA stream can carry 8 bits in some embodiments, but in the preferred embodiment, each timeslot carries 9 bits for reasons to be described below. Each timeslot is a channel which can carry digital data encoding some service such as video on demand, video teleconferencing, internet access, etc. The timeslots/channels are assigned on an as-needed basis to the various subscriber RUs to transmit/receive data implementing the service in bidirectional communication with the CU.

The choice of 128 payload timeslots per frame is not coincidental. In telephony, a frame of data also comprises 128 timeslots, each carrying 8 bits of data. Each RU is in synchronization with the CU and knows when the beginning and end of each frame of data occurs. Each RU also knows which timeslot(s) has/have been assigned to it by virtue of side conversations each RU has with the channel assignment circuitry in the CU on the command and control channels (the remaining 16 channels of the 144 total channels).

Referring to FIG. 11, there is shown a block diagram of the system of FIG. 10 which shows more detail about one multichannel embodiment for the internal structure of each RU modems transmit channel circuitry for transmitting data to the CU. Dashed box 254 represents RU#1 while dashed box 256 represents RU#2. Each RU receives a time division multiplexed (TDMA) stream of digital data from the various devices that share the communication capability of coaxial cable/transmission media 251. For example, RU#1 is coupled to an interactive television 258, and is also connected to a personal computer 260 and a videophone 262. An interactive television is a modified conventional TV wherein a user can send digital signals to the CU in response to things he or she sees on the television or as requests for specific video selections. Each of these devices has a digital data input/output port which is coupled to a time division multiplexer switch 264. The switch 264 combines data coming in from devices by placing bytes of data from each device into timeslots in a time division multiplexed (TDMA) stream of digital data on line 266. The TDMA stream for RU#2 is on line 267.

Each timeslot/channel can contain 9 bits of which 8 bits are devoted to encoding the data for that channel and 1 bit is used for management and control purposes. The 9th bit can be used as a tiny side channel for side conversations over and above the main data traffic for the channel. In alternative embodiments, any other number of bits per timeslot may also be used.

The 9 bit groups of bits in each timeslot are divided into three 3-bit groups called triple bits or tribits herein. These three triple bits from the time domain are a very short burst of data which get spread out in time in the code domain. The triple bits are spread out over time by selecting three different triple bit columns from an array in a framer memory described below for each incrementation of the read pointer and multiplexing these linear arrays of triple bits through the transmitter circuitry. The three columns of triple bits of each frame each span all 144 time slots of the TDMA input streams.

All symbols generated for the first frame for all active channels are encoded using orthogonal codes, and the results are combined for simultaneous transmission over the shared transmission media using a synchronous CDMA modulation scheme.

Each RU is capable of receiving data in up to 144 of the timeslots in the input TDMA stream and is capable of getting all that data to the CU. However, only 144 total channels are available for all RUs to share, so rarely does one RU use all 144 channels. Each RU requests the number of timeslots or channels it needs to provide services requested by the subscriber. This request is sent via a message on a command and control channels to the CU. The CU then sends a reply message telling the requesting RU which channels have been assigned to it. The CU will not assign the same channel to multiple RU's.

Each RU then uses the appropriate orthogonal codes in the encoders coupled to receive the data from the timeslots to which it has been assigned. For example, if RU#1 is assigned channels 1 and 2, and RU#2 is assigned to channel 3, RU#1 will use orthogonal codes #1 and #2 in the encoder coupled to receive the data in timeslots 1 and 2, and RU#2 will set orthogonal code #3 into the encoder coupled to receive the data from timeslot 3. That is, one orthogonal code is assigned to each payload channel and each command and control channel in the embodiment shown in FIG. 11.

The transmit channel of each RU of the embodiment shown in FIG. 11 has a splitter like splitter 268. The purpose of this splitter in transmitting data to the CU 252 is to split out the data in each time slot of the time division multiplexed incoming data stream and apply the data from each time slot to one of a plurality of orthogonal code encoders for encoding using one orthogonal code from the code set used on the system. For example, in the hypothetical given above, the data from time slot #1 is output from the splitter on line 270 which is coupled to the data input port of orthogonal code #1 encoder 1, block 272, and the data from time slot 2 is sent via line 271 to encoder #2, block 273. The encoder 272 encodes the channel 1 data from time slot 1 using code #1 of the orthogonal code set in use in the system (actually, one row of the code matrix that defines the entire code set), and outputs the resulting modulated signal on line 274 which is coupled to one summing input of a summer node 276. Encoder #2, block 273, encodes the data from channel 2 in time slot 2 using code #2 from the orthogonal code set (a different row of the code matrix—rows or columns of the code matrix may be used interchangeably in the matrix multiplication of the transmit process so long as the matrix multiplication of the received signal vector times the transpose matrix is the opposite, i.e., if rows are used on the transmit side, columns are used on the receive side).

A controller circuit (not shown) in each RU which is coupled to communicate with the CU over a management and control channel and which is also coupled to each of the orthogonal code encoders, receives the channel assignments for the RU and selects the unique orthogonal code for the channel assigned. The controller circuit then controls each encoder to use the appropriate orthogonal code assigned to the channel when encoding data for that channel. Each encoder in the RUs which is active must use a different, unique, orthogonal code. No encoder will use the same code as another "active" encoder. An "active" encoder is an encoder which has been assigned to encode a particular channel for its RU.

After the data from the appropriate timeslot is parsed out of the TDMA stream by the splitter 268 and guided to the proper encoder and the proper orthogonal code is selected for use in the encoder, the data in the assigned timeslots/channels for each RU is encoded. This is done using the appropriate orthogonal codes assigned to those channels. The results are then transmitted to the CU simultaneously from all RUs over the shared transmission media 251. More precisely, the energy representing the data from the various timeslots/channels is spread out over the entire 125 microsecond duration of the frame by the action of the encoders. Because the data from the various timeslots is encoded using orthogonal codes, no interference between the data occurs during transmission of the encoded symbols in the code domain.

There is one encoder for each timeslot in each RU in the embodiment shown in FIG. 11. Each encoder spreads out the energy from its assigned channel over all the chips in the frame. Each encoder in each RU has its encoded output signal coupled to a summing input of a summer like summer 276. The function of the summer in each RU is to sum all the encoded signals and output them on a subscriber branch coaxial cable or other transmission media like branch cable 278. The transmission media like branch 278 are coupled through a directional coupler like coupler 280 to the main coaxial cable/transmission media 251. The combined output signals from each RU are added to the composite signal on the main coaxial cable by one or more directional couplers symbolized by coupler 280.

At the CU, the code domain signals on shared transmission media 251 are decoded by the decoders 282, 284 etc., and the resulting data is put back into the appropriate timeslots in the time domain TDMA data streams for output to the various equipment that is providing the requested services.

At the CU 252, the composite signal received from transmission media 251 is distributed to each of a plurality of decoders. A decoder for channel 1 is represented by block 282. This decoder uses the transpose of the code matrix which was used to encode the channel 1 data to extract any channel 1 information encoded into the composite signal by RU#1 (or whatever RU was assigned to channel 1). This decoding is done in the manner described previously in the discussion of FIGS. 1-3.

Likewise, the decoder for channel 2, represented by block 284, using the transpose code matrix to decodes any channel 2 information encoded into the composite signal by RU#2. In the embodiment of FIG. 11, there is one decoder in the CU for each channel in use, and each decoder uses the appropriate column of the transpose matrix $[c^T]$ corresponding to the code used by the corresponding RU to encode the channel being decoded. The resulting decoded digital signals are output on lines 286 and 288 to a switch which reassembles these digital signals to reproduce a composite of the time division multiplexed data streams which entered the RUs on lines 266, 267 etc.

In the embodiment shown in FIG. 11, only the transmit channels are shown and individual encoders are shown for each channel. In a more practical embodiment, only a single encoder is used in each transmit channel in each modem. This encoder is time shared to encode the data from the various timeslots. Usually, the single encoder is a suitably programmed microprocessor. Each RU modem also has a receive channel (not shown) which is structured similarly to the receive channel circuitry in the CU shown in FIG. 11. In some embodiments, the decoding in the receive channel and the encoding in the transmit channels are both done using a single microprocessor which has been suitably programmed. The choice of whether to use a shared microprocessor or multiple individual channels of hardware is largely dependent on data rate and cost considerations. If the data rates are high, multiple individual channels may be required. If data rates are low enough to use a shared microprocessor and cost is to be minimized, the shared microprocessor is preferred.

Typically, one RU will use less than all the 128 payload channels, but if one RU or a handful are using all 128 channels, no other RU can be awarded any bandwidth since only one RU can be on any particular channel at any particular time. Obviously, the orthogonal code set selected must have at least 128 codes. However, n the preferred embodiment, there are 128 data channels plus 16 management and control channels, for a total of 144 channels. Of the 16 management and control channels, 4 are access channels which carry traffic from the RUs to the CU requesting bandwidth and relinquishing awarded channels after the RU is finished using the channels awarded by the CU. Because there are 144 separate channels, an orthogonal code set having at least 144 unique, orthogonal codes must be used. Each channel has a maximum 72 kilobits per second data capacity in the preferred embodiment.

Channel allocation by the CU can take any one of a number of different forms. For example, the RUs could have a fixed allocation of channels or channels could be awarded in any number to any RU based upon need where the CU polls the individual RUs for their needs or the RUs transmit their needs asynchronously to the CU and the CU arbitrates between the requests to allocate the available channels. Likewise, one RU may have security considerations the require one channel to be dedicated to it at all times and no other RU is allowed to be on that channel as controlled by channel awards by the CU given in messages to the individual RU's. Alternatively, some channels can be made available for all RUs to use with the RUs themselves resolving contentions. In the preferred embodiment, there are four channel allocation schemes which are implemented either individually or in any combination in the CU channel allocation circuitry: (1) a reservation scheme where the RUs bid for bandwidth and the CU reserves certain channels to each of the RU's; (2) a contention mechanism where the RUs are notified by the CU of what channels are available to all RUs for traffic, and where the RUs transmit on those channels at will with contentions detected by the CU and contention notification messages to the RUs in contention to enter contention resolution procedures; (3) polling where the CU inquires of each RU sequentially whether it needs bandwidth and awards bandwidth as needed as determined from the polling with arbitration when not enough channels are available to meet all requests; (4) fixed allocation of the available channels to specific RU's. In the preferred embodiment, all four schemes can be used individually at times or any combination of the schemes can be used at times. Which channel allocation schemes are in use at particular times is established by the configuration data set up by the user. For example, one fourth of the channels may -be put on a reservation scheme, one fourth of the channels may be left for contention, one fourth of the channels may have fixed allocation and the last fourth of the channels may be reserved for polling allocation. Each of these different mechanisms for allocation of bandwidth is believed to be known, standing alone. However, the applicant's believe it is new to provide a CU that can use any one of these methods or any user programmable combination of all four methods for user programmable groups of channels, all as established by entry of configuration data by a user during a configuration process.

Since the channel allocation mechanism is centralized in the embodiment of FIG. 11, the RUs have no burden other than to ask for the bandwidth they need. However, in alternative embodiments, the RUs may "bid" for channel allocations and some arbitration process carried out locally in the RUs may resolve any contentions.

By using spread spectrum modulation on the main coaxial cable 251, all the problems associated with pure time division multiplexing or pure frequency division multiplexing on such shared transmission media are avoided. In addition, use of the synchronous CDMA multiplexing and modulation technique with channels assigned on a nonfixed, flexible as-needed basis according to the teachings of the invention eliminates the waste of the so-called synchronous time division multiplexing schemes. In synchronous time division multiplexing schemes, each RU would have a fixed assignment of time slots, and those time slots would be transmitted even if they were empty, i.e., the RU had no traffic to send or receive during some or all of its time slots. Synchronous TDMA multiplexing schemes are described in "Data and Computer Communications" by Dr. William Stallings, at page 211–213, Macmillan Publishing Co., New York (4th Ed. 1994) ISBN0-02-415441-5 which is incorporated by reference herein.

Figure 19:
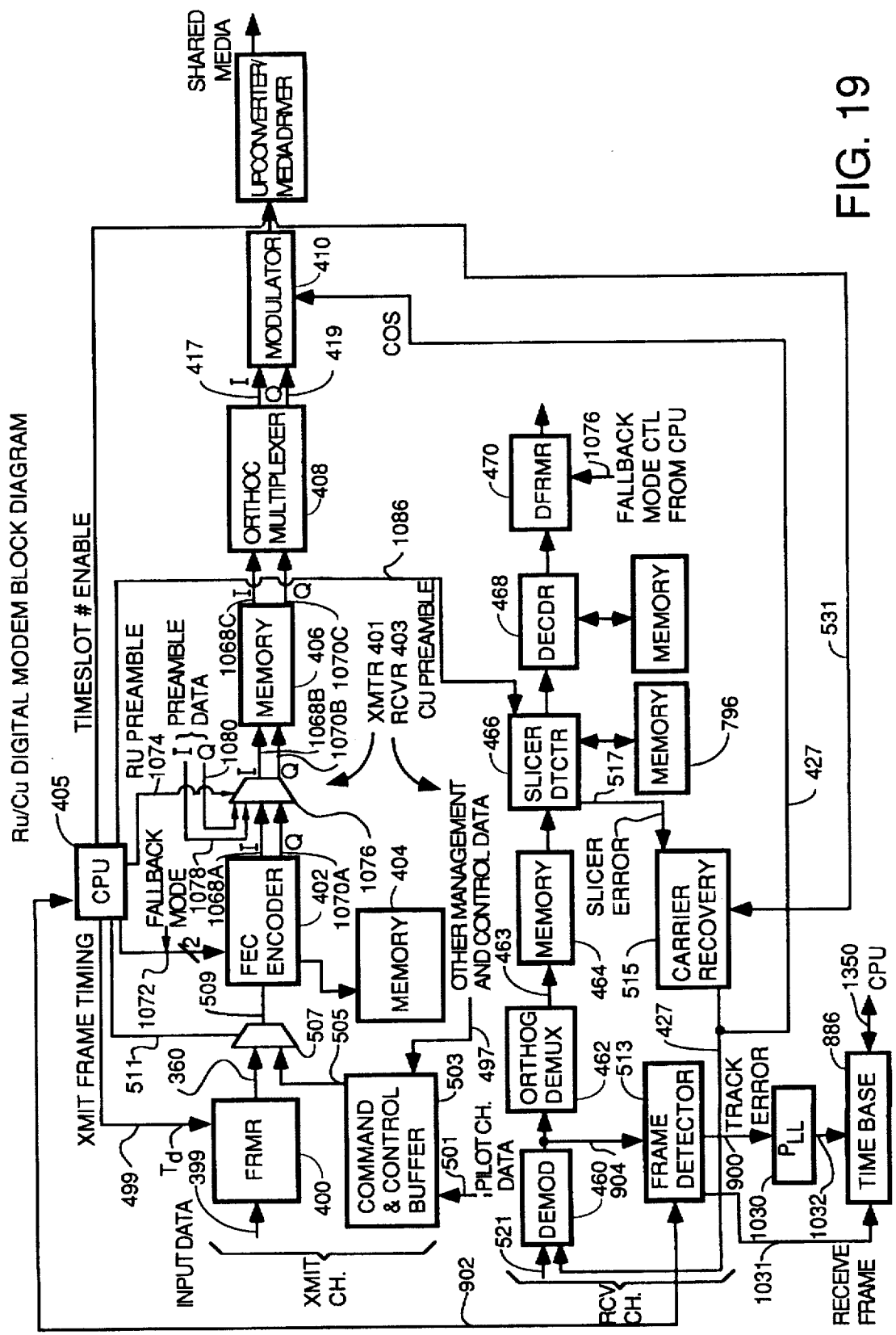
FIG. 19 is a block diagram of the preferred embodiment of the transceiver circuitry included in each RU and CU.

Referring to FIG. 19, there is shown a block diagram of the preferred embodiment of a transceiver for use in the modem of each RU and CU. The transmit channel of the transceiver uses a framer 400 to compose from the TDMA data stream the symbols of each frame for encoding and transmission. The output data stream from the framer is an array of tribits that span the entire 144 timeslots, with three such arrays presented during each frame. Each tribit is a symbol in a frame for transmission.

In the preferred embodiment, the circuitry of the transceiver is virtually all digital, so the arrays of tribits are true arrays elements of which are used sequentially in the matrix multiplication of orthogonal encoding.

In analog embodiments, the arrays of tribits will be streams of tribits, with three separate streams per frame.

Before finishing the description of the rest of the transceiver circuitry in FIG. 19, the framer circuit 400 will be described in more detail. The RU's and CU all utilize framer circuitry to implement the delays needed to transmit data in synchronization to each other. The framer is comprised of a FIFO memory and supporting circuitry that stores incoming digital data from the time division multiplexed data stream received by each RU and CU. The symbols of each frame are composed by output of the data from the FIFO memory in a different way than it was loaded during each frame. The basic idea is to pass the 9 bit groups of each time slot through the analog of a FIFO delay line implemented by a memory so as to simultaneously implement the delay imposed by each RU and CU needed for synchronization while providing a convenient way to compose the symbols of each frame from the data in the TDMA data stream.

Figure 12:
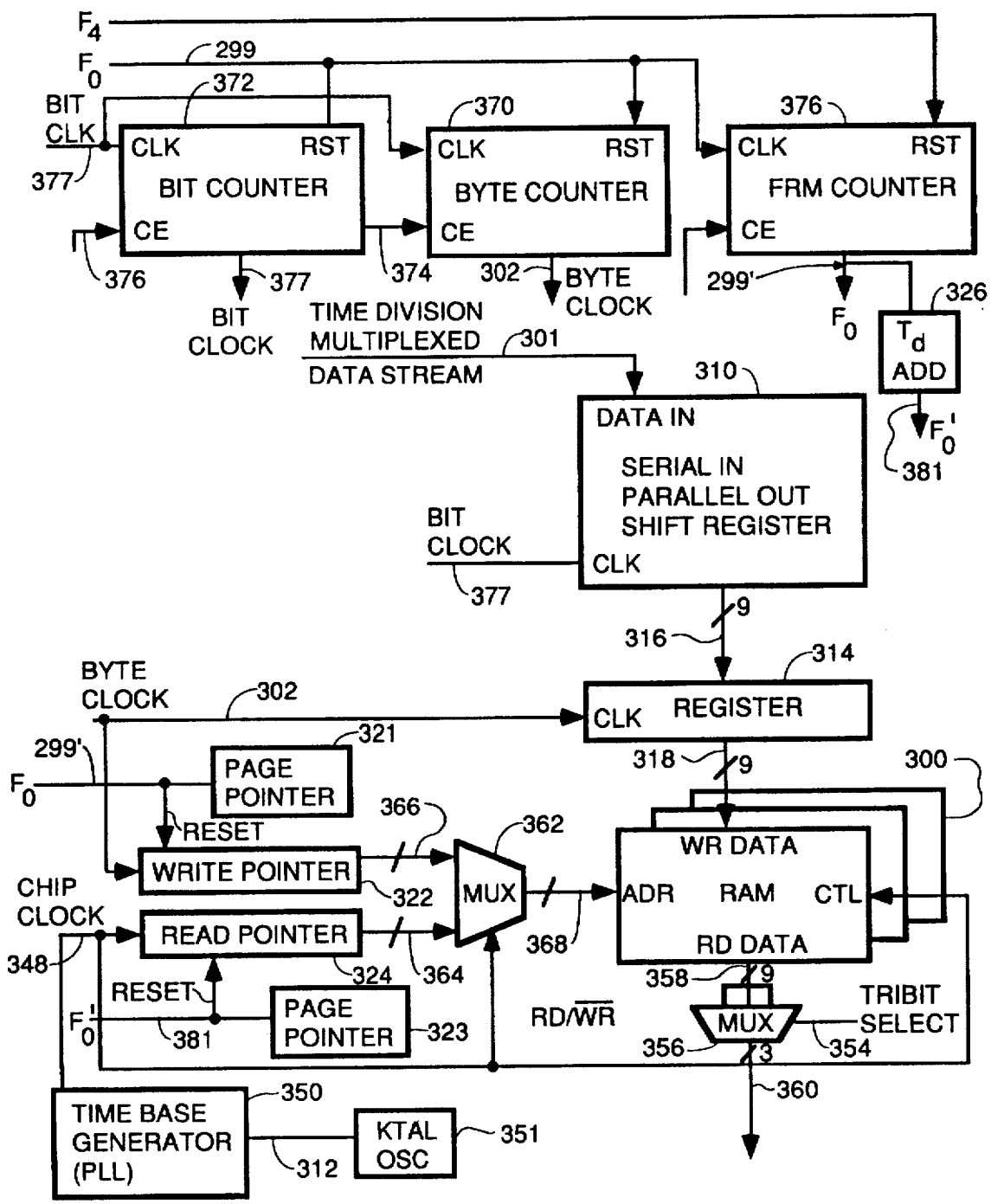
FIG. 12 shows the circuitry that implements the framer in the preferred embodiment.
Figure 13:
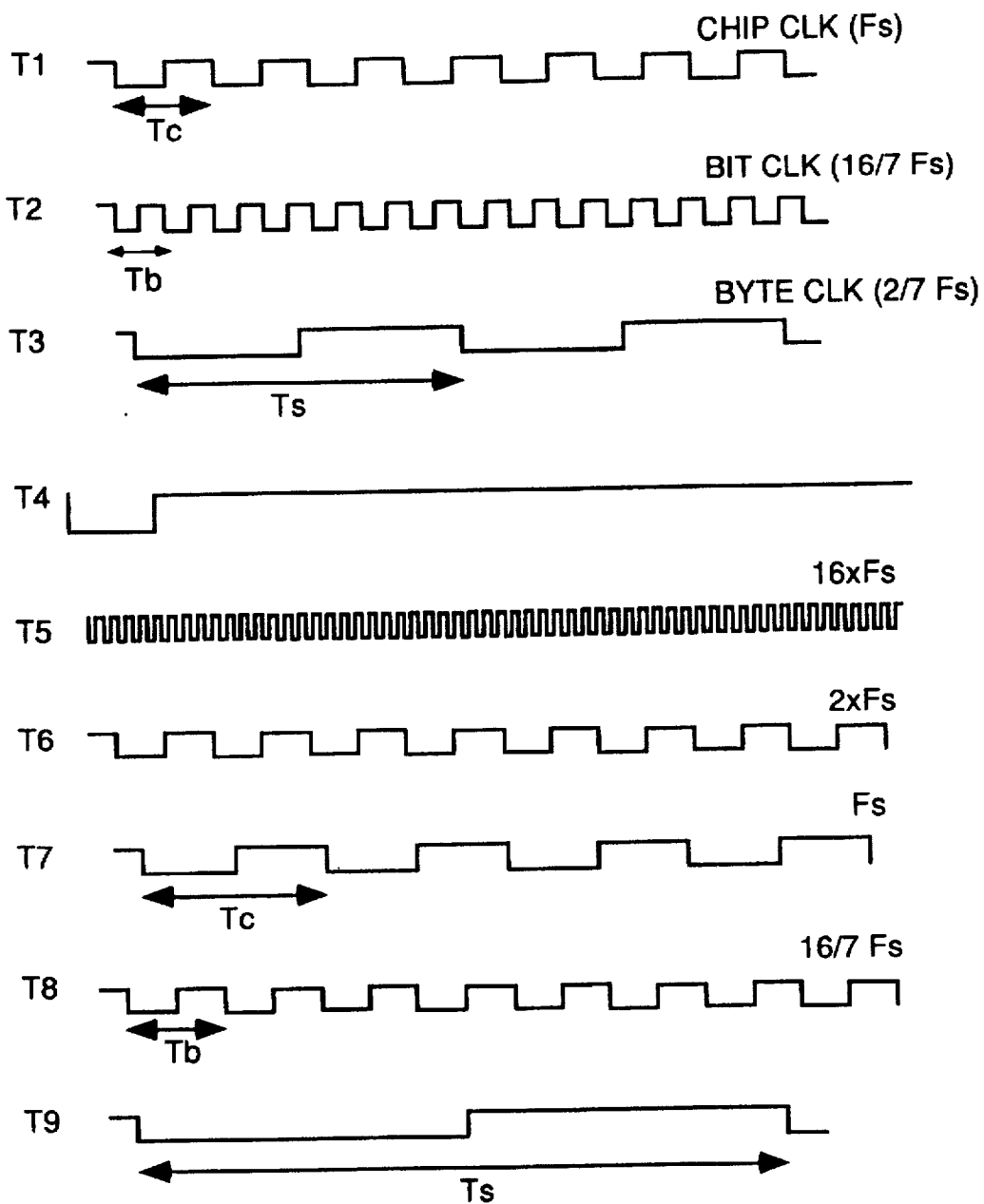
FIG. 13 shows the timing relationships between the chip clock signal which sets timing in the code domain and the bit and byte clocks which set timing in the time domain.

FIG. 12 shows the circuitry that implements the framer in the preferred embodiment, and FIG. 13 shows the timing relationships between the chip clock signal which sets timing in the code domain and the bit and byte clocks which set timing in the time domain. FIG. 13 also shows a number of other signals generated by time base generator 350. The basic period from which all other signals are generated is the chip clock signal shown on time line T1 of FIG. 13. The relationships between the periods of the various signals in FIG. 13 is shown in parentheses at the right edge of each signal. For example, for the bit clock signal shown on time line T2 of FIG. 13, for every 7 periods of the chip clock signal, there are 16 periods of the bit clock signal. For every 7 periods in the chip clock signal, there are two periods in the byte clock signal shown on time line T3 in FIG. 13. Handling of the TDMA stream is synchronized to the bit clock and byte clock signals.

Figure 18:
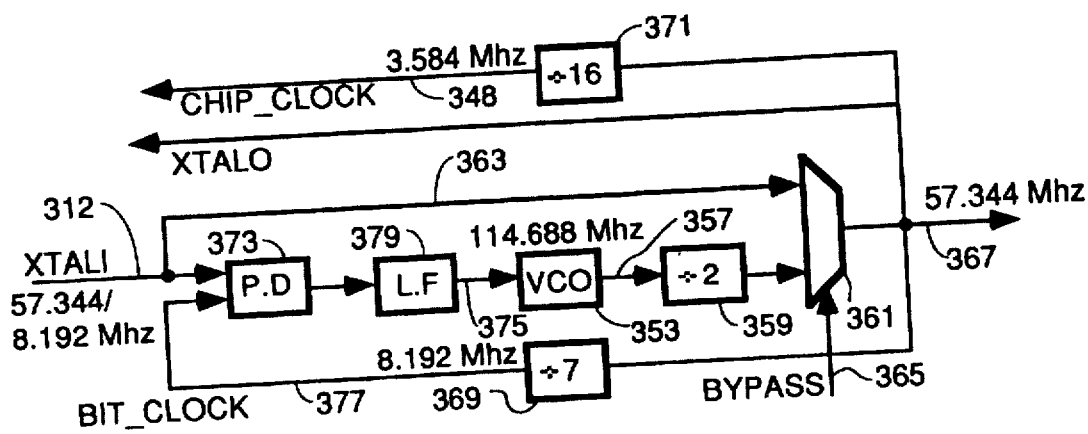
FIG. 18 is a block diagram of the time base generator.

The chip clock signal on line 348 of FIG. 12 is generated by a time base generator PLL 350 and is synchronized with the TDMA data stream by the action of the PLL in keeping both the chip clock and bit clock signals synchronized with the crystal oscillator reference signal. A block diagram of the time base generator 350 is shown in FIG. 18. A voltage controlled oscillator 353 operating at a frequency of 114.688 Mhz sets the basic operating frequency. The output frequency of the VCO on line 357 is divided by two by a divide-by-two counter 359. The result is coupled to one input of a multiplexer 361. The multiplexer has as its other input the crystal controlled oscillator frequency on line 363. The multiplexer switching is controlled by a bypass signal on line 365 so as to normally select the output of the counter 359 and couple it to output line 367. The PLL time base generator generates the bit clock signal on line 377 by dividing the frequency of the signal on line 367 by a factor of 7 in a divide-by-seven counter 369 to generate a bit clock signal on line 377 having a frequency of 8.192 Mhz. The chip clock signal on line 348 is generated by dividing the frequency on line 367 by a factor of 16 in a divide-by-16 counter 371 to generate a chip clock signal having a frequency of 3.548 Mhz. The bit clock and chip clock signals are kept synchronized to the crystal frequency by a phase detector 373 which compares the phase of the crystal signal to the phase of the bit clock signal and outputs a signal which is coupled to the frequency control input 375 of the VCO through a low pass filter 379. The bit clock signal and phase detector causes the PLL to force the transitions of the chip clock signal to line up properly with the bit clock transitions in the relationship of 16 periods of bit clock for every 7 periods of chip clock.

The relationships between timing in the time domain and timing in the code domain are as follows:

There are 144 total time slots or channels in the TDMA stream, of which 128 are payload time slots and 16 are management and control time slots;

Each time slot or channel in the TDMA streams carries 9 bits of digital data synchronized with the bit clock;

One time slot worth of data or 9 bits is stored in the framer for each cycle of the byte clock;

1 frame=144 times slots, each with 9 bits plus 16 chips for the alignment gap;

1 frame also equals 3 symbols plus the 16 chip periods of the alignment gap=448 chip periods;

1 symbol=144 chip periods;

1 gap=16 chip periods;

For every 16 bit clock periods, there are 7 chip clock periods, and for every byte clock period, there are 9 bit clock periods.

To implement the delay necessary in each RU and CU transmit channel circuitry to maintain frame synchronization, consider the following with reference to FIG. 12. The data stream coming into the framer circuitry during each time slot is stored in a different address in memory 300 in FIG. 12 at the data rate of the byte clock signal on line 302.

The byte clock signal on line 302 is generated by a byte counter 370 shown at the top of FIG. 12 which generates a byte clock signal transition on line 302 every 9 cycles of the bit clock signal on line 377 from the time base generator 350. Data from the time slots/channels in the time division multiplexed stream of serial data on line 301 is shifted serially into a serial-in, parallel-out shift register 310 at the bit clock rate of the signal on line 377. The byte clock signal on line 302 causes a register 314 to store the current 9-bit, parallel format output of the shift register on bus 316 after each 9 new bits are shifted into shift register 310.

The 9 bit parallel format output of the register 314 is presented on 9-bit bus 318 to the write data input port of memory 300. Thus, a new 9-bit group of data from the TDMA stream is presented for storage on each cycle of the byte clock signal. Each 9-bit group of data from the TDMA stream is stored in a different memory location of memory 300 as will become clear from the discussion of the address generation circuitry described below.

Data is read out of memory 300 at the same rate at which it was stored, but starting at some programmable time after the data is stored, thereby implementing the variable delay needed to maintain frame synchronization with the CU frame timing. This programmable delay $T_d$ is set by the difference in addresses between the address stored in a receive frame counter (read pointer) and the address stored in a transmit frame counter 324 in FIG. 15 (write pointer).

Figure 16:
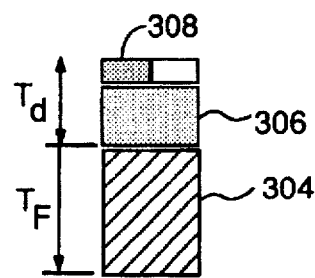
FIG. 16 represents portions of memory 300 with the stippled portion representing the number of addresses difference between the position of the read pointer and the position of the write pointer to implement the delay.

To illustrate this concept, FIG. 16 represents portions of memory 300 with the stippled portion representing the number of addresses difference between the position of the read pointer and the position of the write pointer to implement the delay $T_d$. The cross hatched portion 304 represents one frame of 9-bit bytes while the stippled portions 306 and 308 represent the amount of the delay $T_d$, where portion 306 represents a portion of the delay $T_d$ expressed in full 9-bit bytes, and portion 308 represents the remainder of the delay $T_d$ expressed as part of a byte. In other words, the delay $T_d$ may be some fraction of the number of bit clocks making up an entire 9-bit byte. This is because the delay needed to maintain frame synchronization may not work out to be an integer number of byte clocks.

Figure 15:
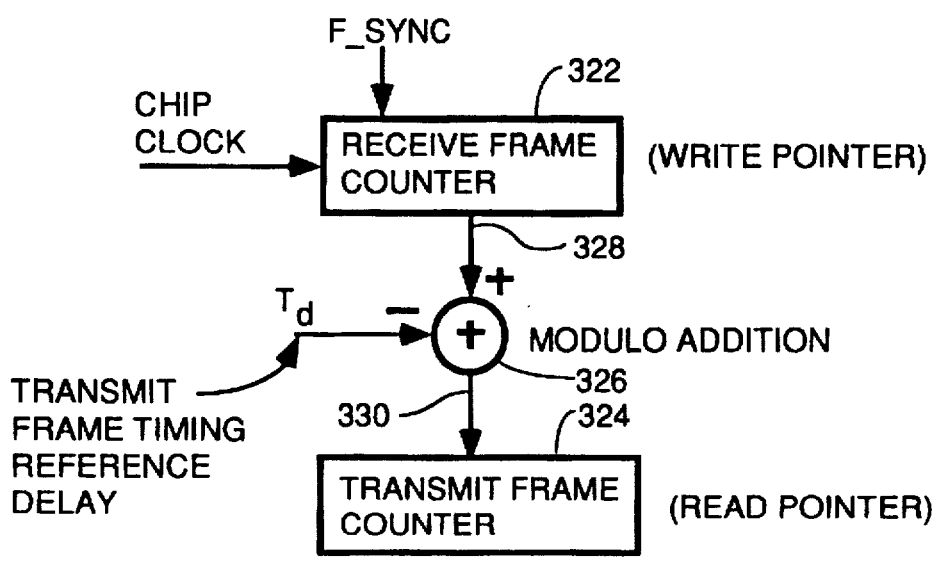
FIG. 15 is a diagram illustrating in block diagram form how the delay necessary in each RU and CU to maintain frame synchronization system-wide is achieved.

FIG. 15 shows how the time delay $T_d$ is implemented using a receive frame counter 322 that generates the write pointer address controlling where incoming data is stored in the memory 300 and a transmit frame counter 324 that generates a read address pointer that controls the read address from which data is read for transmission. The F_sync signal on line 326 resets the write pointer in counter 322 to zero at the beginning of each new frame. A modulo adder 326 adds the number of chip clocks based upon the desired time delay $T_d$ to the output write pointer on bus 328 and inputs the result into the transmit frame counter 324 as the read pointer. The value of $T_d$ is varied on a trial and error basis during the synchronization process until the gap is hit and the CU sends a message to whatever RU is synchronizing telling it to freeze $T_d$ at the value that caused the gap to be hit by the barker code.

Figure 14:
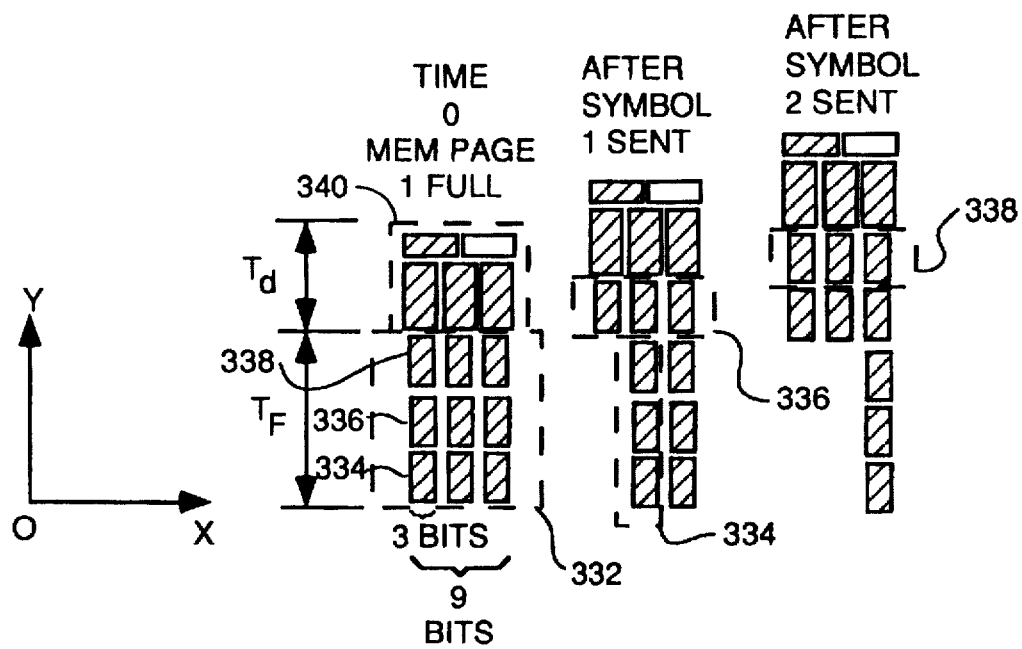
FIG. 14 is a memory filling diagram that illustrates how entire 9-bit bytes are received continuously, but 3 bit tribits for each of 128 data channels are sent out simultaneously to compose the symbols of each frame.

FIG. 14 is a memory filling diagram that illustrates how entire 9-bit bytes are received continuously, while 3-bit tribits for each of 144 channels are sent out simultaneously to compose the symbols of each frame. FIG. 14 graphically illustrates how the frame memory 300 fills and is emptied during this process. Frame memory 300 has 144 memory locations corresponding to the 144 channels of the system on each of three pages. While one page is being filled, another page is being simultaneously emptied at the same rate. Each memory address on each page can store the 9 bits of data from one of the 144 time slots in the TDMA stream. 16 memory locations on each page are reserved for the storage of management and control data to be sent across the 16 management and control channels. In FIG. 14, address numbers increase with an increasing Y coordinate.

At time (0) in FIG. 14 (the leftmost column), page one of the memory is shown as completely full with one frame of data comprised of three vertical columns of three crosshatched blocks apiece. Each column of three blocks, such as blocks 334, 336 and 338 represent one symbol, each symbol having 48 tribits therein. The middle column of FIG. 14 represents the state of fill of the memory after transmission of the first symbol comprised of blocks 334, 336 and 338. The rightmost column of FIG. 14 represents the state of fill of the memory after transmission of symbol 2 comprised of blocks encircled by dashed line 334.

The width along the X axis of each individual crosshatched block in FIG. 14 is equal to the 3 bits of a tribit, and the entire width of a column of blocks is equal to the 9 bits of a time slot. The positive x direction represents increasing time in the time domain. In other words, the first 9-bit byte that is stored is stored in the lowest row of the lowest three blocks in the left column with increasing time in the TDMA stream extending from left to right.

The blocks surrounded by dashed line 332 in the leftmost column represent 144 memory locations, each storing the 9 bits from one of the 144 time slots in one frame of data. The three crosshatched blocks 334, 336 and 338 represent the first symbol of the first frame, each symbol storing 48 tribits. Note in the middle column, after transmission of the first symbol in the frame, these three blocks are gone. Note also that the data of symbol 1 is read out of the memory "across time", i.e., along the y axis, thereby interleaving the data from the first tribits of individual channels in the time domain into different temporal relationships in the code domain and spreading out the energy of the time slot data over the entire frame interval. This is part of the teaching of code division, multiple access or CDMA modulation schemes.

The three blocks within dashed box 334 in the middle column of FIG. 14 represent the second symbol of data that is to be transmitted in the first frame. Note that these three blocks are gone in the rightmost column representing the state of page one of the memory fill after transmission of the second symbol.

While the first and second symbols are being transmitted, another page of the memory 300 continues to fill up as the data from new timeslots is received. For example, while symbol 1 from page 1 of the memory is being transmitted during the first frame, the data in the three blocks encircled by dashed line 336 in the middle column is received in page 2 of the memory and stored. Thus, while one third of the data from page 1 is read and transmitted, one third of page 2 of the memory is filled with new data. Likewise, while the second symbol of page 1 is being transmitted, the data represented by the three blocks encircled by dashed line 338 in the right column is received and stored in page 2 of the memory.

The blocks encircled by dashed box 340 represents the delay $T_d$ implemented by modulo adder 326 in FIG. 15 and the 16 chip alignment gap.

Figure 17:
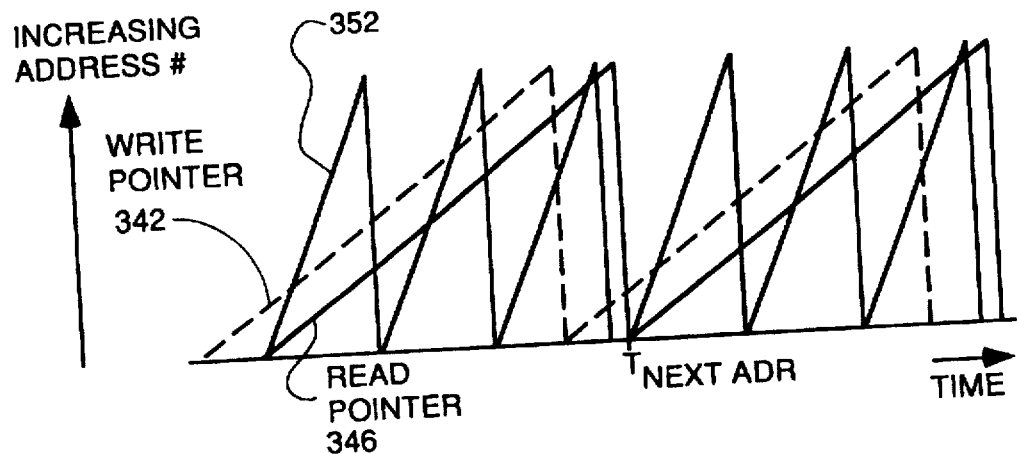
FIG. 17 is a timing diagram showing the relative rates of incrementation of the read and write pointers in the framer.

FIG. 17 is a diagram of the relative rates of address incrementation of the read and write pointers used to manage the framer buffer memory 300 including the relative timing of address incrementation for reading the tribits. Dashed line 342 represents the rate of address incrementation of the write pointer generated by counter 322 in FIGS. 12 and 15. This counter counts transitions in the byte clock signal on line 302 in FIG. 12, with the byte clock signal shown on time line T3 in FIG. 13. Every cycle of the byte clock signal causes register 314 in FIG. 12 to latch a new 9-bit byte therein and present it on bus 318 to the write data port of two-port memory 300. Every cycle of the byte counter also causes write pointer counter 322 to present a new write pointer address on bus 366 for use in controlling where the data on bus 318 is stored. A multiplexer 362 having its output coupled to the address port of memory 300 and having as its inputs the write pointer on bus 366 and the read pointer on bus 364 is suitably switched so that the write pointer and read pointer addresses are presented at the appropriate times at the address port to implement the memory filling and memory reading operations described herein.

The bit clock signal on line 377 in FIG. 12 is used to clock the serial-in, parallel out shift register 310. The bit clock signal is generated by the time base generator shown in FIG. 18 and is counted by a modulo 9 bit counter 372 shown at the top of FIG. 12 for purposes of helping generate the byte clock signal on line 302 in FIG. 12. This counter 372 counts the bit clock signal on line 377 from time base generator 350 modulo 9 and outputs a transition to logic 0 on line 374 after every 9th bit period. The transition on line 374 acts as a count enable signal to byte counter 370 to enable incrementation of the byte counter 370 by the next bit clock cycle. This generates the byte counter signal on line 302. The bit counter 372 is always enabled by the hard wired count enable signal on line 376. Both the bit counter and the byte counter are reset to 0 by asserting the $F_0$ signal on line 373 for fast resetting/resynchronization of the system. The $F_0$ signal occurs at the end of each frame. The $F_0$ signal is generated by a portion of the time base generator not shown in FIG. 18, and is counted as a clock signal by frame counter 375 which outputs a synchronized $F_0$ signal on line 373. The frame counter 376 is reset every 4th frame by a super frame signal $F_4$.

The time delay $T_d$ necessary for hitting the alignment gap with a barker code transmission is added to the $F_0$ signal on line 373 by the modulo adder 326 to generate the $F_0'$ signal on line 381. The $F_0$ signal on line 373 also increments the page pointer 321 for the write pointer and simultaneously resets the write pointer 322 to zero at the end of each frame so as to begin writing again at address 0 of the next page.

The delayed $F_0'$ signal on line 381 increments the page pointer 323 of the read address circuitry and simultaneously resets the read pointer counter 324 to zero so as to begin reading at address 0 of the next page at the end of the frame.

Returning to the consideration of FIG. 17, solid line 346 represents the rate of emptying the frame memory 300 in FIG. 12. This rate of emptying is based upon incrementation of the read pointer counter which counts the chip clock signal on line 348 from time base generator 350. Since each symbol stores 144 tribits from 144 different channels and since there are three symbols and a 16 chip gap in each frame, the total number of chips in a frame is 448. Since all the 432 tribits of all three symbols of the frame must be read out while the byte counter is counting to 144 to store a frame's worth of 9-bit bytes of data from 144 channels or time slots, the read pointer is incremented on the chip clock signal. This causes all 432 tribits from all three symbols of a frame to be read out while the next frame of data is being stored thereby preventing overflow of memory 300. This is why the read pointer line 346 in FIG. 17 is shown as emptying the memory at the same rate as the write pointer fills it.

Line 352 in FIG. 17 represents the rate of incrementation of the read pointer counter 324 in FIG. 12. The read pointer counter increments on each cycle of the chip clock signal such that it increments from 0 to 143 during the time to read all the tribits from the first symbol. This has the effect of causing the 9 bits of data from each of the 144 timeslots or channels to appear sequentially at the read data output bus 358. However, it is desired to only unload all 144 tribits from a single symbol during one symbol time, so some switching on the output bus is needed, as described below.

Figure 20:
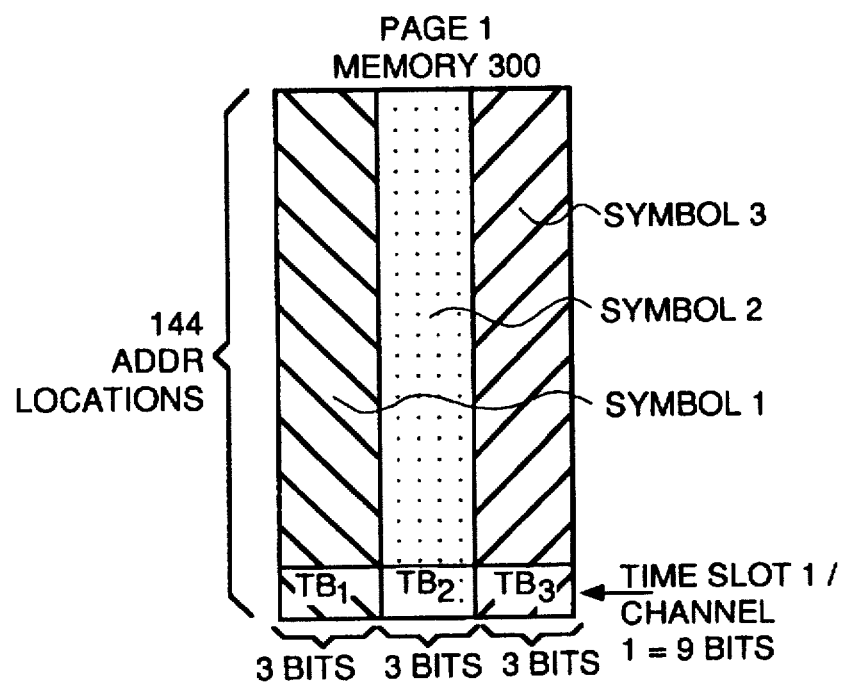
FIG. 20 is a diagram which helps illustrate the manner in which framer memory 300 is emptied for transmission.

A tribit select counter which is not shown in FIG. 12 coupled with a multiplexer 356 does this switching. This tribit select counter generates a tribit select signal on line 354 in FIG. 12 which controls switching by a multiplexer 356. This multiplexer has an input coupled to the 9-bit read data output port 358 of the memory 300. The tribit select counter counts at a rate to generate the select signal on line 354 in such a way as to cause only tribits from the first symbol to be output from the multiplexer 356 on bus 360 during the time that first symbol is being transmitted. FIG. 20 is a diagram which helps illustrate the manner in which framer memory 300 is emptied for transmission. FIG. 20 shows a completely filled page 1 of memory 300 in FIG. 12 comprising 144 memory addresses, each filled with one 9-bit byte, and divided into three columns of 3-bit tribits.

Each column, marked by the legends symbol 1, symbol 2 and symbol 3, is comprised of 144 tribits and represents one symbol of a frame. To send this frame of data, the read pointer will increment 144 times during the time the first symbol is being encoded. The state of the tribit select counter during this first 144 cycles is such that only the 144 tribits of symbol 1 will be output on bus 360 to the ECC encoder 402.

After the 144th incrementation, the read pointer counter 324 rolls over to zero and begins to count up to 143 again. At the 144th incrementation, the tribit select counter increments which causes the multiplexer 356 to select the middle column of tribits from symbol 2 in FIG. 20 for output on bus 360 in FIG. 12 to the ECC encoder 402 in FIG. 19. A similar process unloads the 144 tribits of symbol 3.

Bus 360 in FIG. 12 is coupled to ECC encoder 402 in FIG. 19. The ECC encoder is a state machine which, in conjunction with state memory 404, receives the stream of tribits and calculates a 4th ECC bit for each tribit. This 4th bit provides redundancy for error detection and correction and for use by a Viterbi decoder in the receiver in ascertaining with greater accuracy the data that was actually sent despite the presence of noise.

The stream of 4-bit symbol elements that are output from the ECC encoder 402 are stored in memory 406 as three different linear arrays corresponding to symbols 1, 2 and 3 in FIG. 20.

A multiplexer 362 having its output coupled to the address input of the framer memory 300 has two inputs: one is coupled to the output of the read pointer counter 324 and the other is coupled to the output of the write pointer counter 322. This multiplexer alternately couples the read pointer on bus 364 and the write pointer 366 to the address port 368 of the memory 300 on every cycle of the chip clock signal on line 348. The chip clock signal is also coupled to the control input of the memory 300 to serve as the RD/WR* control signal controlling whether the memory uses the address at port 368 in a read or a write transaction.

Returning to the consideration of FIG. 19, the output data streams from the framer on bus 360 may optionally be passed through an ECC encoder to add redundancy by calculating a 4th ECC bit for each tribit. In the preferred embodiment, the ECC encoder is used to provide greater accuracy and better noise immunity. The ECC encoder, in the preferred embodiment, is a state machine but it could also be a lookup table. For purposes of this discussion, it will be assumed that the ECC encoder is present.

Figures 21, 22:
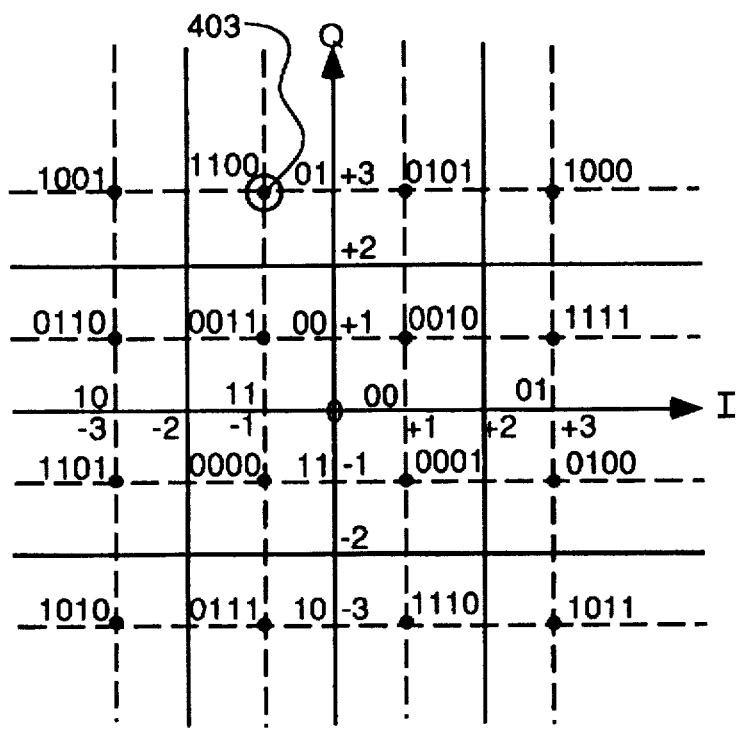
FIG. 21 maps each of 16 possible input points, i.e., permutations of the 4 bits in each symbol array to a point in space defined by the in-phase or I axis for the real part and the quadrature or Q axis for the imaginary part of each point.
FIG. 22 is a table listing all the possible 16 combinations of 4 bits in the Code column and the corresponding 2's complement digital representation of the real and imaginary coordinates for each combination in the inphase and Quadrature columns, respectively.

The output of the ECC encoder is an array of 4-bit digital numbers for each of symbols 1, 2 and 3. Each of these 4-bit numbers has two bits representing a real part and two bits representing an imaginary part. This convention is used to facilitate the constellation of input point mappings shown in FIG. 21. FIG. 21 maps each of 16 possible input points, i.e., permutations of the 4 bits in each symbol array to a point in space defined by the in-phase or I axis for the real part and the quadrature or Q axis for the imaginary part of each point. FIG. 22 is a table listing all the possible 16 combinations of 4 bits in the Code column and the corresponding 2's complement digital representation of the real and imaginary coordinates for each combination in the Inphase and Quadrature columns, respectively. For example, the input point 1100 maps to a point having a +3 imaginary coordinate and a −1 real coordinate on the constellation of FIG. 21. The mapping of FIG. 21 was selected to give maximum separation between points in the constellation for best noise immunity, but any other mapping would also work. Likewise, 2's complement representation is not required for the coordinates as they can be represented in other number systems as well.

After passing the tribit stream from the framer 400 through the ECC encoder, the resulting 4-bit data streams are stored as separate arrays for each symbol in memory 406. Each symbol is comprised of two linear arrays of 2 bit numbers: one array contains multiple 2-bit elements defining the real or inphase coordinates for all the elements of the symbol and the other array stores the 2-bit elements which define the imaginary or quadrature coordinate of each symbol element. The 144 array elements of each symbol define an information vector b for each symbol.

FIG. 23 shows the matrix multiplication process which is performed within code division multiplexer 408 in FIG. 19 to multiply each of the two linear arrays that define each symbol times the orthogonal code matrix [c]. In the preferred embodiment, the matrix multiplication is performed by a microprocessor, but any machine that can do the matrix multiplication will suffice to practice the invention.

The encoding in CDMA Mux 408 using the orthogonal or orthogonal, cyclic codes is done in two steps. First, a linear array information vector of just real or inphase coordinates of the symbol to be transmitted, symbolized by array 405 in FIG. 23, is multiplied by the code matrix 407. This operation generates another linear array of real or inphase coordinates along the R axis of a result space in a results constellation similar to the constellation of all possible input points shown in FIG. 21. This first linear array 409 defines the real axis coordinates in the result constellation for a plurality of chips from the first symbol to be transmitted.

Second, the same process is repeated for the imaginary coordinate linear array (not shown) for the same symbol the real coordinates of which were just processed. This results in another linear array comprising the imaginary or quadrature coordinates of the chips in the results array. This imaginary component array of the results array also is not shown in FIG. 23.

The real component array, represented by linear array 409, is part of an overall result or "chips out" array which contains both the real and imaginary coordinates of a plurality of chips to be transmitted. These chips map to points in the result space, and the points in the result space map to whatever points in the input point space that are defined by the real and imaginary components in the information vector array b, of which array 405 is the real part. The mapping between the input point space and the results space is defined by the contents of the code matrix and the orthogonal codes.

Before performing the matrix multiplication, the 2's complement values of the real and imaginary components of the information vector b input array are converted to their decimal equivalents as shown in FIG. 23. FIG. 23 is a simplified version of the system in which there are only 4 channels resulting in 4 elements of each symbol. The 4 real components of the information vector b shown in array 405 after conversion to their decimal equivalents, are, respectively, +3, −1, −1 and +3. This column of numbers is multiplied by the first row in the code matrix to yield the result 4 as the first real component in array 409 of the results array. This result is derived from summing the partial products as follows [(3×1)+(−1×1)+(−1×1)+(3×1)]=4. The next component down in the real part array 409, i.e., 0, is derived by multiplying the next real component down in the array 405 times the second row of the code matrix in a similar manner yielding [(1×−1)+(−1×−1)+(−1×1)+(−1×1)] =0. In the preferred embodiment, arrays 405 and 409 would be 144 elements long, and the code matrix 407 would have 144 elements in each row and would have 144 rows.

The resulting real and imaginary component linear arrays of the results or chips out array are stored in a memory within the CDMA Mux 408 which is not separately shown. The components of these two arrays are then output on separate I and Q buses to a modulator 410 where they are used to amplitude modulate the amplitudes of two RF carriers that are 90 degrees out of phase. The resulting two AM carriers are summed and output on the shared transmission media 412. This is done as illustrated in FIG. 24.

Figure 24:
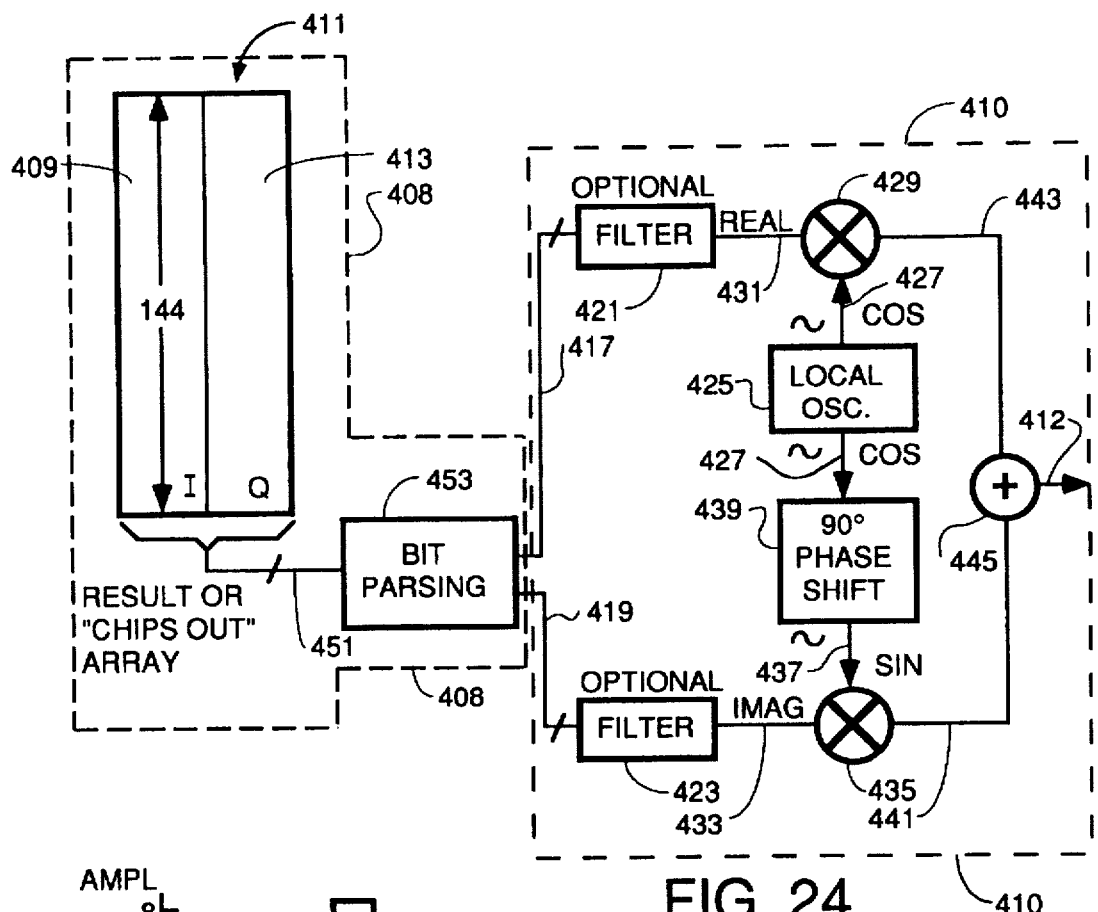
FIG. 24 is a block diagram illustrating more details of the components and operation of the multiplexer 408 and the modulator 410.

Referring to FIG. 24, more details of the coordination of the multiplexer 408 and the modulator 410 are illustrated. The result or chips out array 411 is stored in memory 411 within the CDMA Mux 408, and comprises the real or inphase array 409 and the imaginary or quadrature array 413 of the 144 result points or chips in the result space. On every chip clock, one result point or chip comprising a real component and an imaginary component is output on bus 451 to a bit parsing unit or bit splitter 453. The bit parsing unit 453 splits off the real component and outputs those bits on bus 417. The imaginary component will be parsed out, and those bits will be output on bus 419.

Figure 25:
FIG. 25 which is a plot of the changes in amplitude over time of the real components of the results vector for the array 409.

Because the RF signals that carry the information from the 144 channels must share the transmission media with other RF signals having adjacent frequencies, two optional digital passband filters 421 and 423 are used to limit the bandwidth of the signals on buses 417 and 419 to 6 Mhz to avoid interference with signals on neighboring frequencies. The digital signals on buses 417 and 419, when converted to their decimal equivalents usually have rapid transitions between levels in adjacent intervals. This is illustrated in FIG. 25 which is a plot of the changes in amplitude over time of the real components of the results vector for the array 409. These filters 421 and 423 are low pass filters which remove high frequency Fourier components caused by sharp edges in such signals which effectively round off corners of such signals and limit most of the power density in the Fourier spectrum of such signals to a 6 Mhz band centered around the frequency of the RF carrier generated by local oscillator 425. This local oscillator generates a sine wave, RF carrier at a frequency selected to be compatible with the switching rate of multiplexer 408 and to not interfere with existing cable TV service signals on adjacent frequencies.

The local oscillator cosine wave is applied to the carrier input 427 of an amplitude modulator 429 which also receives the filtered real component of each chip on bus 431. The modulator 429 modifies the amplitude of the carrier signal on line 427 in accordance with the amplitude of the decimal equivalent the real component on bus 431 and outputs the result on bus 443.

The imaginary or quadrature component of each chip, after filtering, is input on bus 433 to another amplitude modulator 435. This modulator receives at a carrier input 437 a sine wave of the same frequency as the cosine wave on line 427, but shifted in phase by 90 degrees by phase shifter 439. Modulator 435 modifies the amplitude of the sine wave in accordance with the amplitude of the imaginary component on bus 433, and outputs the result on line 441. Lines 441 and 443 are coupled to a summer 445 which sums the two waveforms and outputs them on the shared transmission media via line 412.

In some embodiments, the line 412 may be coupled to suitable interface circuitry to drive the signal on line 412 into a wireless or cellular system, a terrestrial microwave link, a coaxial cable of a cable TV, telephone or other system, a fiber optic link of a cable TV, telephone or other system, a local area or wide area network or any other media developed in the future for real time communication of data. Such interface circuitry is known and will not be described further herein.

Figure 26:
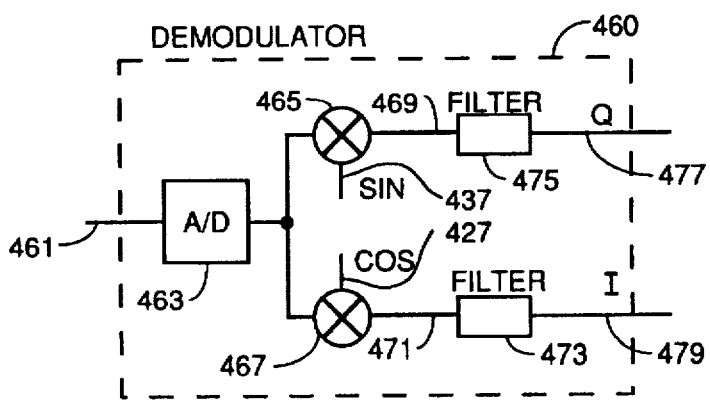
FIG. 26 is a more detailed diagram of the structure of the demodulator in the receive channel.

Returning to the consideration of FIG. 19, the receiver side circuitry of the transceiver will be described in more detail. As is the case with the transmit channel, the processing performed in the receiver may be performed using analog or digital or some combination of analog and digital circuitry. The receiver will be described as if all processing was digital as it is in the preferred embodiment. The signal received from the shared transmission media is passed through an analog-to-digital converter (not shown) and the resulting digital data stream is passed to a demodulator 460. FIG. 26 is a more detailed diagram of the structure of the demodulator. The received analog signal from the shared transmission media is coupled on line 461 to the analog input of an A/D converter 463. The stream of digital data is simultaneously fed to two multipliers 465 and 467. Multiplier 465 receives as its other input, a stream of digital values that define a sine wave having the same frequency as the RF carrier sine wave on line 437 in FIG. 24. Multiplier 467 receives as its other input, a stream of digital values that define a cosine wave having the same frequency as the RF carrier cosine wave on line 427 in FIG. 24. The results output on lines 469 and 471 is a digital data stream which basically defines the mix products comprised of a fundamental carrier frequency and upper and lower sidebands. Digital filters 473 and 475 filter out the desired sidebands that contain the real and imaginary parts of each chip or result point that was transmitted. The stream of quadrature or imaginary components of the received chips are output on bus 477. The stream of inphase or real components of the received chips are output on bus 479.

In some embodiments, the streams of real and imaginary components of the 144 chips of each symbol on buses 477 and 479 are stored in two linear arrays in CDMA Demultiplexer 462 in FIG. 19. The CDMA Demultiplexer 462 multiplies each of the real and imaginary component arrays times the transpose of the code matrix used by the CDMA Mux 408 of whatever RU or CU that transmit the data to reverse the orthogonal code encoding process. This matrix multiplication process results in two linear arrays of decoded chip real and imaginary parts for each symbol. These arrays are stored by the CDMA demultiplexer 462 in memory 464. In alternative embodiments, the CDMA Demultiplexer processes the two streams if real and imaginary components "on the fly" such that they do not have to be first stored as input arrays in a memory in the CDMA Demultiplexer 462.

After the linear arrays of real and imaginary components for a symbol is stored in memory 464, the result for each symbol is an array of received chip points in a received chip space having a real axis and an imaginary axis. The mapping by orthogonal code transformation from the constellation of possible input points shown in FIG. 21 leads to a constellation of possible points in a received chip space. A detector 466 examines the points in each of the arrays and compares the received chip points they define against the legitimate possible points in the received chip space. The detector, otherwise known as a slicer, is a known type of circuit and no further details are necessary herein. The function of the detector is to compare each received chip point and compare each point against the closest points in the constellation of legitimate possible points in the received chip space that could have been transmitted. The detector then makes a preliminary decision as to which the possible legitimate points in the received chip constellation each received chip is likely to be.

The detector 466 then outputs its preliminary determinations to a Viterbi decoder 468. Viterbi decoders are well known in the art of digital communications, and no further details will be given here except to state its function. The Viterbi decoder uses the 4th ECC bit in each 4 bit component of each symbol to detect and correct errors. This is done by performing the Viterbi algorithm to derive the most probable tribit path defined by the points actually sent from the path in the received chip space defined by the 4-bit components of the symbols actually received, after they have been processed by the detector. This Viterbi algorithm could be carried out by a programmed digital computer or by a dedicated hardware circuit.

The output data points from the Viterbi decoder are a stream of tribits. These tribits are stored in a memory in a deframer circuit 470 which functions to reassemble a replica of the TDMA data stream in the time domain from the incoming stream of chips or tribits comprising each symbol. This process is done by reversing the reading and writing processes described above in filling and emptying the framer memory 300 of FIG. 14. AN IMPLEMENTATION OF THE DATA LINK AND MAC LAYERS USING AN ATM PROTOCOL Referring to FIG. 27, there is shown a block diagram of a preferred embodiment of a system for implementing ATM protocol transmissions over a shared hybrid fiber coax (hereafter HFC) cable television network. The circuitry to the left of the shared HFC network 1000 represents the circuitry in the CU. The circuitry to the right of the HFC media 1000 represents the Customer Premises Equipment (hereafter CPE or RU) for customer #1. Although only one customer CPE is shown for simplicity, in an actual system numerous CPE units would be connected to the shared media 1000 simultaneously.

The CU system is comprised of a SAR circuit 1002 which is coupled to a plurality of devices and other networks that supply data for transmission to the CPEs and which receive data from the CPEs. For example, device #1 could be a video on demand player for receiving requests for pay per view movies and, in response thereto, mounting the requested movie and output of the video and audio tracks therefrom as a stream of digital data on bus 1004. Likewise, device #n could be an Ethernet or ATM network interface card coupling the SAR to a local area network (not shown) using an ATM or Ethernet transport protocol. The SAR may also be coupled to one or more service provider or other networks. For example, the block labelled network #1 may be the local and long distance telephone network interface. The block labelled network #2 may be an internet provider interface.

All of the networks and devices to which the SAR is coupled transmit and receive data byte streams bidirectionally on the buses like bus 1004 that connect the network or device to the SAR. The SAR functions to receive the data stream from each device and network interface and packetize the data from each device or network interface into 55 byte ATM cells which are output on bus 1006 in a slightly-modified, industry-standard, time-division-multiplexed Utopia+data stream. Utopia is a format for a time division multiplexed data stream that has transmitted in its timeslots 53 byte industry standard ATM protocol cells. ATM is a network transport protocol which provides an abundance of advantages over other network protocols in delivering multimedia services. Because ATM protocols guarantee quality of service, such as guaranteed bandwidth/bit rates, services like video teleconferencing, digital video and other high bandwidth consumption services which cannot tolerate interruptions in the flow of data can only be transmitted over ATM networks. The ATM protocol provides the ability to provide integrated voice, video and data services simultaneously over a single physical media. SAR 1002 receives these digital voice, data or video bytes and packetizes them into slightly modified ATM cells having 48 bytes of payload referred to as the cell body, 5 bytes of header information which, among other things, identifies the particular device at the RU for which the payload data is destined, and 2 bytes of "virtual link" header information. The virtual link header information includes two bytes which comprise the address of a formatter at the RU which will be explained below. These two bytes indicate to which of the RUs a particular ATM cell is directed. The data from the devices or network interfaces coupled to the SAR 1002 contain destination data indicating to which RU the data is bound and to which device or network interface card coupled to the destination RU/CPE modem the data is to be directed. This destination data is used by the SAR to compose the information in the standard ATM header and the virtual link header portions of each Utopia+cell output on bus 1006 for downstream traffic (toward the CPEs). This Utopia+TDMA data stream is transmitted to a multiplexer/demultiplexer 1008 which implements an interface between the ATM cells on bus 1006 and the synchronous code division multiplexed physical layer described elsewhere herein.

Conversely, SAR 1002 also receives a "Utopia+" format TDMA data stream carrying upstream traffic from the CPEs and depacketizes the ATM cells in the stream and uses the header information contained in the packets to transmit each cell out on the appropriate bus to the device or network interface indicated in the header information.

SARs (segmentation and reassembly circuits) are well known in the art of ATM networks, and no further details will be given here about their structure or operation.

The multiplexer/demultiplexer 1008 (hereafter referred to as the ATM-SCDMA interface 1008) receives the "Utopia+" time division multiplexed data stream from the SAR 1002 which contains all the downstream data originating in the devices connected to the SAR 1002 and destined for any CPE. The function of the multiplexer-demultiplexer 1008 is to add a 9th bit to each 8-bit byte of the "Utopia+" data stream so as to encode the sequence of 9th bits in the 55 8-bit bytes of each ATM cell so as to signal the CPE where the first byte of each ATM cell starts and to add CRC or other error detection and correction code data to be used by the CPE receiver in detecting and correcting errors in the header and payload information of the 55 8-bit bytes of the ATM cell. The ATM-SCDMA interface 1008 also serves to output the 55 converted 9-bit bytes of each ATM cell on bus 1010 as a time division multiplexed data stream having one 9-bit byte in each time slot in synchronization with the 8 MHz bit clock signal to which the circuitry in the SCDMA physical layer is synchronized. It is this time division multiplexed data stream of one 9-bit byte per timeslot on bus 1010 that is the raw data input to the synchronous code division multiplexing transceiver circuitry described above that implements the physical layer of the OSI model. All the interleaving, scrambling, code division multiplexing, code hopping, and Viterbi decoding that happens on the physical layer described in the parent applications incorporated by reference herein is effectively invisible to the Data Link and MAC layer protocols described herein. However, there is a tight coupling between the attributes and characteristics of the SCDMA physical layer and the methods of operation of the data link and MAC layer protocols of the claimed invention so as to be able to carry out an ATM protocol in the nonsymmetrical single point to multipoint downstream and multipoint to single point upstream environment characteristic of a CATV system. That coupling is described next because it is important in understanding the conceptual underpinning of the hardware and software described herein.

The ATM protocol was designed for a local area network point to point environment without a shared media. A "shared media", as that term is used herein, means a media wherein more than one pair of devices may be communicating with each other either at the same time or sequentially. In a typical ATM protocol local area network, all the devices are coupled together through individual connections such as twisted pair, coax, fiber optic waveguide etc. from the device to a switching hub or ATM switch. A cell of data generated by another device is sent via a point to point protocol in this topology by placing the destination address of the device to which the cell is addressed in the cell header and transmitting the cell to the ATM switch. The cell is the switched onto the appropriate branch connection from the switch to the device to which the cell is addressed or to a bridge or router which will ultimately direct the cell on an appropriate path to the device to which the cell is addressed. No other pair of devices can use the various data paths involved in this transaction while the transaction is occurring as that would cause a collision and loss of data. If two devices simultaneous direct ATM cells to a single device, such as two workstations directing ATM cells to a server for storage, the two ATM cells from the different work stations arrive at the ATM switch simultaneously. In such a case, both cells cannot simultaneously be sent to the server on the single connection from the ATM switch to the server. In such a case, the ATM protocol calls for the ATM switch to buffer one cell while the other cell is being transmitted to the server. When the first cell is completely transmitted, the second cell is transmitted.

Figure 28:
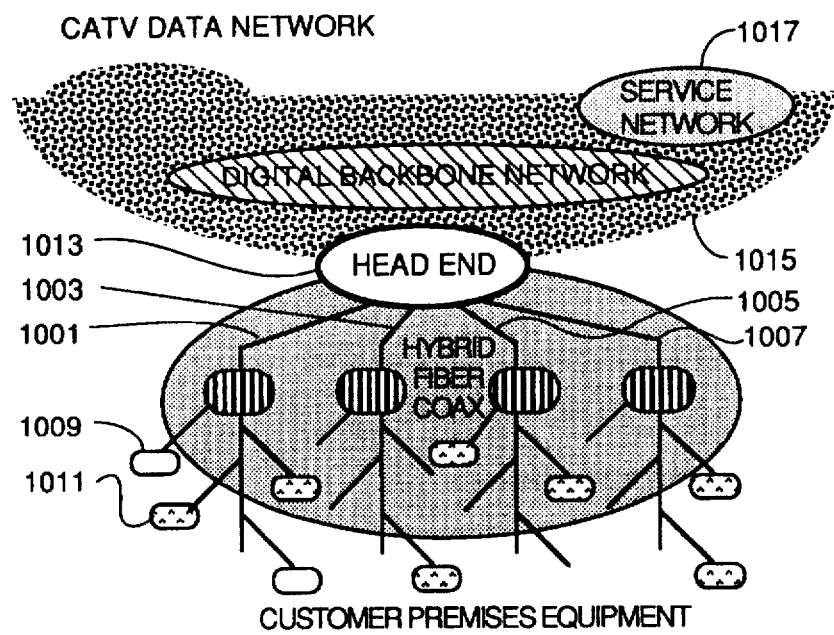
FIG. 28 is a symbolic diagram of a typical CATV HFC.
Figure 29:
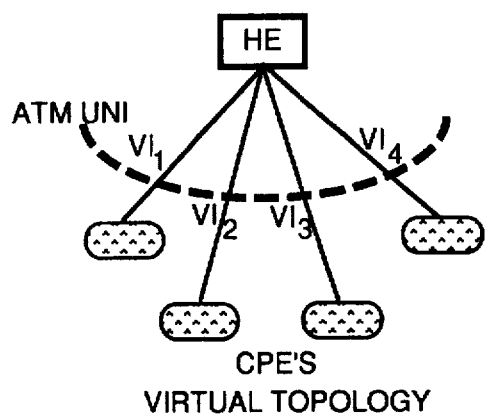
FIG. 29 is a diagram of how virtual links look at the logical level despite the physical media structure shown in FIG. 28.

This ATM point to point data exchange protocol will not work directly in a CATV shared media environment shown in FIG. 28, so it is implemented with a virtual link logical topology shown in FIG. 29. In FIG. 28, each branching media diverging from the head end to the CPEs, such as media 1001, 1003, 1005 and 1007 is shared by the CPE peripherals of all the CPE coupled to each media. For example, media 1001 is shared by the peripherals connected to 4 CPE, of which CPE 1009 and 1011 are typical. None of these peripherals coupled to CPE 1009 and 1011 could simultaneously exchange ATM cells with peripherals coupled to the head end 1013 because collisions would occur on shared media 1001 causing loss of data. These point to point communications are necessary to carry out ATM protocols however, so virtual links between each CPE and the head end are established using code division multiplexing. Each CPE's virtual link to the head end is not shared and is implemented by assigning specific ODMA codes to the CPE and head end transceivers. Thus, to any particular CPE transceiver and the head end transceiver assigned to the same code or codes, the shared physical media looks logically like it is not shared since the CDMA encoding of the data prevents simultaneously transmitted data using other orthogonal codes with it. Each virtual link carries the ATM compliant cells and is the sum of all data transmitted to and received from a specific CPE. For purposes of discussion of the ATM implementation below, the focus will be on the logical equivalent of what is happening on the physical level, i.e., the virtual traffic on the virtual links will be described instead of the actual physical signals travelling across the shared media with interleaved and scrambled bits from every byte in all 128 timeslots in every symbol. This will make it easier to understand the ATM implementation.

In the pictorial description of the HFC network given in FIG. 28, the digital backbone network is defined in the TeraComm standard HFC network topology (which is incorporated by reference herein) as providing interconnectivity between different head ends and between each head end and various wide area networks. The Service networks provide value added services over the pure transmission technology described herein such as voice networks, video networks and pure data networks such as the Internet.

Figure 27:
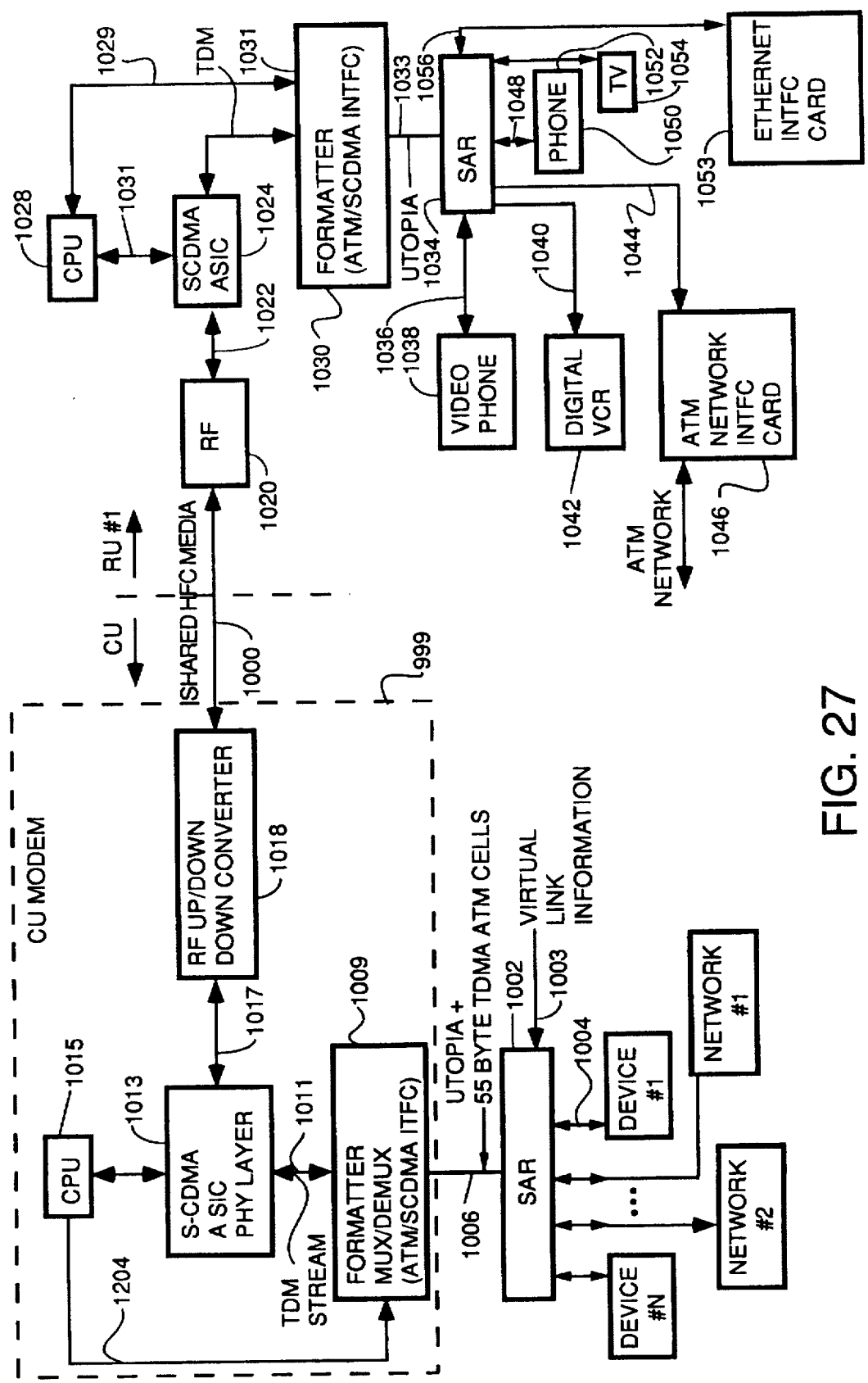
FIG. 27 is a block diagram of the basic functional blocks needed at the head end and one CPE to carry out ATM protocol communication using virtual links on a CATV HFC cable plant.

Returning to the consideration of FIG. 27, the TDMA stream of data on bus 1010 is received by a framer circuit (see FIG. 12) in the SCDMA ASIC 1012. There it is parsed into three symbols each composed of multiple tribits. A fourth bit is then added to each tribit to provide redundancy. Each 4-bit group is then spread or encoded with an SCDMA orthogonal code assigned by a computer 1014 to yield a result vector comprised of orthogonally encoded 4-bit chips. Each 4-bit chip is then split into two parts and the value of the two parts establishes the point for that chip in a QAM modulation constellation. The two halves of each 4-bit chip are then used to QAM modulate two carriers which are 90 degrees out of phase. The resulting RF signals are bandwidth limited to 6 mhz channels by low pass filtering of the chips entering the modulator mixers and are output on line 1016 to an RF up/down converter 1018. The up/down converter then translates the frequency of the downstream signal to the appropriate frequency to avoid interfering with either the CATV television programming channels and the upstream data coming from the CPEs.

Frequency division multiplexing is used to separate the upstream data from the downstream data. In the preferred embodiment, the frequencies below 54 mhz are reserved for upstream while frequencies between 54 mhz and 750 mhz are reserved for the ordinary cable television programming using NTSC video modulation and the downstream QAM modulated digital data.

At the CPE, the downstream QAM modulated digital data signals are received by an RF up/down converter 1020 where they are converted in frequency to the carrier frequency used in the modulator in SCDMA ASIC 1012. The converted frequency is then transmitted on line 1022 to the SCDMA ASIC 1024 at the CPE. There, a demodulator demodulates the RF in the manner described above with reference to FIG. 26 and converts the analog signal to digital data. The digital data is then demultiplexed using the transpose code matrix as described above, Viterbi decoded and "deframed" to reassemble on bus 1026 a replica of the TDMA data stream on bus 1010. Computer 1028 assists in this process by running the algorithms described above to carry out ranging, training and control operations by the ASIC to make sure the proper transpose code matrix is used for decoding in accordance with the current code assignments to the various timeslots/channels.

Figure 30:
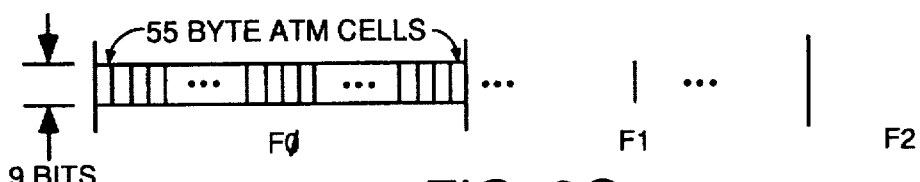
FIG. 30 is a diagram illustrating the downstream data structure.

The TDMA stream on bus 1026 is examined by formatter ATM/SCDMA interface 1030 to determine if the virtual link address in the header indicates that the cell is addressed to the CPE of which the formatter 1030 is a part. If so, the formatter reassembles the ATM cells from the bytes of data in the various timeslots of the TDMA stream on bus 1026. The logical structure of the downstream data flow is shown in FIG. 30. The downstream physical layer signals are divided into frames. Each frame is composed of three symbols of 144 chips each and a gap or guardband comprised of 16 chips for a total of 448 chips each having 278 nanoseconds duration. The chip is the basic unit of time in the "code domain", where code domain refers to the signals propagating across the shared media. In FIG. 4A, the three symbols of frame $F_n$ are symbolized by blocks 62, 64, and 66. The gap or guardband is symbolized by blocks 60 and 71. There is one guardband associated with each frame. The guardband 71 (sometimes also referred to herein as the gap) is used for synchronization and equalization purposes for the frame comprised of symbols 62, 64, 66 and guardband 71. The symbols carry the information for the various channels of digital data provided to the subscribers. The frame period is 125 microseconds. The frame data payload is 128 channels times 72 kilobits per second per channel plus 16 control and management channels each of which has a data rate of 72 kilobits per second for management and control information.

On the logical level, the ATM cells are comprised of 55 9-bit byte cells which are transmitted end to end sequentially without regard to the frame boundaries except that the first ATM cell in a group of cells is transmitted synchronously with the start of whatever frame it is transmitted in. Thereafter, 2.2 cells per frame are transmitted, with the 9 bits of each byte being loaded into the framer circuitry serial-in, parallel out shift register 310 in FIG. 12 in synchronization with the 8.192 mhz bit clock signal on line 377 in FIGS. 12 and 16.

Figure 31:
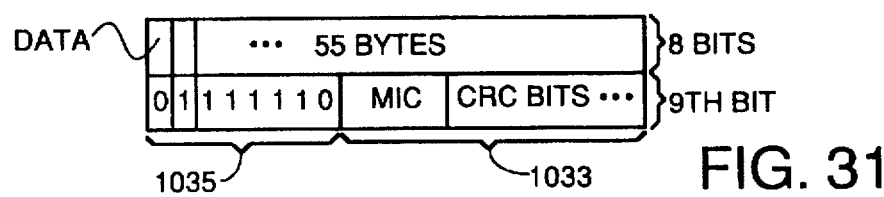
FIG. 31 is a diagram illustrating a Utopia+format 55 byte ATM cell as is used in the downstream data and illustrating how a 9th bit is added for use in signalling the beginning of each ATM cell and to carry CRC data.

The formatter 1030 in FIG. 27 is responsible for establishing the ATM cell boundaries. This is done with the aid of the 9th bit in each byte. Referring to FIG. 31, there is shown a diagram of a typical Utopia+ format 55 byte ATM compliant cell. The 8 bits of data from whatever source generated it are stored in the first 8 bits of every 9-bit byte. The 9th bit is encoded in a special way, for the downstream data, by the ATM/SCDMA interface circuit 1008 in the head end modem 999. The interface circuit 1008 encodes the 9th bits of the first eight 9-bit bytes with a unique sequence of bits which are defined as a start code. When the formatter 1030 at the CPE detects this start code, it knows where the cell boundaries are by counting backward 8 bytes and counting forward 55 bytes from there. The formatter then strips off the virtual link header information to leave a pure Utopia format 53 byte ATM cell. Cells reconstructed in this way by the formatter 1030 are then output in a TDMA stream in pure Utopia format on bus 1031. From there, a SAR 1034 examines the standard ATM header to determine which device coupled to the SAR to which the cell is addressed. The cell is depacketized and output to the appropriate device. For illustration purposes, the SAR 1034 in the only CPE/RU shown is coupled by bus 1036 to a videophone 1038, by bus 1040 to a digital VCR 1042, by bus 1044 to an ATM local area network interface card 1046, by bus 1048 to a digital phone 1050, by bus 1052 to a digital television 1054, and by bus 1056 to an Ethernet interface card 1058. Other or alternative peripherals may also be connected.

The logical format of the upstream data from the CPEs to the head end is slightly different owing to the variable bandwidth needs of the various peripherals connected to the CPEs and the distribution of the available channels/codes by the head end computer 1014. The computers in the various CPEs like computer 1028 monitor the state of fill of a queue buffer in the formatter 1030 to determine how backed up the buffer is. If the state of fill of the buffer gets to a certain point representing a danger of overfilling the buffer and loss of data, the computer 1028 generates a request on the shared access channels requesting more bandwidth. The shared access channels and the protocol for resolution of conflicts in simultaneous access request are described in parent United States Patent CIP Application entitled, "APPARATUS AND METHOD FOR DIGITAL DATA TRANSMISSION OVER VIDEO CABLE USING ORTHOGONAL CYCLIC CODES", Ser. No. 08/588,650, Filed Jan. 1, 1996. The computer 1014 in the head end collects all the bandwidth requests, and arbitrates among them based upon: the privileges of each CPE requesting bandwidth to reserve bandwidth; the current bandwidth allocation scheme in use, the pending requests and the number of available channels. Awards of certain channels/timeslots are then made and messages sent via ATM cells in the downstream data channels devoted to management and control to the various CPEs informing them of which channels have been awarded to them. The CPU's 1014 and 1028 perform the media access control algorithm in reading how much data each CPE has sent and received in the last 10 milliseconds, generating and arbitrating access requests, resolving contentions on the access channels, assigning channels etc.

The channel allocation calculation is done 100 times every second (a new computation every 10 milliseconds), and the new awards are distributed by a multistep protocol, each step of which takes about 1 millisecond. Therefore, the time between changing of allocations of channels can stretch out over several microseconds. However, actual changing of allocations occurs synchronously with a frame boundary.

Figure 32:
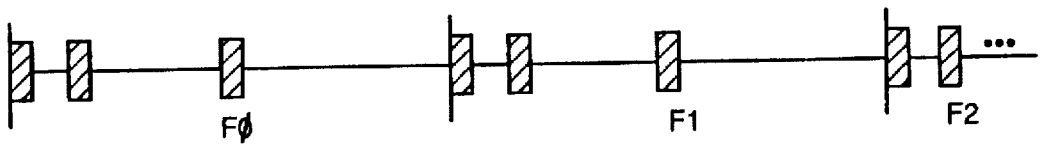
FIG. 32 is a diagram illustrating how the bytes from one upstream ATM cell from one CPE are interleaved into the frames with bytes from other CPEs in accordance with a hypothetical code allocation of codes 1, 5 and 35 for one CPE.

FIG. 32 illustrates the logical structure of the upstream data for a typical example. Suppose the CPE shown in FIG. 27 has been awarded channels 1, 5 and 35 in response to a bandwidth request to support digital telephone 1050. In response to this allocation via ATM cells received from computer 1014 at the head end, formatter 1030 will dispatch data to computer 1028 in the CPE via bus 1029. These cells tell the computer which timeslots/channels have been allocated to this CPE. Computer 1028 then generates signals on bus 1031 which control the SCDMA ASIC 1024 to take data from the ATM cells in the TDMA stream on bus 1026 and distribute them in accordance with the allocation, for example as shown in FIG. 32, among the various timeslots of each frame.

If only the digital telephone 1050 is in use, all the timeslots in the TDMA stream on bus 1026 will be in use to transport data from the phone. If more than one peripheral coupled to the CPE is simultaneously in use, the formatter sends the cells from the various devices in use seriatim on bus 1026, i.e., one cell from one peripheral is completely sent on bus 1026 before another cell from another device may be sent on bus 1026.

The formatter 1030 sends data to the SCDMA ASIC 1024 which informs it where each ATM cell boundary is. Signalling of the ATM cell boundaries in the upstream direction is done exactly as it was done in the downstream direction. The formatter adds 9th bits to every 8-bit byte in every ATM cell. The first 8 of these 9th bits comprise a start code, and the last few of the 9th bits are CRC data. The remaining 9th bits between the start code and the CRC data may be used for a subchannel data transmission. The SCDMA ASIC 1024 detects the start code for every ATM cell and distributes the 55 9-bit bytes of each ATM cell arriving on bus 1026 sequentially in accordance with the allocation of channels in each frame to that CPE. An allocation of a channel is in effect an assignment of one or more specific orthogonal CDMA codes which may be used only by that CPE and which are used by the head end receiver in despreading that CPE's data only. For an allocation of channels 1, 5 and 35, the SCDMA ASIC 1024 will take the first three 9-bit bytes of the first ATM cell and place them in logical timeslots 1, 5 and 35 of frame 0 in FIG. 32. The next three bytes of the same cell will be placed in logical timeslots 1, 5 and 35 of frame 1. This process is continued until either the entire ATM cell has been transmitted in this way or the channel allocation changes. In the event the allocation changes before the entire ATM cell has been transmitted, the remaining bytes of the ATM cell are simply transmitted in the same manner using the new allocation. This process is repeated until all upstream ATM cells have been transmitted.

The multiplexer/demultiplexer 1008 at the head end extracts the bytes from a particular CPE from their assigned timeslots and reassembles them into ATM cells. These ATM cells are then reassembled into a Utopia+TDMA stream and output on bus 1006 to SAR 1002 for distribution as data streams to the various devices coupled to the SAR 1002.

Figure 33:
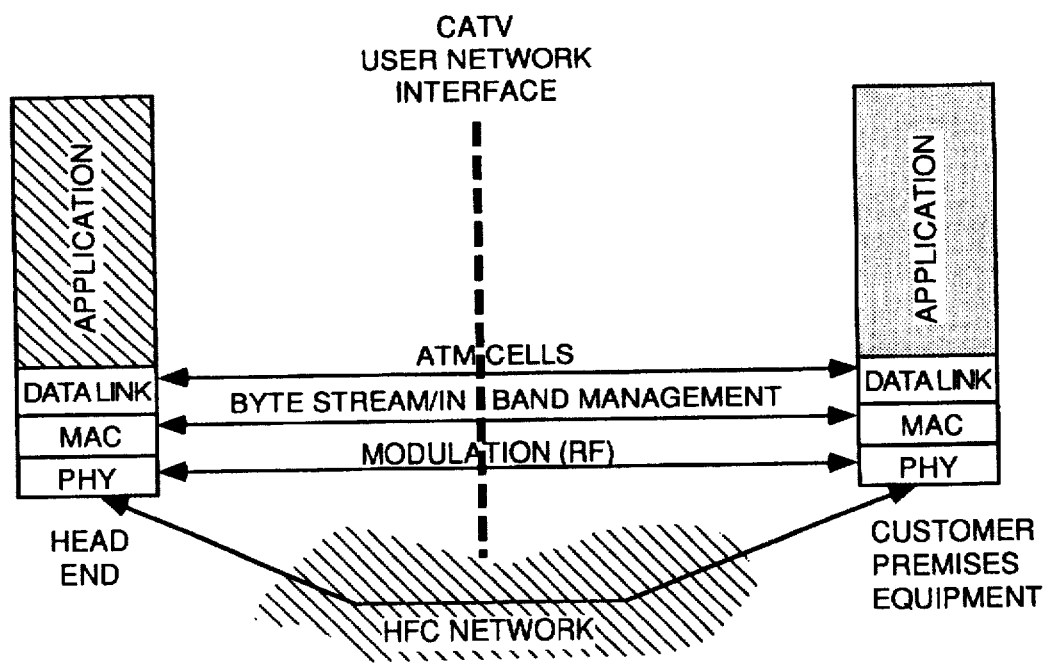
FIG. 33 is a diagram illustrating the various layers of the OSI model and illustrating what jobs/protocols are done on each layer by the system of the invention.

FIG. 33 shows a diagram of how the hardware and software architecture in the head end and customer premises equipment implement the data link, media access control (MAC) and physical (PHY) layers of the OSI model. Specifically, the data link layer in the OSI model attempts to make the physical layer reliable and provides the protocols to activate, maintain and deactivate links. The principal service offered by the data link layer is error detection and control thereby allowing the next higher layer to assume data free transmission. The data link layer protocol is implemented in the invention by the transmission of ATM cells in the manner described herein.

The MAC layer (media access control layer) is implemented by transmission of the byte stream and in band management data (the in band management data is the data of access requests, replies, contention resolution messages, channel assignment messages etc.) while the physical layer is implemented using RF QAM modulation of SCDMA spread spectrum data by the synchronous code division multiplexer circuitry described generally in FIGS. 1–26 and implemented in the ASICs 1012 and 1024 in FIG. 27.

Figure 34:
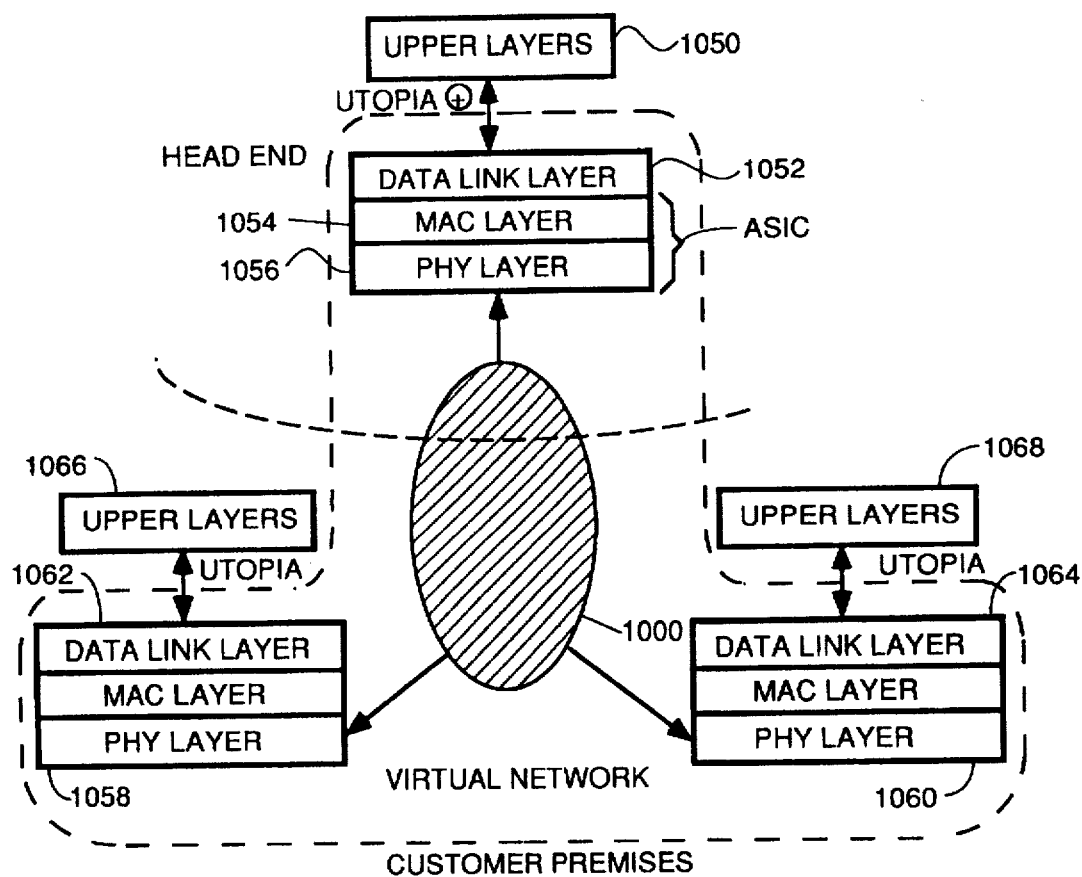
FIG. 34 is a diagram illustrating the interfaces between the upper OSI model layers at the head end and CPEs with the data link, media access control and physical layers implemented by the system of the invention including connection between these layers by the virtual network.

FIG. 34 illustrates the system software architecture and the interfaces between the upper hardware and software layers in the OSI model at the head end and CPE sites to the system of the invention. The upper layers of the head end equipment, represented by box 1050 representing various applications that are in execution that are sourcing data to and sinking data from the CPEs, are coupled to the data link layer 1052 of the invention by a data stream formatted in Utopia+. This corresponds to the data on bus 1006 in FIG. 27. The data format Utopia+ on bus 1006 differs from a pure Utopia format only in that a two byte virtual link header is added to the standard 53 byte ATM cell. The data link layer 1052 is implemented by the ATM/SCDMA interface 1008. The data link layer protocols are linked to the MAC and PHY layers 1054 and 1056 by the bidirectional TDMA stream on bus 1010 in FIG. 27. The MAC and PHY layers are implemented by ASIC 1012 in FIG. 27.

The PHY layer at the head end is coupled to the PHY layers 1058 and 1060 at two CPE sites. The MAC and PHY layers at these sites are implemented by ASICs like circuit 1024 in FIG. 27. The MAC and PHY layers at the CPEs are linked by bidirectional TDMA streams on bus 1026 in FIG. 27 to formatters like the formatter 1030 which implements the data link layers 1062 and 1064 at the CPEs. The data link layers at the CPEs are coupled to the upper layer application processes of the peripherals, represented by blocks 1066 and 1068, by pure Utopia format TDMA streams of 53 byte ATM cells. These data streams are exemplified by the data on bus 1031 in FIG. 27.

Figure 35:
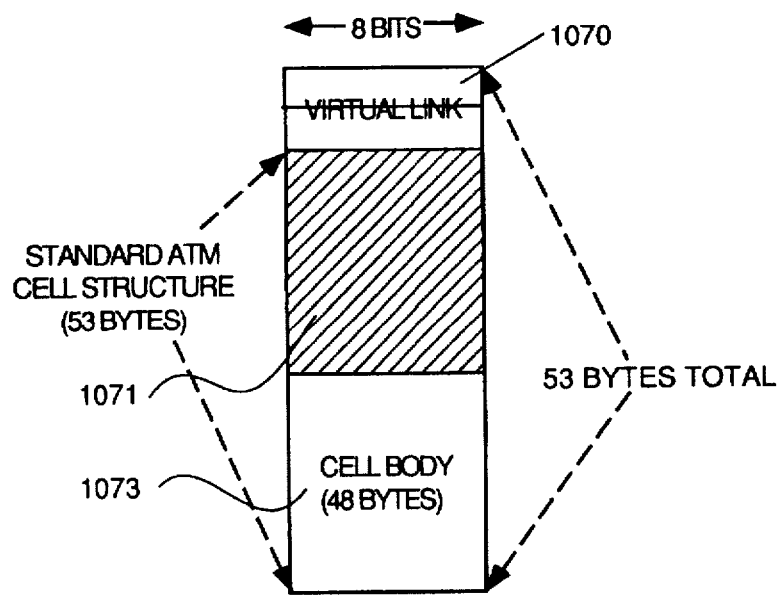
FIG. 35 is an illustration of the format of a Utopia+55 byte ATM cell including a two byte virtual link header enabling use of this cell in a CATV HFC plant.

FIG. 35 illustrates the Utopia+ format ATM cell used at the head end equipment on bus 1006. The total length of the cell is 55 bytes with a two byte virtual link header 1070 having data therein which defines to which virtual link the cell belongs. The data in the virtual link header defines which CPE to which the ATM cell is destined. In some embodiments, the virtual link header information may also identify which particular SCDMA codes are to be used in communication between the head end and that particular CPE. In other embodiments, the codes to be used between the head end and each CPE for any particular allocation of codes are sent separately in message traffic on management and control channels that are part of the 144 total channels that are not used by the 128 payload data channels. The standard ATM header 1071 contains standard ATM header information and identifies to which particular peripheral coupled to the CPE the payload data in the main cell body 1073 is directed. Typical ATM headers include both source and destination device address fields.

Figure 36:
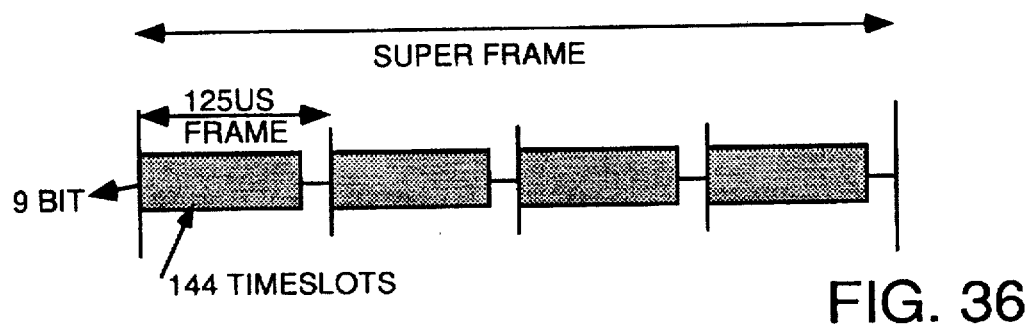
FIG. 36 illustrates the SCDMA frame structure of a superframe including 4 frames separated by guardbands, each frame being 125 microseconds long and containing data from 144 timeslots.
Figure 37:
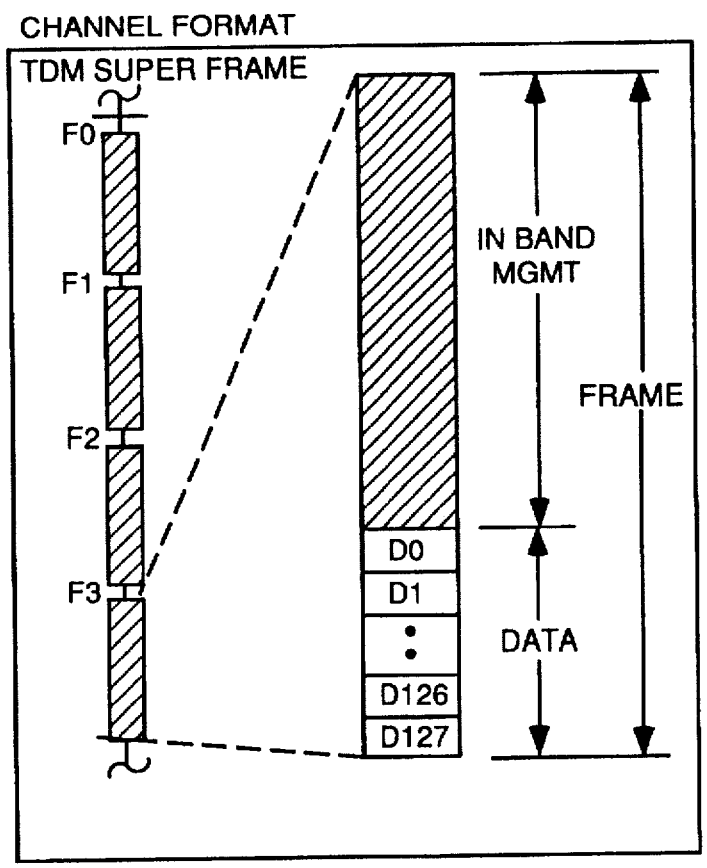
FIG. 37 illustrates how inband management channels are fit into every frame with 128 payload data timeslots.

FIG. 36 shows the superframe structure used by the PHY layer to communicate via SCDMA over the shared HFC of the CATV plant. A superframe is comprised of 4 frames of 128 payload channels and 16 management and control channels, each frame separated from the next by a guardband. Each channel is the scrambled, interleaved equivalent of one 9 bit timeslot in the TDMA streams from the formatter or ATM/SCDMA interface circuits. The data rate is 8000 frames per second yielding a 10 megabits/second data rate, of which 9 megabits/sec is payload data. FIG. 37 shows the arrangement of the 16 inband management and control channels in a single frame relative to the 128 payload channels marked D0 through D127.

Figure 38:
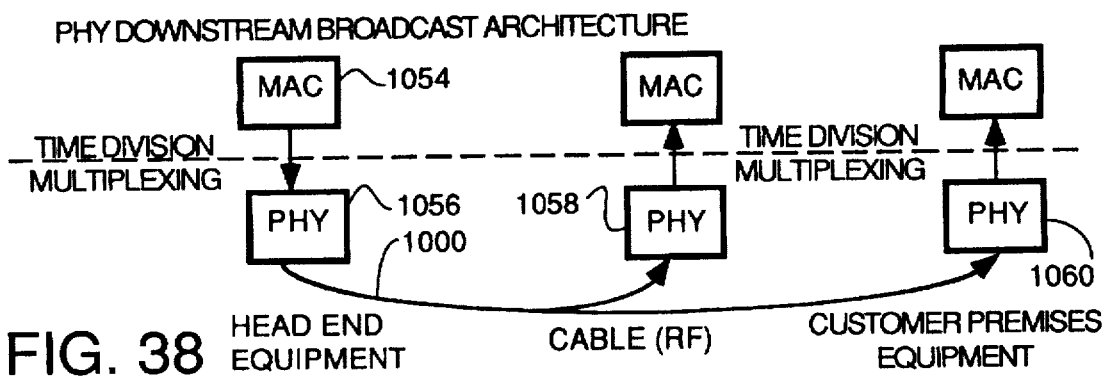
FIG. 38 illustrates the physical layer downstream broadcast architecture for contention resolution and channel allocation messages.

The downstream data is organized as a point to multipoint communication channel providing a capability to transmit data from the head end to multiple CPEs using a broadcast type mechanism. FIG. 38 illustrates the PHY downstream broadcast architecture. The downstream broadcast communication channel carries only management and control information in a continuous stream of words running at 8.192 mhz on 8 of the 16 management and control channels in each frame. Each of the 8 channels carries one management and control word which is 9 bits wide, and the words are sent using a superframe of 4 grouped frames. Thus, after one superframe is sent, a 32 word management and control message has been sent to all CPEs. 2000 of these 32 word management and control messages are sent every second. The virtual link header information of these 55 byte ATM cells carry virtual link information which causes all cells to be distributed to all CPEs. Downstream data from a peripheral or network source coupled to the head end destined for a particular peripheral coupled to a CPE is sent via 55 byte ATM cell on one of the payload channels.

Figure 39:
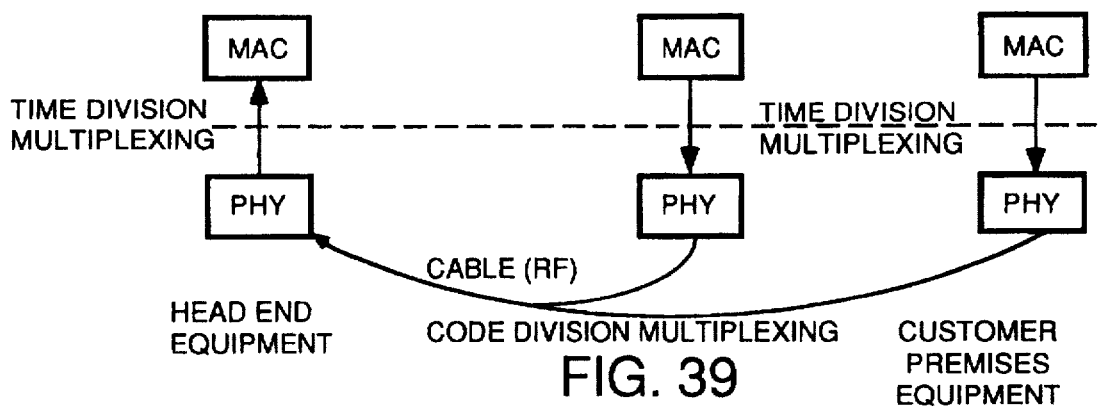
FIG. 39 illustrates the upstream multipoint to point multiple access communication architecture.

FIG. 39 illustrates the upstream multiple access architecture implemented by the PHY and MAC layers. The upstream communication channel is characterized by a multipoint to single point topology carried out using a combination of time division and code division multiplexing. The PHY layer is responsible for SCDMA multiplexing of data streams from multiple CPE sources onto the shared media by taking the time division multiplexed representation of the channel and converting each timeslot into SCDMA spread energy on the shared media. During each frame time of 125 microseconds, all 128 payload channels are either unused or assigned to only one virtual link between a CPE and the head end. Each timeslot or channel is the logical equivalent of one orthogonal CDMA code to the MAC layer. Each CPE can be allocated more than one timeslot/channel/code depending upon its needs, and ATM quality of service is implemented by allowing reservation of one or more channels to one or more CPEs. This provides the ability to guarantee bandwidth to CPEs with high load peripherals in use that cannot tolerate interruptions in data flow. The head end MAC layer 1054 in FIG. 34, by controlling code allocation, controls bandwidth allocation and quality of service.

Upstream access channels are used to carry traffic from the CPEs to the head end requesting attention. Access requests can be of several types including MAC layer registration, requests for bandwidth, etc. There are 12 8-bit wide upstream access channels, only the first 6 of which are used for access requests. There is a specific access request contention resolution protocol that is described in the parent cases incorporated by reference that allows the access channels to be shared by all CPEs and which handles contention resolution when multiple CPEs simultaneously try to use the same access channel.

Figure 40:
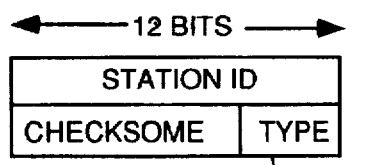
FIG. 40 illustrates the format of a typical upstream management and control message.

A CPE can send an access request during any superframe. The head end receives the access request and signals by a downstream message the status of each access request channel in the form: idle (for no activity on the access request channel); contention (more than one CPE simultaneously requested access on the same channel) or access requested accepted (access request received and being processed). The access request is comprised of two 12 bit fields: a station ID field identifying the CPE making the request; a type field indicating the type of access requested; and a checksum field which allows the head end equipment to check for contention. An access request uses 2 of the 8 available upstream management and control channels. FIG. 40 shows the format of the access request. If a CPE has not yet had a station ID assigned to it, as is the case for an initial registration, it uses a random number to insure uniqueness. Use of a random number reduces the chance of the same IDs to 1:4096. A collision is defined as a simultaneous access request by two or more CPEs on the same channel. This fact also lowers the possibility of collision.

Figure 41:
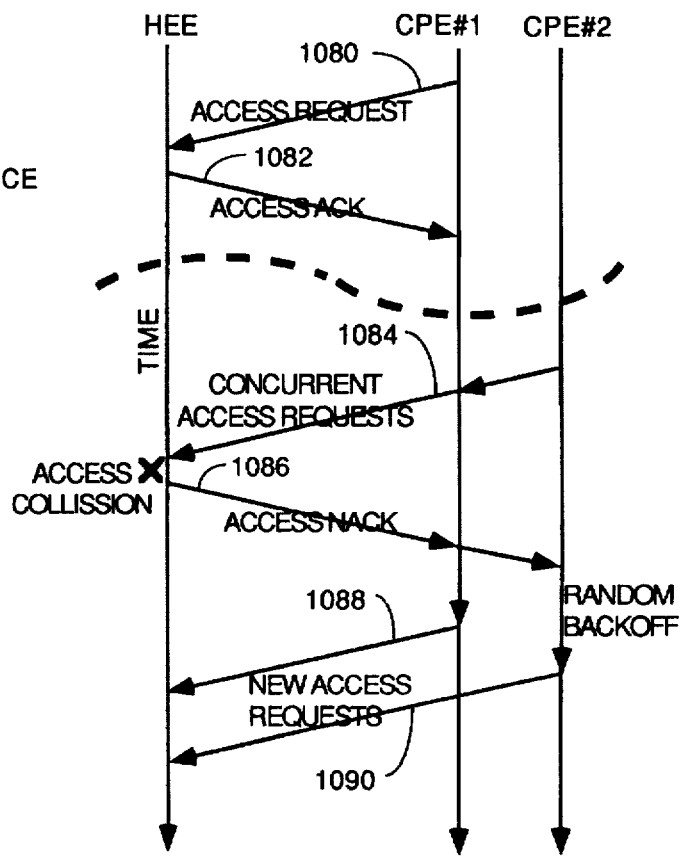
FIG. 41 illustrates access request collisions and contention resolution protocols.

When two or more CPEs transmit their IDs on the same access channel at the same time, the IDs combine at the head end in such a way that the checksum fails and the head end can determine therefrom that a collision has occurred. The head end then broadcasts a code in the downstream data that indicates a collision has occurred. The CPEs resolve this contention by each waiting a randomly selected exponential delay and retrying the access requests after the delay. FIG. 41 illustrates the upstream access protocol. Line 1080 represents an upstream access request launched from CPE #1 toward the head end, and line 1082 represents the access request acknowledgment communication in the downstream data from the head end. Line 1084 represents simultaneous access requests from CPE #1 and CPE #2 causing a collision at the head end. Line 1086 represents a report from the head end in the downstream data of the collision. Each CPE then waits a randomly selected delay period and then attempts the access request again, as represented by lines 1088 and 1090.

Figure 42:
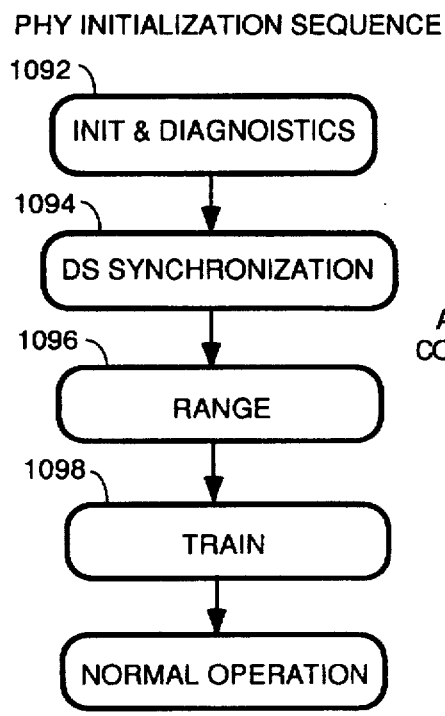
FIG. 42 illustrates the physical layer initialization sequence.

The physical layer requires execution of a ranging and a training algorithm to achieve alignment in the time domain and power domain, respectively. These processes are illustrated by the flow chart of FIG. 42 which shows the physical layer initialization sequence. First, in step 1092, each CPE and the head end equipment perform initialization and diagnostics. Then, in step 1094, downstream synchronization is achieved. This step represents the process of the CPEs recovering local clock synchronization from the head end clock information embedded in the downstream traffic bitstream. This synchronizes their local clocks with the head end clock and recovers the downstream hello message which contains the upstream frequency associated with each channel. The downstream synchronization can start with a known channel, but also can scan the spectrum for a channel in an autofrequency detection scheme.

Next, as symbolized by step 1096, the ranging process is accomplished, as described elsewhere herein. Ranging achieves synchronization of transmit frame timing by the CPEs with the frame timing of the head end so that all CDMA spread frames of symbols arrive simultaneously so as to compensate for variable propagation delays from CPEs at different physical positions on the network. Ranging is performed fully once at power-up and, thereafter, only after complete loss of synchronization. No transmission by a CPE is allowed until the ranging process starts.

The training step 1098 allows the modem to minimize the effects of line impairments by pre-compensating for them at the CPE transmitter so that an optimal signal is received at the head end. Training also lets the modem set optimum power level and fine timing alignment. Training is performed immediately after the initial ranging, and at a periodic interval while a CPE has one or more active timeslots assigned to it. When the CPE is idle, training is done at a slower periodic interval. A link management service is used to provide the ability to manage the network of CPEs. The link management service supports basic primitives that are equivalent to the SNMP Set, Get and Trap functions. The link management service enables the transmission of management information including statistics and configuration information for the physical and MAC layers.

MAC LAYER

The MAC layer includes all the algorithms pertaining to access to the physical layer. These algorithms include registration, authentication and bandwidth requests.

The registration algorithm is performed by CPEs to establish potential usage of the physical layer. Registration involves assignment of a unique 12 bit station ID number to the CPE by the head end. This process is initiated by the CPE upon power up and after completion of the physical layer initialization sequence of FIG. 42. The CPE starts the registration process by issuing an upstream access request with a random ID (known as a temporary station ID) and a request type field (1091 in FIG. 40) indicating that the access request is a registration request. The head end performs a collision detection using the access request checksum and notifies the CPE upon successful completion of the collision check using a downstream message indicating access acknowledgement. Then the head end notifies the CPE addressing it using the random ID of the station ID it will be assigned for the rest of the session. This is accomplished using the downstream Set Station ID message.

Authentication is the algorithm used to establish validity of the user. The head end checks validity of the CPE by having the CPE send a unique 48 bit MAC ID assigned to manufacture of the CPE. The transmission of this MAC ID is done using the link management service of the physical layer. The head end then checks the received MAC ID against a table containing all the authorized MAC IDs.

Bandwidth management involves several issues. Bandwidth allocation is the process which enables control and allocation of bandwidth in the upstream channel. Static bandwidth management is performed to control bandwidth reservation which is important to enable a CPE to have guaranteed bandwidth so as to implement the quality of service requirement of the ATM protocol. Dynamic bandwidth management is performed in real time to manage bandwidth resources which include real time adaptation to shift bandwidth to other CPEs that have increasing need from CPEs that have excess bandwidth.

Bandwidth allocation is performed both statically and dynamically by the head end computer, and distribution of the decisions is made over the downstream channel. The allocation decisions are transmitted downstream with messages having a command type of the class Time Slot management. Time Slot management commands are additive in that only the difference over the last state of allocation is transmitted in the downstream channel when the allocation changes so as to minimize traffic. Because this causes the possibility that a CPE will lose track of the state of timeslot allocation, an unsolicited state of bandwidth allocation is transmitted at a slow periodic rate in the preferred embodiment. In alternative embodiments, either the entire allocation state can be transmitted each time the allocation changes, or only the differences may be broadcast with the head end supporting a function which can be invoked by any CPE to transmit to that CPE the entire allocation state when the CPE loses the state information.

Static bandwidth allocation by a reservation mechanism is performed during connection establishment by an access request. The reservation informs the head end of the minimum sustained bandwidth required for the CPE. Dynamic bandwidth allocation handles the burst nature of bandwidth requirements. A scheme is used by which the aggregate peak rate bandwidth allocated may exceed the maximum bandwidth possible. On the average, it is expected that only a small portion of the total available bandwidth shall actually be needed. In some embodiments, bandwidth allocated or reserved to one CPE which does not actually need it at the moment may be temporarily assigned to another CPE. The dynamic bandwidth manager requires the constant monitoring of the utilization of bandwidth by each CPE. If usage drops below a certain threshold, bandwidth will be removed from the allocation of the CPE. If traffic increases above another threshold, additional bandwidth will be allocated if there is available bandwidth according to the current priority allocation scheme in use.

Figure 43:
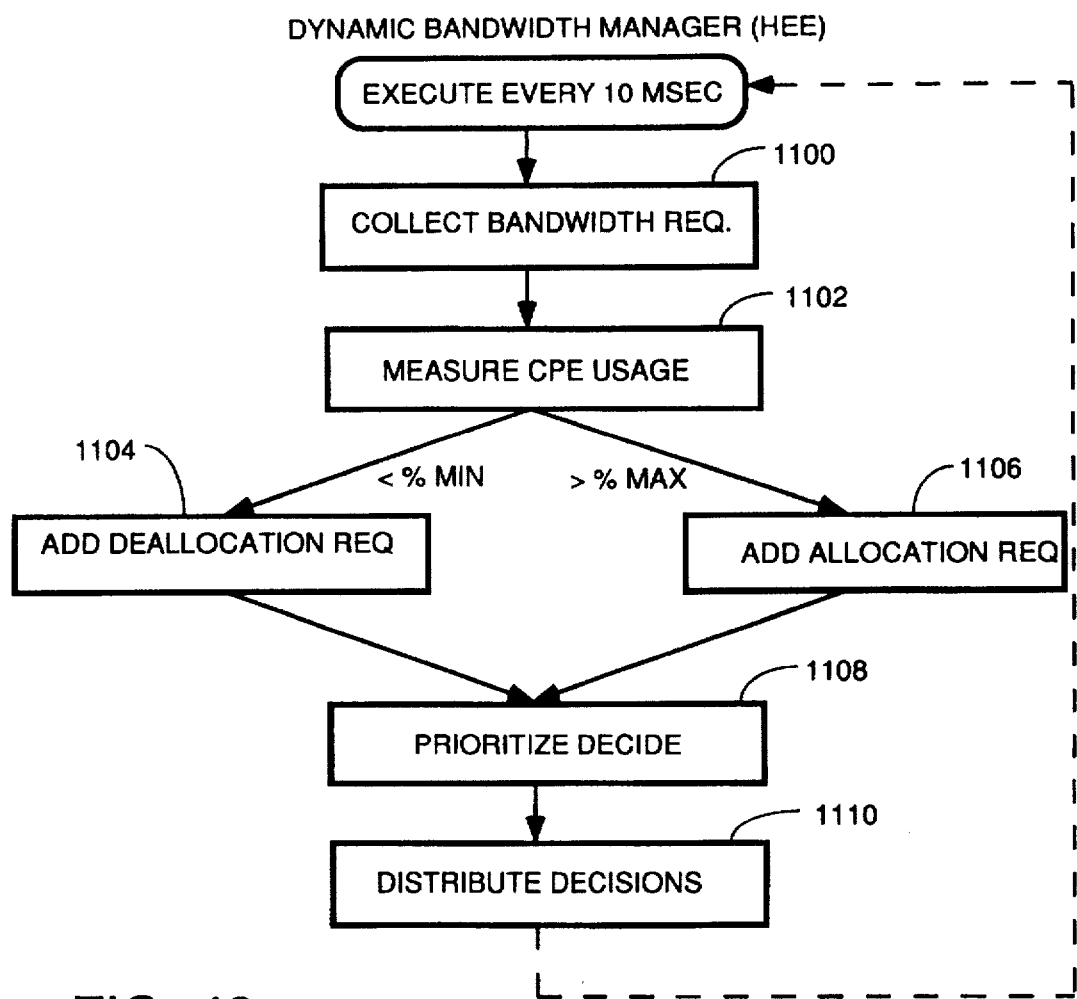
FIG. 43 illustrates one embodiment of a dynamic bandwidth manager process carried out by the head end computer.

FIG. 43 illustrates a flow chart illustrating the dynamic bandwidth management process carried out by the head end computer and the computers in the CPEs. This routine executes every 10 milliseconds and starts with a process of collecting bandwidth requests as symbolized by step 1100. This involves management traffic interchange between the CPEs and the head end indicating the amount of bandwidth each CPE wishes to have allocated to it. Next, as symbolized by block 1102, the head end reads the number of cells transmitted by each CPE and transmitted to each CPE. This information is counted in the ATM/SCDMA interface circuit 1008 in a manner to be described further below. This information reflects the number of cells that were transmitted to and from the CPE in the last 10 milliseconds. The head end computer then uses these most current CPE usage measurements to make a decision as to whether to suggest to the prioritization and allocation process symbolized by block 1108 to award more bandwidth or less to each CPE. If the number of cells transmitted to and from a CPE is less than a configurable percentage of a "minimum threshold" established relative to its current usage, the head end computer adds a deallocation suggestion message to the collection of bandwidth requests for that CPE as symbolized by block 1104. If the current usage of a CPE in the last 10 milliseconds is greater than a predetermined percentage of a configurable maximum threshold established relative to that CPEs current allocation, the head end computer adds an additional allocation suggestion to the collection of bandwidth requests for that CPE, as symbolized by block 1106. This process is repeated for each CPE. Next, in step 1108, the head end computer analyzes and establishes priorities for bandwidth reservations, bandwidth requests, and bandwidth allocation and deallocation suggestions generated in steps 1104 and 1106 for each CPE in accordance with the current priority channel allocation scheme. The headend computer then decides how much bandwidth to award each CPE and which channels to allocate to each CPE to implement these allocation decisions. The head end computer then distributes those allocation decisions by downstream messages, as symbolized by step 1110.

Figure 45A:
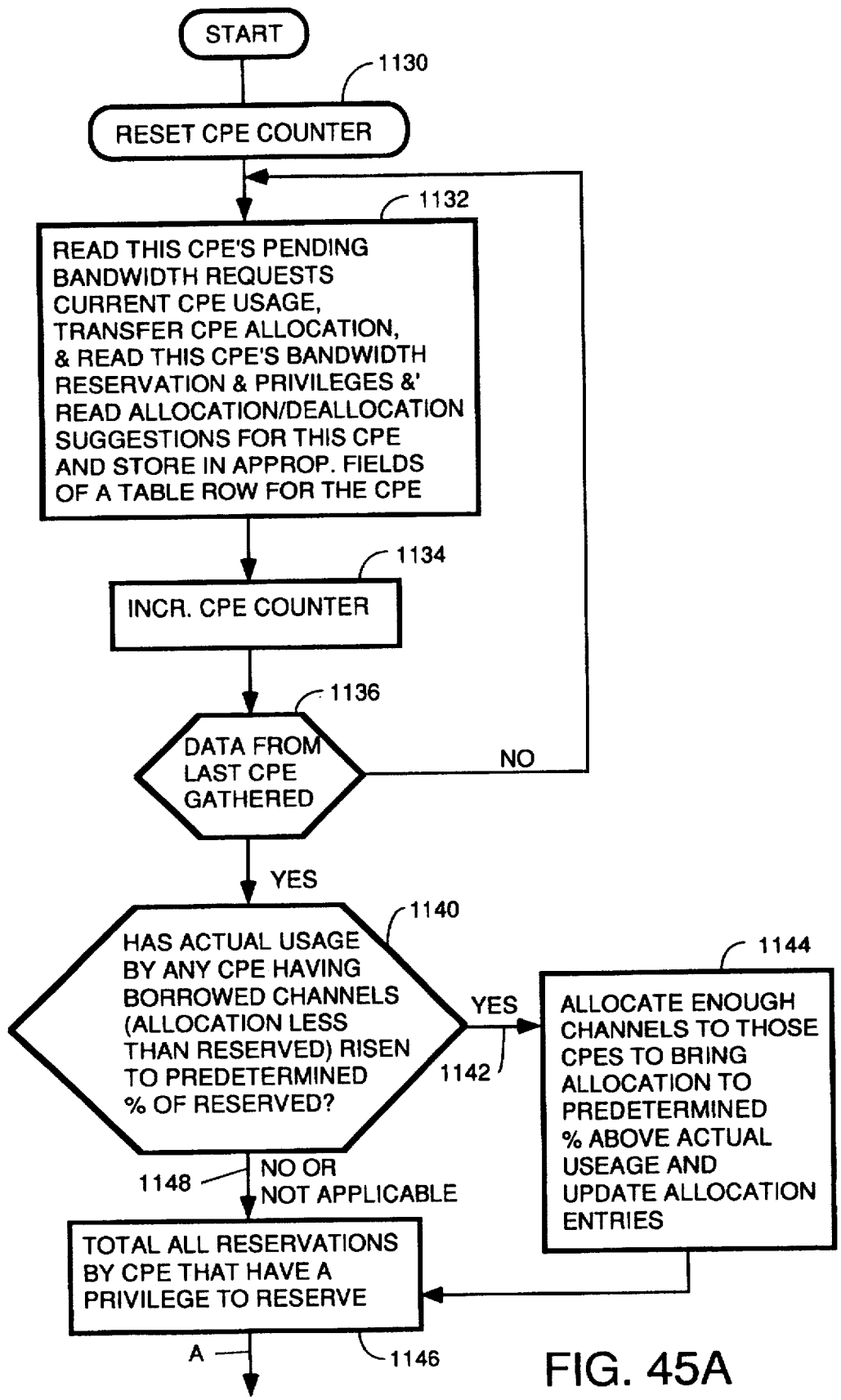
FIG. 45, comprised of FIGS. 45A, 45B and 45C, is a flow chart illustrating more details of one embodiment for the dynamic bandwidth reallocation process symbolized by block 1108 in FIG. 43.
Figure 45B:
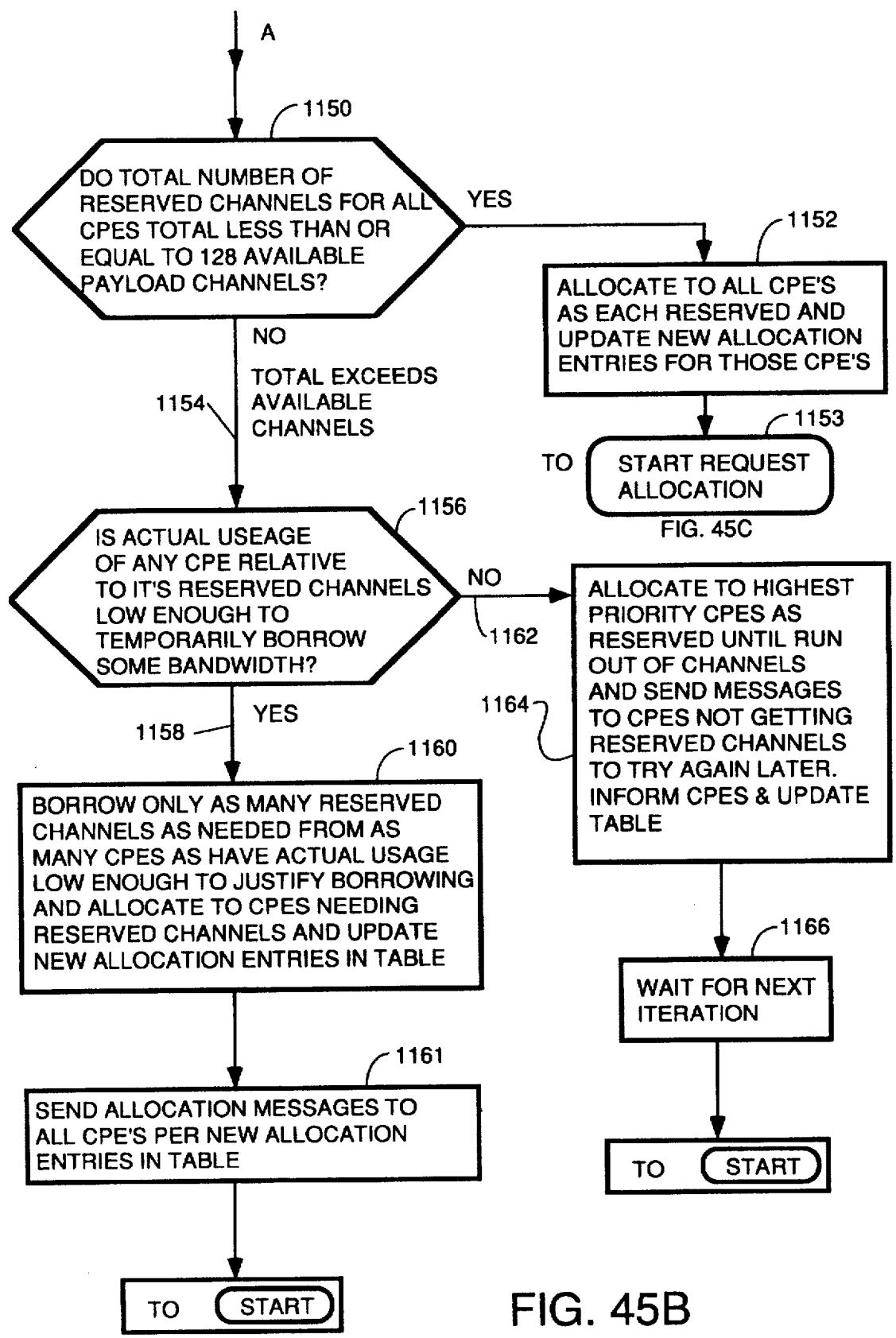
Figure 45C:
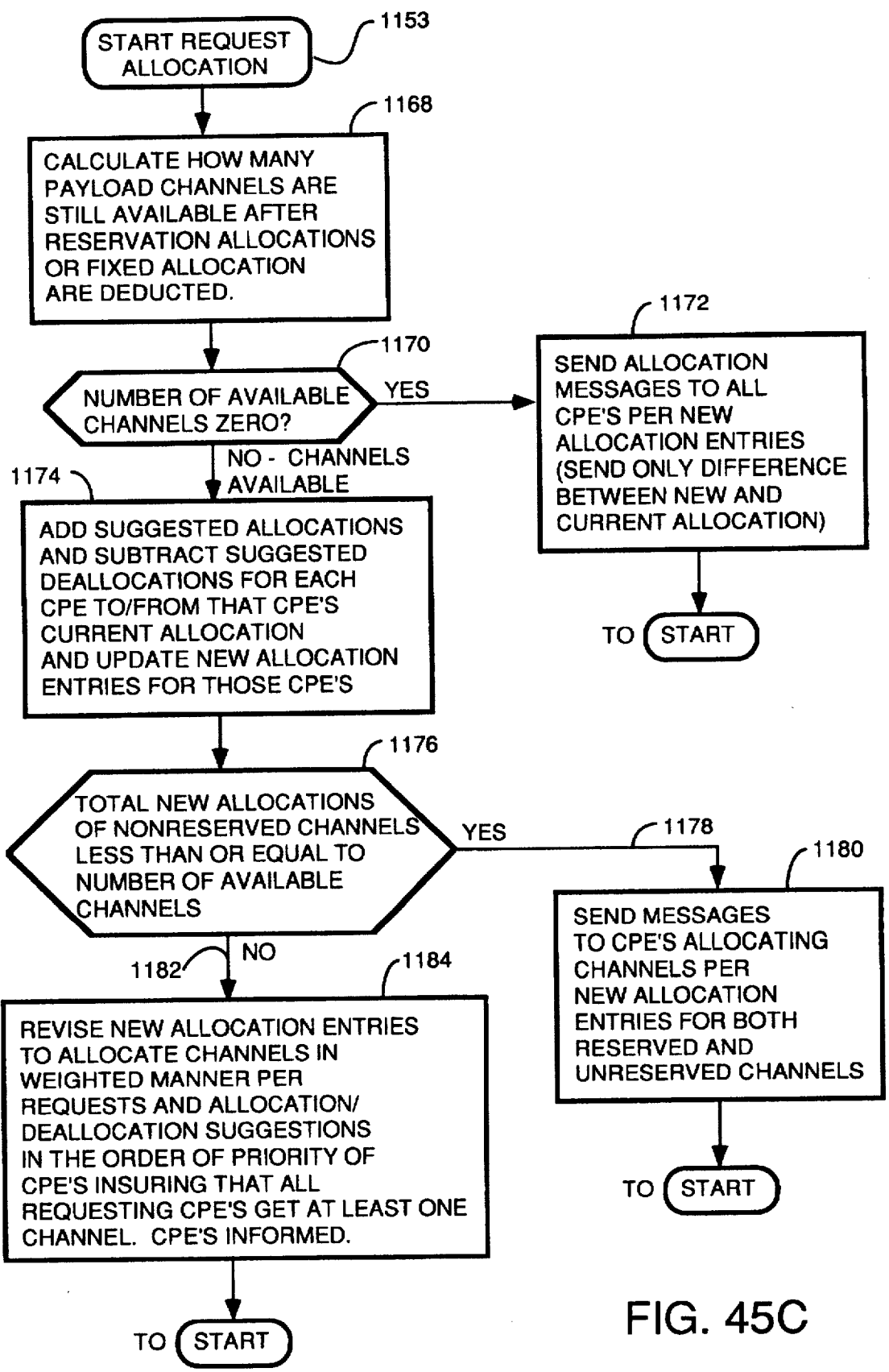
Figure 46:
FIG. 46 illustrates one possible structure for a table of data for use by the process of FIG. 45 in dynamically reallocating bandwidth.

FIG. 45, comprised of FIGS. 45A, 45B and 45C, is a more detailed flowchart of the preferred embodiment of the processes of block 1108 and 1110 showing how the allocation decisions are made and distributed. The process starts with block 1130 which represents the step of resetting a CPE counter to zero to prepare for scanning all CPEs for their requirements and actual usage. Next, in step 1132, the head end computer 1014 creates a table having a row for each CPE, each row having multiple fields. Then, starting with the CPE pointed to by the current contents of the counter, the head end computer reads certain data pertaining to that CPE and writes each item of data to the appropriate field in the row which pertains to the CPE currently pointed to by the CPE counter. The fields in a row for each CPE are illustrated in FIG. 46. Step 1132 represents the process of reading and storing for the CPE pointed to by the current contents of the CPE counter the following items of data. Any pending bandwidth requests not already processed are read and stored in field #1. The current CPE bandwidth usage in the form of the number of ATM cells transmitted to and received from that CPE in the last 10 milliseconds is read, and that data is stored in field #2. The current CPE allocation of channels, meaning the allocation awarded this CPE during the last 10 millisecond period is stored in field #3. This data is transferred from the new CPE allocation field #4 which stores data indicating how many channels this CPE was awarded during the channel allocation calculation performed during the last 10 milliseconds. Next, any new bandwidth or channel reservations made by this CPE in access requests which have not already been processed are stored in field #5 in the "new" subfield. Field #5 also has an "old" subfield which stores the previous iteration reservation number which is needed to determine if channels have been borrowed temporarily from this CPE during a previous iteration, as described below. The head end computer also checks field #6 to determine if this particular CPE has privileges to make bandwidth reservation requests. Such privileges will be awarded to subscribers who pay higher rates. Finally, any allocation/deallocation suggestions made in steps 1104 and 1106 in FIG. 43 are read and stored in field #7.

The CPE counter is then incremented in step 1134, and the test 1136 is performed to determine if the CPE counter has been incremented past the last existing CPE. If not, step 1132 is performed again for the next CPE pointed to by the CPE counter. Finally, when all CPE data has been gathered, path 1138 is taken to test 1140. Test 1140 determines whether the actual usage by any CPE which has had channels borrowed during previous iterations from the channels the CPE previously reserved to it (as indicated by a current allocation less than the old reservation number stored in the "old" subfield of field #5) has risen to a predetermined percentage of the reserved bandwidth. Actual bandwidth usage is calculated by multiplying the number of ATM cells transferred to and from the CPE during the last 10 millisecond period times the number of bits in an ATM cell, the result divided by 10 milliseconds to give bits per second. Each channel in the old reserved channel number has a maximum bit transfer rate of 8 megabits per second. Therefore, the percentage of the reserved bandwidth actually used is calculated by dividing the actual number of bits per second by the quantity [number of channels reserved in the old reserved channels number times 8,000,000 bits/second/channel]. The percentage of the reserved bandwidth that will trigger a yes result in test 1140 is configurable in some embodiments and fixed in others. If this percentage is equalled or exceeded, path 1142 is taken to step 1144 where, in the preferred embodiment, enough channels are allocated to those CPEs that have channels borrowed but which now need some of the reserved capacity back, to provide an allocation for those CPEs which is the predetermined percentage above the actual usage. These allocated channels are then recorded in the new CPE allocation fields #4 for each of the CPEs that have had their allocations updated in this manner. Processing then proceeds to step 1146. Likewise, if test 1140 indicates that no borrowing of channels from reserved channels has occurred or that actual usage by any CPE from which channels have been borrowed has not risen to the point where channels have to be given back, then path 1148 is taken to step 1146.

Step 1146 total all reservation requests by all CPEs that have a privilege to reserve, by adding all the numbers in the column defined by the "new" subfield in bandwidth reservation field #5 for all rows of the table with a "yes" indication in field #6. Next, test 1150 is performed to determine if the total number of reserved channels calculated in step 1146 is less than the or equal to the 128 available payload data channels. If the answer is yes, step 1152 is performed to allocate to all CPEs the number of channels each reserved, and those allocations are written into the new CPE allocation fields #4 for each CPE which has reserved channels. Those same reserved channels are written into the "old" subfield of field #5 for use in subsequent iterations to determine if borrowing has occurred. The numbers in the "old" subfield of field #5 do not change until a new reserved number of channels is awarded. Likewise, the numbers in the "new" subfield of field #5 do not change until a new bandwidth reservation request is issued by a CPE.

Because of the possibility that there are CPEs that have made bandwidth requests that either are not reservations or the CPE has made a reservation request but is not authorized to make such a request (in which case the reservation request is treated as an ordinary bandwidth request) and there is still available bandwidth, process proceeds from step 1152 to step 1153 representing the start of the request allocation routine.

Returning to the consideration of test 1150, if it is determined that the total number of reserved channels calculated in step 1146 exceeds the number of available payload channels (normally 128 unless some portion of them have been allocated on a fixed or permanent basis to some CPEs), then path 1154 is taken to test 1156 to determine if demand can be met by borrowing. Test 1156 examines the actual usage of bandwidth by each CPE compared with reserved bandwidth by comparing the number in field #2 to the number in the "old" subfield of field #5 for each CPE with a number in the "old" subfield of field #5. If the actual usage number for any CPE with reserved bandwidth is low enough compared to the reserved bandwidth to justify temporarily borrowing some bandwidth, then path 1158 is taken to step 1160.

Step 1160 borrows only enough channels to fill the needed number of reserved channels determined in step 1146. The borrowing is done from CPEs determined in test 1156 to have usage which is low enough compared to the amount of bandwidth reserved to justify the borrowing. The percentage of reserved bandwidth which is low enough to justify borrowing can be a fixed percentage in some embodiments or can be configurable in the preferred embodiment. The borrowed channels are allocated to CPEs requesting reserved channels and which had actual usage in the last 10 millisecond period indicating the reserved channels are actually needed. After these allocations are made, the current CPE allocation data in field #4 is updated for all CPEs being awarded new channels and from which channels have been borrowed.

After step 1160 is performed to do any borrowing which is possible and necessary, step 1161 is performed to send downstream allocation messages to all CPEs informing them of their new allocations in accordance with the data in the new allocation fields #4 in the table. Processing then returns to step 1130 on FIG. 45A to start the process over again.

If test 1156 determines that no borrowing of reserved channels is justified, path 1162 is taken to step 1164. Step 1164 handles the overflow of reservation requests by allocating available channels to the highest priority CPEs in the number each reserved until the supply of available channels is exhausted. The head end computer sends downstream messages informing the CPEs that have had channels reserved to them as requested the channel numbers that have been reserved to them and updates the data in field #3 of the table and the "old" subfield of field #5 to reflect the new allocations and the corresponding reservations. Finally, step 1164 is completed by sending downstream messages to CPEs that did not get the reserved channels that they asked for that system capacity is overbooked and to make their request again later. Processing then proceeds to step 1166 to wait for the next iteration and then returns to step 1130 on FIG. 45A to start the process over again on the next iteration.

Referring to FIG. 45C, there is shown a flow diagram of the processing for allocating bandwidth requests that are not in the nature of reservations. Step 1153 represents the start of this process. Step 1153 is reached from step 1152 on FIG. 45B if reservation requests are less than total available bandwidth and reservations have been allocated as requested and there is leftover bandwidth or from step 1152 in the case where no reservation requests have been made and all available bandwidth is to be allocated according to regular bandwidth requests. The first step in this process is symbolized by block 1168 where the head end computer calculates how many payload channels are still available after any reservation allocations (or other allocations such as fixed allocations) are taken into account. Then, test 1170 determines if the number of available channels is zero. If the number of available channels is zero, step 1172 is performed to send allocation downstream messages to all CPEs per the new CPE allocation data in fields #4 in the table. In all downstream allocation messages, only the differences from the last allocation are sent to each CPE.

If test 1170 determines that channels are available, step 1174 is performed. This step adds to the data in field #3 for each CPE (the current CPE allocation of channels) any suggested additional channel allocations generated in step 1104 of FIG. 43 and subtracts from the data in field #3 for each CPE any suggested channel deallocations. These totals are then stored temporarily in the new CPE allocation fields #4 in the table.

Next, test 1176 is performed to total these proposed new allocations of nonreserved, available channels by adding up the numbers in fields #4 for CPEs that have not reserved channels, as indicated by zeroes in the "old" subfield of field #5 and to test that total against the number of available channels. If the total derived by step 1176 is less than the number of available channels, the temporary allocation reflected in fields #4 is retained as the new allocation. In that case, path 1178 is taken to step 1180 where downstream messages are sent out to the CPEs indicating their new allocations in accordance with the data stored in field #4 of both reserved and unreserved but awarded channels. In other words, these messages tell CPEs that have reserved channels that their reservations have been accepted, and tell CPEs that have not reserved channels but which have requested them that the number of channels they requested have been awarded to them.

If test 1176 determines that the total new allocation of unreserved channels in accordance with requests would exceed the total available number of channels, then path 1182 is taken to step 1184. Step 1184 revises the new allocation data in fields #4 to allocate the available, unreserved channels in a weighted manner per the received bandwidth requests and the allocation and deallocation suggestions in the order of priority of the CPEs. In other words, the CPE requests plus allocations and deallocations are honored in the order of priority of the CPEs. However, in the preferred embodiment, this prioritization will save enough of the available channels to allocate at least one channel to each CPE which made a bandwidth request. In alternative embodiments, the available channels may simply be allocated in accordance with the bandwidth requests from the CPEs and suggested allocations and deallocations until the available channels are exhausted. In either type embodiment, downstream messages are formulated telling the CPEs which channels have been allocated to them, or, if not channels have been allocated to one or more CPEs, downstream messages may inform these CPEs that system capacity has been temporarily exceeded and to try again later.

- The priority channel allocation scheme is designed to ensure that CPEs requiring bandwidth lower than their minimum guaranteed rate will get this bandwidth always. However, this means that while a CPE is negotiating a connection setup, a connection may be refused if the aggregate minimum guaranteed bandwidth exceeds the bandwidth available. That is, the following mathematical relationship must always be maintained:

$$\sum_{VLI} B_{MAX} \leq B_{AVAIL}$$

Figure 44:
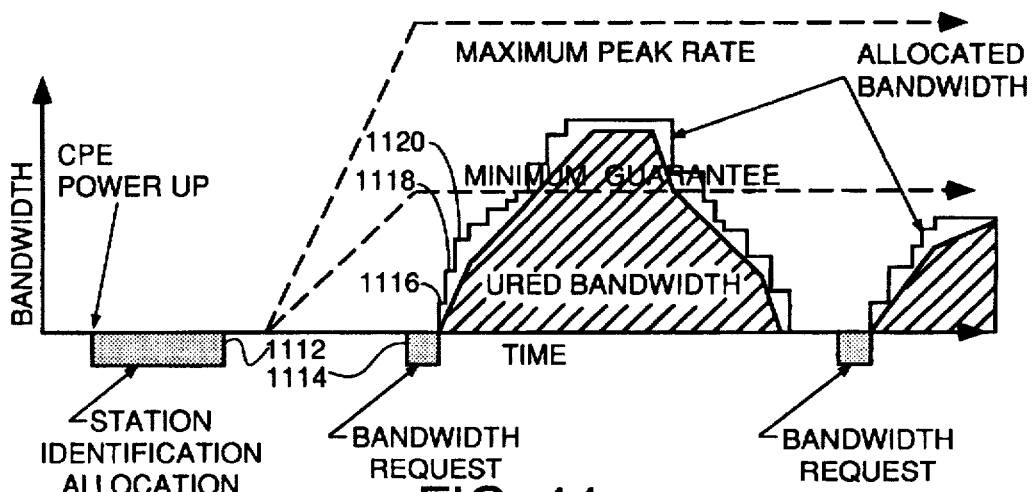
FIG. 44 illustrates how bandwidth allocation is dynamically altered in accordance with bandwidth actually used.

There is however no restriction on the peak rate allocated, apart from the restriction that the maximum peak rate approved must be less than the available bandwidth. FIG. 44 illustrates the operation of the bandwidth allocation scheme. The initial bandwidth allocation is made at station identification time indicated at 1112. Subsequently, the CPE makes a request for additional bandwidth at 1114. Assuming the request is granted, an additional allocation represented by step 1116 is given. Thereafter, as actual bandwidth used rises, additional allocations of bandwidth symbolized by steps 1118 and 1120 etc. are automatically given. This process of allocating and deallocating bandwidth continues as actual usage rises and falls until the bandwidth needs of that CPE are satisfied.

DATA LINK LAYER

The data link layer provides the capability to transfer ATM cells between multiple end stations and the head end and vice versa. The hardware and software on the data link layer handles the following issues: ATM cell framing—such that the beginning and end of each ATM cell can be determined by both the CPEs and the head end; addressing - providing the ability to send a cell to a specific CPE, and to know from which CPE a cell came; multicast/broadcast support—enabling the transmission of an ATM cell to multiple CPEs simultaneously; interface to upper layers—provides a standard interface to upper layers.

Framing of ATM cells is as described above with reference to FIGS. 30 and 31. Note that the downstream ATM cell format is the only cell format where the ATM cell needs to have two additional bytes of virtual link header in addition to the 53 bytes of a standard ATM cell. The virtual link header information is necessary to designate to which CPE the ATM cell is directed. The upstream cell format needs no virtual link header information because all ATM cells are directed to the same place, i.e., the head end. However, both cell formats need 9-bit bytes so that the 9th bits can be coded with a "start of ATM cell" code, CRC bits for the ATM cell (and its header in some embodiments) and possibly some sidechannel bits.

Figure 47:
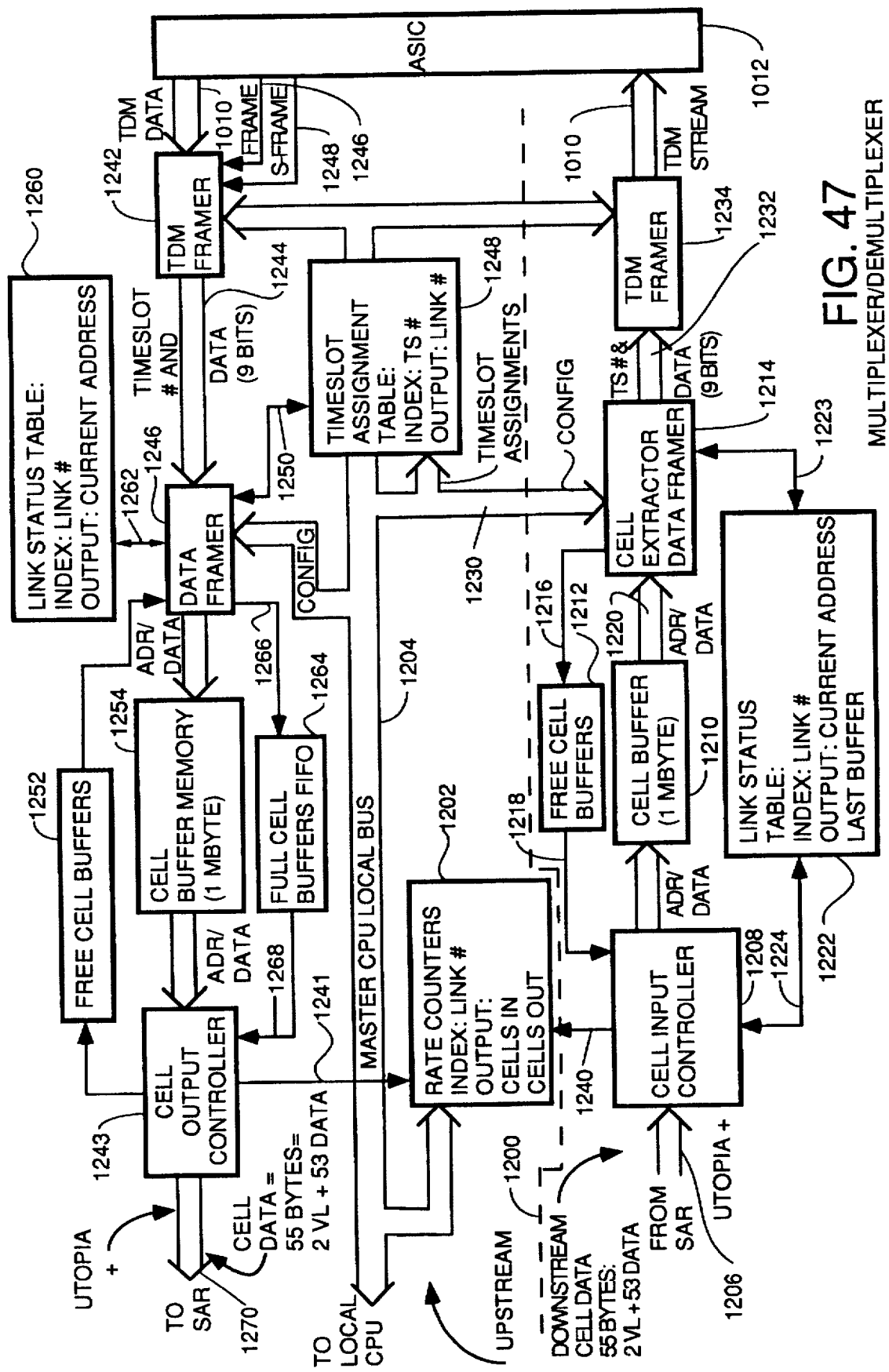
FIG. 47 is a block diagram of the preferred embodiment for the multiplexer/demultiplexer ATM/SCDMA interface 1008 in FIG. 27.

Referring to FIG. 47, there is shown a block diagram for the preferred structure for the multiplexer/demultiplexer ATM/SCDMA interface 1008 in FIG. 27. The circuits below dashed line 1200 handle data in the downstream path, while circuits above the dashed line 12 handle data in the upstream path although some circuits like the rate counters 1202 and the master CPU local bus 1204 are shared by both sets of circuits.

The downstream circuits receive Utopia+format ATM cells on bus 1206 from the segmentation and reassembly controller 1002 in FIG. 27. The data on bus 1206 takes the form of a time division multiplexed stream of ATM cells with one 55 byte ATM cell in each time slot. These ATM cells have 53 bytes of data and a two byte virtual link header identifying the particular CPE to which they are directed. This virtual link information is added by SAR 1002 in FIG. 27 from information received on bus 1003 in FIG. 27 from a computer (not shown) carrying out higher level central management and control functions at the head end. The 55 byte ATM cells are received by a cell input controller and applied to the data inputs of a cell buffer memory 1210 which is one megabyte in depth in the preferred embodiment. The cell input controller 1208 is a memory controller for memory 1210 which generates addresses to store all 55 bytes of each ATM packet. In the preferred embodiment, these addresses are sequential. The combination of cell buffer memory 1210 and cell input controller 1208 implement a pipeline memory stage to provide rate buffering between two circuits which may be processing data at different rates, e.g., the SAR and the SCDMA physical layer. If, for example, some peripheral coupled to the head end is pouring data into the SAR at a high rate, but the amount of bandwidth awarded to the virtual link on which the torrent of data is to be processed is temporarily too low to send out the incoming data as fast as it is arriving, the cell buffer memory 1210 temporarily stores the data until the physical layer catches up.

Each time a new ATM cell arrives on bus 1206, the cell input controller 1208 retrieves a new base address from a free cell buffers memory 1212. Memory 1212 stores the starting addresses of each ATM cell stored in cell buffer memory 1210 which has been read therefrom by a cell extractor circuit 1214 for transmission by the physical layer. The cell input controller 1208 then generates sequential offset addresses for each byte of the cell and writes the bytes into memory 1210. As the cell extractor reads each ATM cell's data out of memory 1210, it stores the starting address of the cell in free cell buffer memory 1212 via bus 1216. The cell input controller then retrieves a free base address at which to start storing the data from the next cell from the free cell buffer memory 1212 using bus 1218.

Link status table memory 1222 stores data regarding which cell buffers (a sequence of 55 byte storage locations in cell buffer memory 1210 will be called a cell buffer herein) in cell buffer memory 1210 actually contain an ATM cell which has not yet been read out of the memory for transmission by the physical layer. When the cell input controller 1208 writes an ATM cell into a cell buffer within cell buffer memory 1210, it writes the base address, i.e., the starting address of the cell buffer into link status table 1222 via bus 1224. The link number of the virtual link identified in the two byte virtual link header is also stored in link status table 1222.

The cell extractor/data framer 1214 determines which is the next ATM cell that needs to be read from the cell buffer memory 1210 by reading the output data from the link status table memory 1222. The cell buffer memory 1210 is managed as a FIFO, so the ATM cells can be processed by the physical layer in the order received from each source (with interleaving among sources) so that the order of the ATM cells from each source can be preserved. The link status table memory 1222 keeps a record of the order of reception of the ATM cells stored in the cell buffer memory 1210 for each virtual link and outputs the starting address of the next ATM cell that needs to be processed for each virtual link. The cell extractor/data framer 1214 receives information from the master CPU and its local bus 1230 regarding which timeslots on bus 1232 each virtual link has been assigned. The function of the cell extractor/data framer 1214, at its highest level, is, for every timeslot on bus 1232, to extract the next ATM cell in sequence which is directed to the CPE assigned to the virtual link corresponding to the timeslot being filled. The ATM cell is extracted from cell buffer memory 1210, in the same order as received from the source which is sending data to the CPE corresponding to the logical channel and timeslot being filled. The ATM cell so extracted is then dissasembled and one byte from the ATM cell so extracted is placed on bus 1232 in its assigned timeslot. The next time a timeslot assigned to the logical channel/CPE to which the ATM cell so extracted is directed becomes available for filling, the extractor/data framer retrieves the next sequential byte from the ATM cell so extracted and places it in the timeslot. This process continues until the entire ATM cell has been transmitted to the CPE to which that ATM cell is directed.

The cell extractor/data framer 1214 reads all the 8 bit bytes of each ATM cell via bus 1220 in the proper order using addresses supplied on bus 1223 from the link status table and adds the 9th bit discussed previously in connection with FIG. 31 to each byte. The cell extractor/data framer 1214 encodes the 9th bits of the first 8 bytes of each ATM cell with a start code to show the downstream formatter where the ATM cell starts and to include CRC information for the ATM cell data so that errors can be detected and corrected.

Bus 1232 is coupled to time division multiplexing framer circuit 1234. The function and structure of this TDM framer circuit 1234 is to take the 9-bit bytes out of the cells and place them on bus 1010 coupled to the ASIC 1012. The data on bus 1010 is organized as a time division multiplexed stream comprised of 128 timeslots corresponding to the 128 channels. The TDM framer circuit places the 9-bit bytes of the ATM cells on bus 1010 aligned with the timeslot boundaries, and when there is no ATM cell data to send, generates idle cells and places them on the bus 1010 aligned with the timeslot boundaries. The TDM framer includes circuitry to take the data from cell extractor/data framer 1214 via bus 1232 in parallel format and place it on bit serial format bus 1010 with each byte aligned with a timeslot boundary and each timeslot on bus 1010 carrying 9 bits aligned with 9 bit times within the timeslot. ATM cell boundaries are not required to be aligned with frame boundaries. The idle cells have their 9th bits encoded with start codes at the beginning of each cell so as to keep the CPE cell framing recovery circuitry in sync since ATM cell boundary synchronization is maintained using the downstream 9th bit data.

The cell input controller 1208 is coupled to the rate counters circuit 1202 by bus 1240. Bus 1240 is used by the cell input controller to update information in the rate counter memory 1202 each time an ATM cell is stored in the cell buffer memory 1210. Bus 1240 is used to increment the count of ATM cells sent to whatever CPE is assigned to the virtual link number in the virtual link header of the ATM cell just stored. A similar connection, bus 1241 is used by a cell output controller 1243 for a similar purpose in updating ATM cell numbers received in the upstream data from each CPE.

The rate counters circuit is a memory which stores the number of ATM cells received from each CPE and the number of ATM cells transmitted to each CPE during each 10 millisecond period between bandwidth reallocation calculations. The rate counter circuit is read by the master CPU 1014 via bus 1204 during the bandwidth reallocation calculations to determine actual bandwidth usage by each CPE. The rate counter data is indexed by virtual link number, which the computer 1014 translates to particular CPE IDs since computer 1014 knows which CPEs have been assigned to which virtual links at all times.

Upstream data from the CPEs arrives as a time division multiplexed, bit-serial data stream organized into 128 timeslots on bus 1010, each timeslot carrying 9 bits. Bus 1010 has two separate data paths, one in each direction. The time division multiplexed data is received by TDM framer 1242. The incoming data on bus 1010 is a stream of bits which must be reassembled into the 9 bit bytes of the ATM cells from which the data originated. The TDM framer 1242 recovers the byte boundaries and reassembles the bits into 9-bit bytes and outputs them on bus 1244. Frame boundaries are recovered with the help of Frame and Superframe control signals from the ASIC 1012 on lines 1246 and 1248, respectively. The Frame signal is activated at the start of each frame boundary. The TDM framer 1242 then counts out 9 bit times for each timeslot thereby recovering the byte boundaries and counts out 128 timeslots. Each 9-bit byte recovered from the bitstream on bus 1010 is tagged by the TDM framer with a timeslot ID indicating for each 9-bit byte the timeslot from which it came. The timeslot ID or number for each byte corresponds to the virtual link or channel, i.e., the SCDMA code used to transmit that byte. The channel or code used identifies the CPE from which the byte came since the timeslot/channel allocation assigned to each CPE every 10 milliseconds is known.

The stream of 9-bit bytes on bus 1244 is received by data framer 1246 and reassembled into 53 byte ATM cells. The data framer 1246 uses the timeslot ID tags on each byte to determine from which CPE each byte came. This is done by using the timeslot ID for each byte as an index into a timeslot assignment table 1248 via bus 1250. The timeslot assignment table stores data correlating each timeslot number to the virtual link number in accordance with the bandwidth/ channel allocation decisions made by the head end central management and control process carried out in computer 1014 or some other computer. The channel allocation decisions are input to the timeslot assignment table via master CPU local bus 1204 each time a reallocation is made so as to update the table data. When the table is presented with a timeslot number, it returns a virtual link ID number indicating the CPE from which the byte originated. The data framer uses the virtual link numbers to get bytes into the appropriate cells and uses the start codes encoded into the 9th bits coupled with the fact that it is known that there are only 53 bytes to each ATM cell to find the ATM cell boundaries. Only conventional 53 byte ATM cells are needed at this point because for the upstream data, there is only one destination and, at this point in the stream, the source CPE is known by virtue of the timeslot number tag on each byte.

The data framer 1246 keeps track of the state of completion of each cell using a link status table in memory 1260. The link status table stores the current address in cell buffer memory 1254 in which was stored the last byte retrieved from bus 1244 for the ATM cell under construction for each virtual link number. In other words, the data framer is receiving interleaved bytes from many different CPEs, all belonging to different ATM cells. The data framer must keep track of which ATM cell is under construction for each virtual link number, and where in that ATM cell under construction the next received byte which is part of that ATM cell is to be stored. To derive the address where the next byte for any particular ATM cell is to be stored, it is only necessary to retrieve and increment the "current address" stored in the link status table in memory 1260 for the virtual link over which this ATM cell is being transmitted. The data framer 1246 uses the link status table in memory 1260 to keep track of the process of constructing multiple ATM cells being transmitted from multiple sources so that bytes retrieved from timeslots are stored in the correct ATM cell and in the correct sequence within each ATM cell. The index into the table is the virtual link number, and at the memory location indexed by this virtual link number will be stored the current address in cell buffer memory 1254 in which to store the next byte received over that virtual link. The data framer 1246 reads and updates the data in memory 1260 via bus 1262.

After storing each new byte in an ATM cell buffer in memory 1254 at the address pointed to by the link status table, the data framer 1246 determines if the byte just stored completes the ATM cell being constructed by checking to see if the address in which it stored the byte is the 53rd sequential address in the ATM cell from the base address at which storage of data for this ATM cell started. If so, then the data framer retrieves the next free ATM cell buffer base address from the free cell buffers memory 1252 and starts construction of a new ATM cell there when the next byte from the same CPE arrives. Also, upon completion of an ATM cell, the data framer 1246 writes the base address of the completed cell into a full cell buffers memory 1264 via bus 1266. The address data stored in the full cell buffers memory 1264 is used by the cell output controller 1243 in reading ATM cells out of cell buffer memory 1254 for distribution to the SAR. Each full ATM cell stored in a cell buffer in memory 1254 is tagged with the virtual link number over which the data was transmitted. In the preferred embodiment, each CPE is assigned a constant virtual link number and only the codes and timeslots used to carry data for that virtual link change from one bandwidth allocation to another.

The data framer 1246 like the TDM framers 1234 and 1242 and the cell extractor/data framer 1214 as well as the cell input controller 1208 and 1243 can be implemented either as hardware or software or some combination of the two.

After an ATM cell has been reassembled in memory 1254 from the data in the timeslots on bus 1010, it must be formatted into a Utopia+format for output to the SAR. A two byte virtual link header must be added to each of the 53 byte ATM cells stored in cell buffer memory 1254 so as to convey information to the SAR 1002 in FIG. 27 as to where the data came from. That process is carried out by the cell output controller 1243. This controller reads the base address of a completed ATM cell from the full cell buffers memory 1264 via bus 1268. The ATM cell and its virtual link tag stored beginning at the base address so retrieved is then read out and a two byte virtual link header is added to the cell. The modified cell is then placed in a timeslot on bus 1270 and transmitted to the SAR. The cell output controller then writes the base address in memory 1254 of the ATM cell just read into the free cell buffers memory 1252 for use by the data framer later in storing a new cell in an unused buffer. After extracting an ATM cell and placing it on bus 1270, the cell output controller 1243 also updates the rate counter information in rate counter memory 1202 via bus 1241 to indicate another ATM cell has been received over a particular virtual link. The data in the rate counters memory 1202 is used for both billing and for the adaptive bandwidth allocation algorithm.

Figure 48:
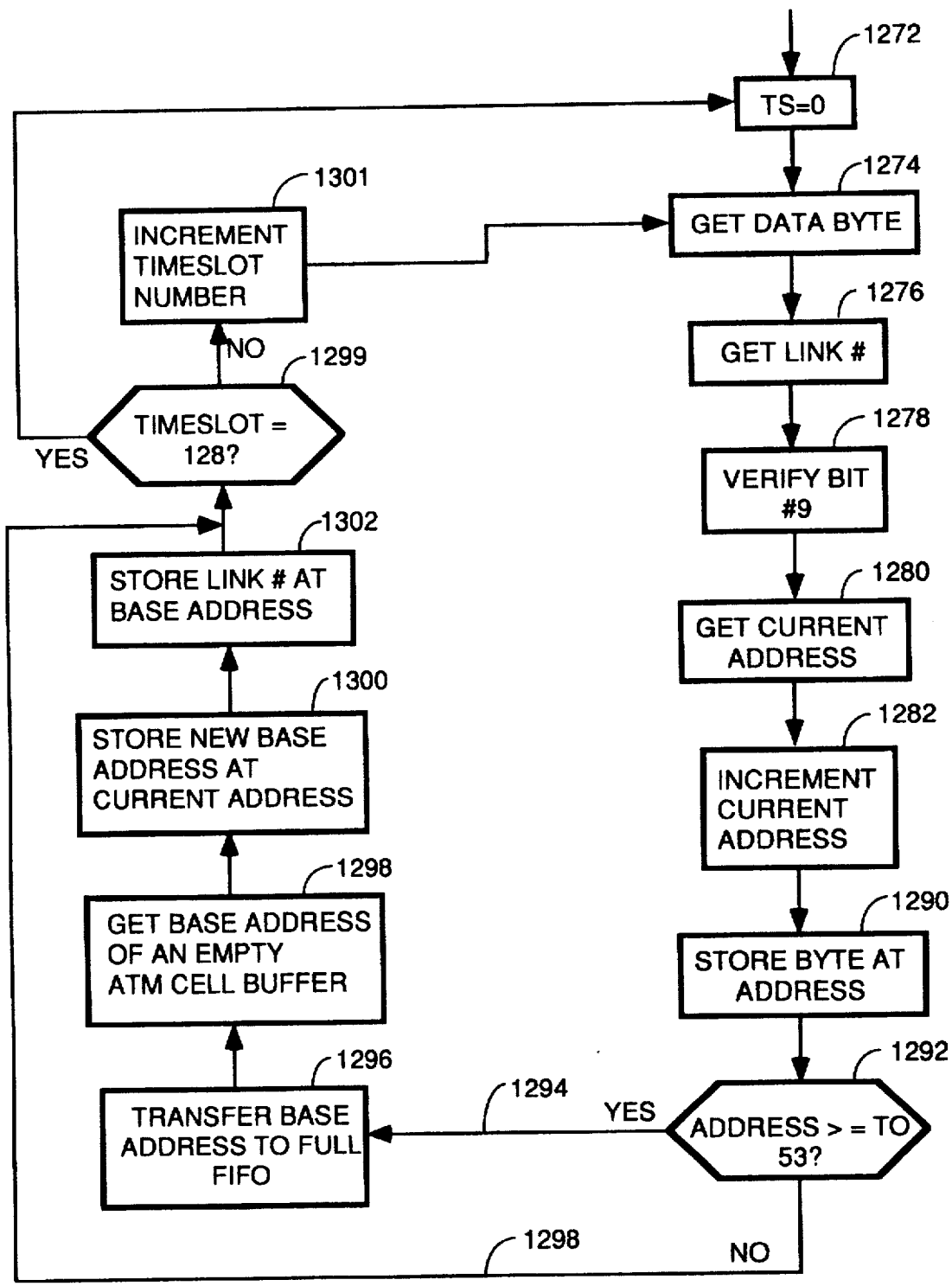
FIG. 48 is a flowchart of operations by the data framer 1246.

Referring to FIG. 48, there is shown a flow chart of operations by the data framer 1246. The process starts at block 1272 by setting the timeslot counter to 0 to synchronize to the frame boundary. In other words, the process of block 1272 is not performed until the Frame signal on line 1246 in FIG. 27 is activated indicating that a new frame of 128 timeslots is arriving on bus 1244. Then the entire process of FIG. 48 is performed for each timeslot on bus 1244.

The first byte in the first timeslot on bus 1244 is retrieved in the process symbolized by block 1274. The virtual link number for this timeslot is retrieved in the process symbolized by block 1276 by using the timeslot count as an index into the timeslot assignment table stored in memory 1248 in FIG. 47. Block 1278 symbolizes the process of verifying, during the first 8 timeslots only for this particular ATM cell, that the 9th bit for the particular timeslot whose 9-bit byte was just read from bus 1244 is the proper bit for the 8 bit start code stored in the 9th bits of the first 8 bytes. The data framer knows which byte of the ATM cell each CPE is currently transmitting because the head end knows when each cell starts from the start codes and then keeps a running count for each virtual link as to which byte in the ATM cell is the current byte. This count is maintained by the data framer by updating the data in the link status table stored in memory 1260. This process of block 1278 is done to verify synchronization at the start of every ATM cell. If the 9th bit is not what it is supposed to be, some error or loss of synchronization has occurred. In that case, error recovery processing which is not part of the invention may be performed, or the byte may simply be ignored. One type of error recovery that can be used is to send a message in the downstream data telling the CPE that has lost synchronization to resynchronize.

Block 1280 symbolizes the process that is carried out if the 9th bit is found in block 1278 to be what it is supposed to be for the particular timeslot being processed. Block 1280 represents the process of accessing the link status table using the virtual link number as the index and retrieving the current address. The current address in cell buffer memory 1254 is then incremented, as symbolized by block 1282. The byte read from bus 1244 is stored in the cell buffer memory 1254 at the address pointed to by the incremented current address as symbolized by block 1290.

Test 1292 determines if the current address is greater than or equal to 53. This means that the offset address (the "address" used in step 1290 to store the byte just stored) from the base address in which is stored the first byte of this ATM cell has reached 53 or more. If that is the case, the last byte stored was the last byte in the ATM cell under construction in the cell buffer memory 1254, and the ATM cell has been completely reconstructed from the data in the timeslots on bus 1244 in FIG. 27. In such a case, path 1294 is taken to the process symbolized by block 1296. If the ATM cell under construction is not yet complete, path 1298 is taken to test 1299 where it is determined whether the timeslot count is equal to 128. If the timeslot count has reached 128, the last timeslot in the frame has been processed, and processing is vectored back to block 1272 where the timeslot counter is reset to zero. If all 128 timeslots of the frame have not been processed, the timeslot counter in incremented in block 1301, and processing proceeds to block 1274 to get the next data byte from the next timeslot on bus 1244.

Returning to the consideration of test 1292, if the last byte in the ATM cell under construction has been stored for the virtual link identified in block 1276, block 1296 transfer the base address of the completed ATM cell to the full cell buffers FIFO memory 1264. This insures that the ATM cell just completed will be read out from the cell buffer memory 1254 by the cell output controller 1243 in the order it was received.

Next, to prepare for storing of the next ATM cell from the same virtual link, the process symbolized by block 1298 is performed to get the base address of an empty ATM cell buffer in cell buffer memory 1254. This is done by accessing the free cell buffers memory 1252 and pulling an address off the stack. Block 1300 symbolizes the process of storing the base address retrieved in this manner as the new current address. Then, the virtual link number retrieved in block 1276 is stored in this base address, as symbolized by block 1302. Processing then proceeds to test 1299 where it is determined whether the current timeslot being processed is the last timeslot in the frame.

Figure 49:
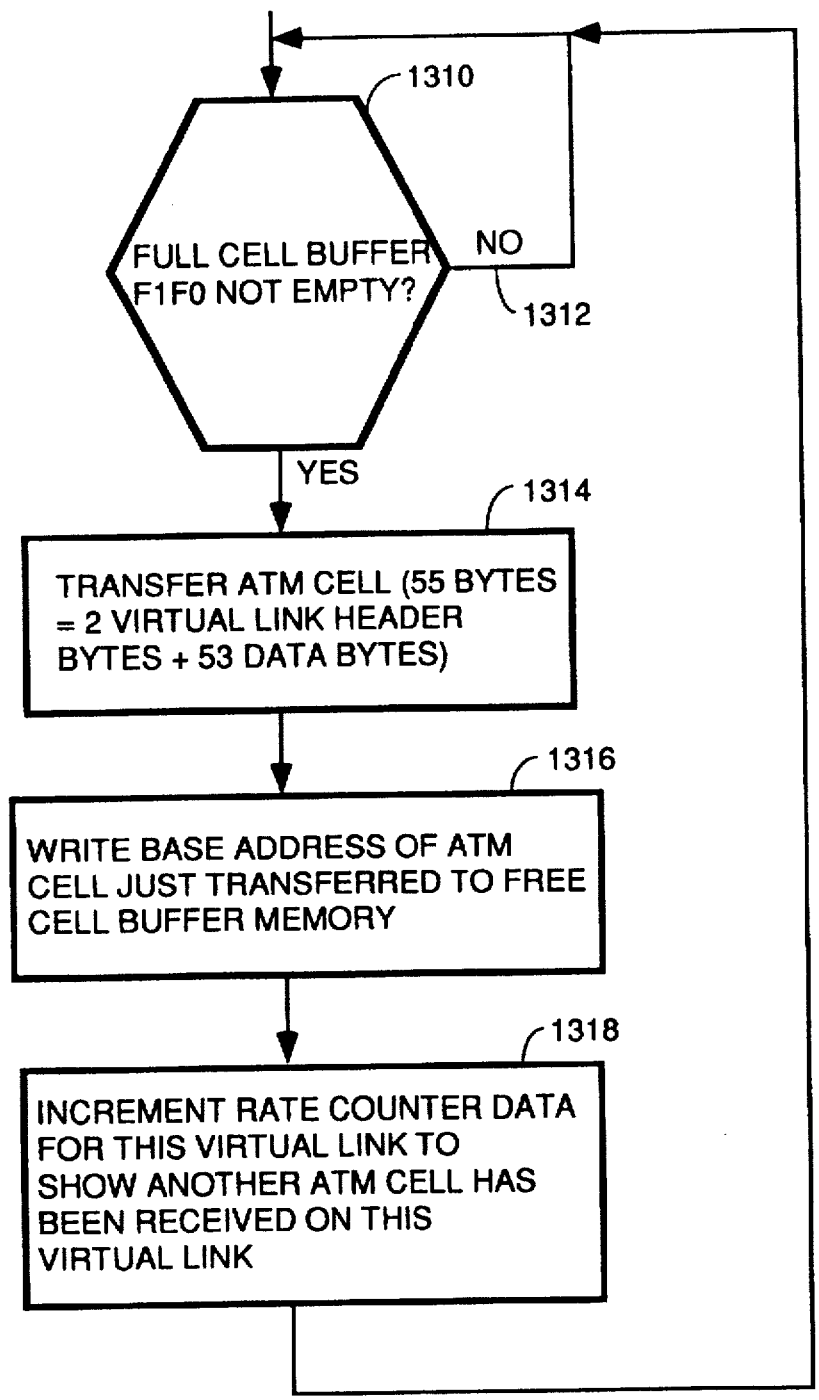
FIG. 49 is a flowchart of the processing carried out by the cell output controller 1243 in retrieving completed ATM cells from the cell buffer memory 1254 and transferring them to the SAR.

Referring to FIG. 49, there is shown a flow chart of the processing carried out by the cell output controller 1243 to retrieve completed ATM cells from the cell buffer memory 1254 and transfer them to the SAR. First, test 1310 is performed to determine if the full cell buffer FIFO 1264 has any addresses in it. If the FIFO is empty, the path 1312 is taken to stay in a holding pattern until an address appears in the FIFO meaning an ATM cell has been completed. If there is an address in the FIFO, the process symbolized by block 1314 is performed. Block 1314 transfers the ATM cell to the SAR by reading the base address in memory 1254 of the ATM cell from the FIFO 1264 and using it to access the bytes of the ATM cell pointed to by the base address. Block 1314 also represents the process of retrieving the virtual link number stored at the base address for the ATM cell being transferred and appending it as the two byte virtual link header in front of the 53 bytes of the conventional ATM cell the bytes of which are stored in sequential addresses in memory 1254 starting at the base address. The 55 byte ATM cell constructed in this manner in step 1314 is then placed in a timeslot in a Utopia+ format data stream on bus 1270 in FIG. 47.

Block 1316 represents the process of writing the base address of the ATM cell just transferred to the SAR into the free cell buffer memory 1252 as an indication that this cell buffer is now available for overwriting with data from the next cell. Finally, the process of block 1318 is performed to increment the rate counter data for this virtual link to show that another ATM cell has been received on this virtual link. Processing then returns to test 1310 to start processing for the next cell.

Figure 50:
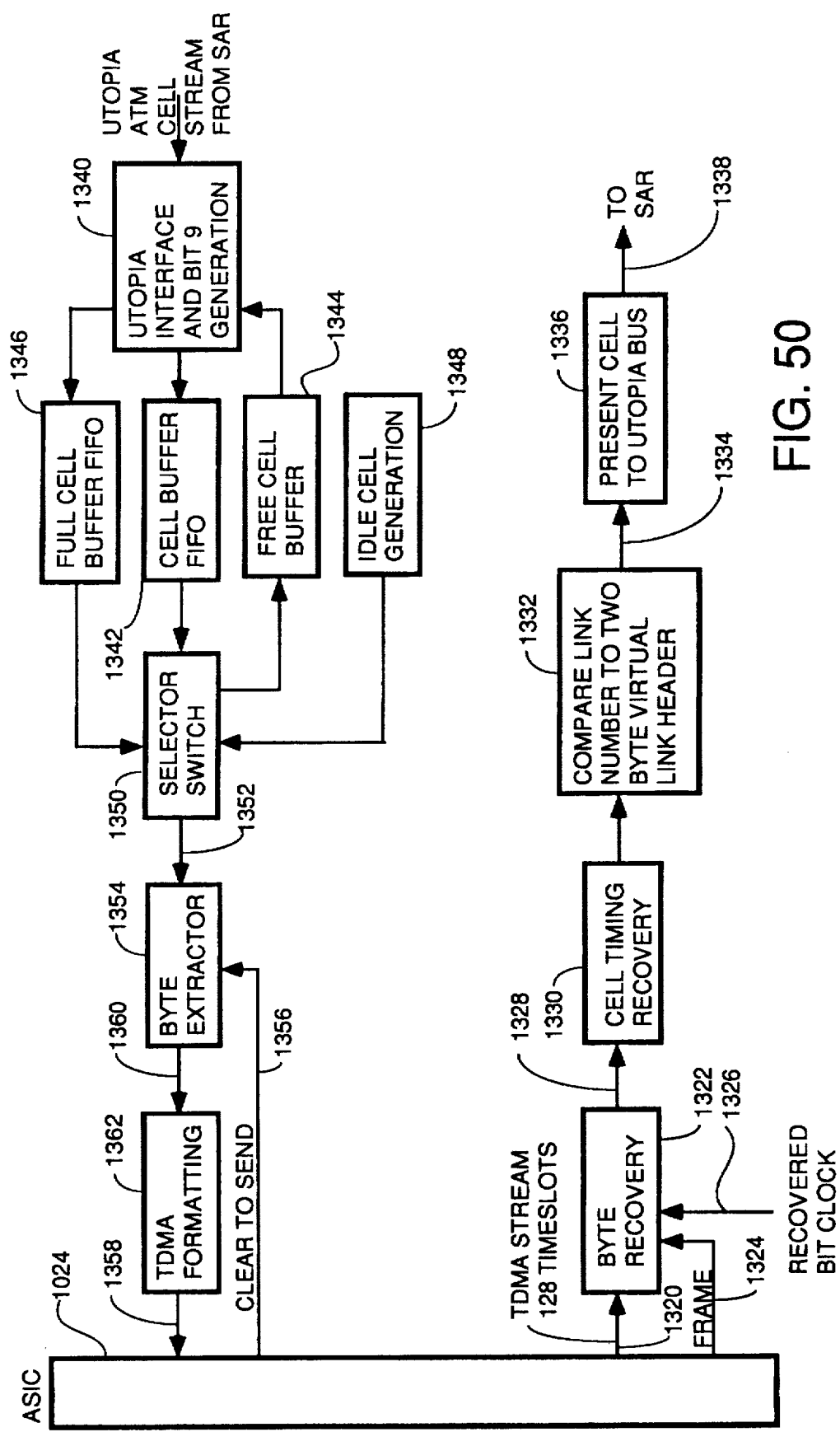
FIG. 50 is a block diagram of the circuitry inside a formatter 1030 inside every CPE modem.

Referring to FIG. 50, there is shown a block diagram of the formatter 1030 in FIG. 27. The purpose of the formatter in each CPE is, for the downstream data: to receive a TDMA stream of downstream data including ATM cells directed to that CPE, detect that fact, strip off the 2 byte virtual header and reconstruct the ATM cells and output the ATM cells in Utopia format. The purpose of the formatter in each CPE is, for the upstream data: to receive a Utopia format TDMA stream of ATM cells directed to the head end from the peripherals coupled to the CPE, add a 9th bit to each byte to encode ATM cell start codes, fill in any gaps with idle cells so cell timing synchronization will not be lost, fragment the ATM cells into their constituent bytes and output them as a TDMA stream.

Referring first to the downstream circuitry, the ASIC 1024 demodulates, descrambles and despreads the incoming RF signals and generates a time division multiplexed stream of 9-bit bytes in 128 timeslots on bus 1320. A byte recovery circuit receives this bit stream and is responsible for reassembling the 9-bit byte transmitted during each of the 128 timeslots. The byte recovery circuit 1322 receives a Frame signal on line 1324 from the ASIC which is activated by the ASIC at the beginning of each new frame. The byte recovery circuit then starts counting out timeslots by counting 9 bits per timeslot and assembling the first 9 bits as the first timeslot byte and the next 9 bits as the next timeslot byte. The byte recovery circuit receives a bit clock signal on line 1326 from a bit clock recovery circuit (not shown) and uses this bit clock signal to establish windows to recover the individual bits. The bytes on bus 1320 will not be scrambled and sequential bytes will all be from the same ATM cell until an ATM cell boundary occurs.

The collection of 9-bit bytes recovered by byte recovery circuit 1322 is output on bus 1328 to a cell timing and recovery circuit 1330. The cell timing and recovery circuit uses the 9th bits in the stream of 9 bit bytes to find and synchronize to the ATM cell boundaries. Once the ATM cell boundaries are recovered, the 55 bytes of each ATM cell are assembled and are buffered (buffering occurs in some embodiments and not in others depending upon the relative processing speeds of the stages of the formatter).

The ATM cells so assembled are then passed to a comparison circuit 1332. The comparison circuit compares the two byte virtual link header of each ATM cell to the virtual link number of the CPE in which the formatter resides. If there is a match, the two byte virtual link header is stripped off the ATM cell, and a 53 byte ATM cell is transmitted on bus 1334 to output circuit 1336. The output circuit presents the 53 byte ATM cell in a timeslot of Utopia format TDMA bus 1338 coupled to SAR 1034 in FIG. 27.

The upstream data path starts with a Utopia format ATM cell, time division multiplexed data stream on bus 1339 from SAR 1034 in FIG. 27. This data stream is received by a Utopia interface circuit which functions to add a 9th bit to each byte in each ATM cell. The first 8 of these 9th bits in each cell are encoded with a start code while the rest of the bits are encoded as CRC bits and possibly even a sidechannel of data in some embodiments. The Utopia interface circuit 1340 also serves as a memory controller for a small cell buffer FIFO 1342. When a complete ATM cell has been encoded with the 9th bits, the cell is stored in the cell buffer FIFO 1342. In some embodiments, this is done as in the case of the multiplexer/demultiplexer 1008 shown in FIG. 47. In these embodiments, the Utopia interface circuit 1340 accesses a free cell buffer memory 1344 and retrieves a base address of a free cell buffer in FIFO 1342. The 53 byte ATM cell of 9 bit bytes is then stored in 53 sequential addresses starting with the base address of the cell. The base address of the cell is then written by the Utopia interface circuit into a full cell buffer FIFO 1346.

To maintain cell boundary synchronization in the upstream data path, idle cells are transmitted during gaps when no real data is waiting to be sent. These idle cells have 9-bit bytes, and the first 8 bytes of each cell are encoded with a start code identical to the start codes in real ATM data cells. These idle cells are generated by idle cell generation circuit 1348.

A selector switch memory controller circuit 1350 functions to retrieve the ATM cells out of cell buffer FIFO 1342 when there are ATM cells stored there, and retrieves idle cells from idle cell generation circuit 1348 when there are no real ATM cells waiting to be sent. The selector switch memory controller retrieves the base address of any ATM cells stored in cell buffer FIFO 1342 from the full cell buffer FIFO memory 1346 and uses the base address of each cell to read the bytes of the cell. When a full ATM cell has been read from the cell buffer FIFO memory 1342, the base address of the buffer storing the cell is written by the selector switch memory controller into the free cell buffer 1344. The selector switch memory controller switches between sources of cells only on 53 byte boundaries.

The ATM cells read by the selector switch memory controller 1350 are available for transmission on bus 1352 to a byte extractor circuit 1354. The function of this byte extractor circuit is to pull a byte out of the selector switch memory controller each time the ASIC 1024 activates a Clear To Send signal on line 1356. The ASIC receives ATM cell data from the peripherals in the form of a 128 timeslot TDMA 9-bit byte stream on bus 1358. Although there are 128 timeslots on this bus, only the timeslots awarded to this CPE are "active". In other words, this CPE can transmit a byte only during the one or more of the 128 timeslots allocated to it by the bandwidth allocation algorithm. The byte extractor implements the media access control algorithm by extracting a byte from an ATM cell via bus 1352 only when the Clear To Send signal on line 1356 has been activated by the ASIC. This signal will be activated only when a timeslot allocated to this CPE is occurring on bus 1358. The byte so extracted is transmitted on bus 1360 to a TDMA formatting circuit 1362. This circuit places the byte so extracted on the bus 1358 in the timeslot allocated to the CPE and in bit synchronization with the bit times of the timeslot.

Optimized Embodiment With Reduced ATM Header Size

Figure 51:
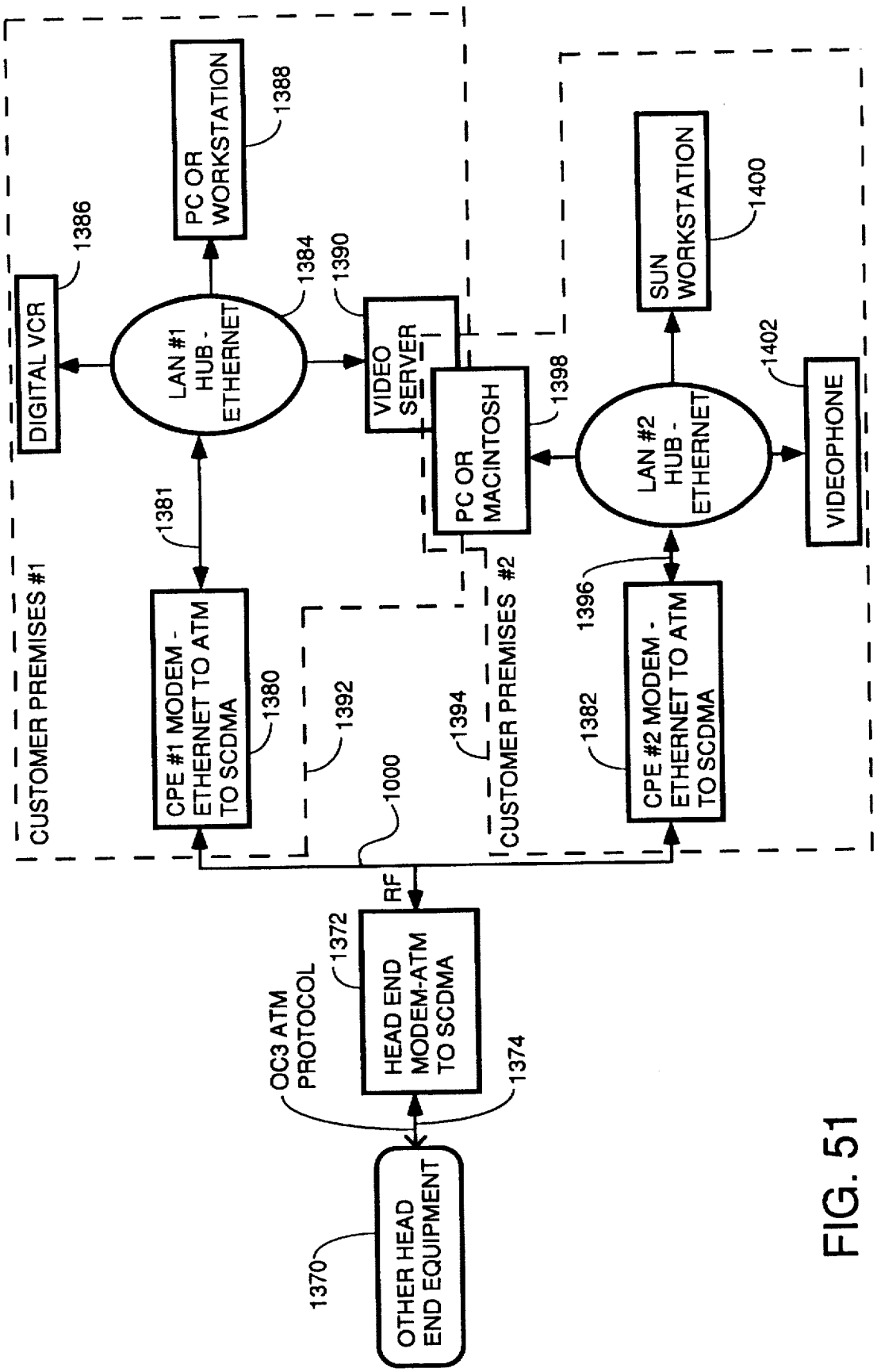
FIG. 51 is a block diagram of an optimized system according to the teachings of the invention to send data organized into ATM format cells over a CATV system bidirectionally between a head end modem and a plurality of CPE modems using SCDMA with the ATM cells optimized to have 2 byte headers in the downstream direction and 0 byte headers in the upstream direction.

Referring to FIG. 51, there is shown a block diagram of the preferred embodiment species within the genus of the invention. The embodiment of FIG. 51 is what will be referred to as an optimized embodiment because substantial bandwidth has been saved by reducing the size of the ATM cell header in the downstream direction and eliminating it altogether in the upstream direction. In the embodiment of FIG. 51, the head end equipment and interfaces to various service and wide area networks are represented by block 1370. In a preferred internetworking embodiment where the CPE can be coupled to wide area networks having TCP/IP transport protocols through an interface at the head end, block 1370 represents a standard router with a SAR built in. The circuitry inside block 1370, communicates with the head end modem 1372 using a bidirectional OC3 ATM protocol in a TDMA stream of standard 5 byte header ATM cells on bus 1374. The OC3 ATM protocol is the same as a Utopia format ATM cell TDMA stream except that line drivers are present which can drive the ATM cells over much greater distances. The Utopia protocol is a chip to chip data stream protocol which has a very short range.

The basic idea behind optimization is to use only one of the 16 million possible logical connections possible using standard 5 byte ATM cell headers for each CPE such that each CPE is serviced by only one logical channel. The multiple peripherals coupled to each CPE or the multiple data sources coupled to the head end modem that wish to send data to a particular CPE have their data time division multiplexed into the single logical channel serving that CPE. This allows reduction of the 5 byte header of each ATM cell down to 2 bytes in the downstream direction, said two bytes indicating which logical channel each ATM cell belongs to, i.e., to which CPE its data is directed. In the upstream direction, each ATM cell has no header at all since all upstream ATM cells are going to the same place, and since the source CPE can be identified by the timeslot in which the data from the CPE is output by the TDMA framer 1242 in FIG. 47.

In the embodiment of an optimized system shown in FIG. 51, the head end modem 1372 does all the processing previously described to take the ATM cells arriving on bus 1374 in standard OC3 ATM format (5 byte standard ATM cells wherein the least significant 16 bits identify the CPE to which the data is directed), reduce the header size to the 2 bytes which identify the logical channel/CPE to which the data is directed and encode the payload data using SCDMA spreading codes. The 5 byte standard ATM cell header in each ATM cell in the OC3 ATM format data stream on bus 1374 includes 3 bytes (24 bits) of address data called the VPI/VCI bits. It also includes one 8-bit byte checksum and 8 additional bits 4 of which are reserved for future expansion of the protocol and the other 4 of which are used for miscellaneous ATM functions which are not relevant to the invention. In the optimized embodiment of FIG. 51, the head end modem, for downstream ATM cells strips all of bits of the standard 5 byte ATM cell headers except for the 16 least significant bits of the 24 VPI/VCI bits which identify the particular logical channel to which each ATM cell belongs.

The payload data from the cell is then appended to this new 2 byte header and the cell is then output in a TDMA stream to the SCDMA encoding circuitry. The SCDMA spreading process works as previously described. The resulting RF signals are output on CATV HFC link 1000 in whatever frequency band is reserved for downstream data. Upstream data from the CPE is transmitted in SCDMA encoded RF signals in another frequency band as is the case for the other embodiments disclosed herein.

Figure 55:
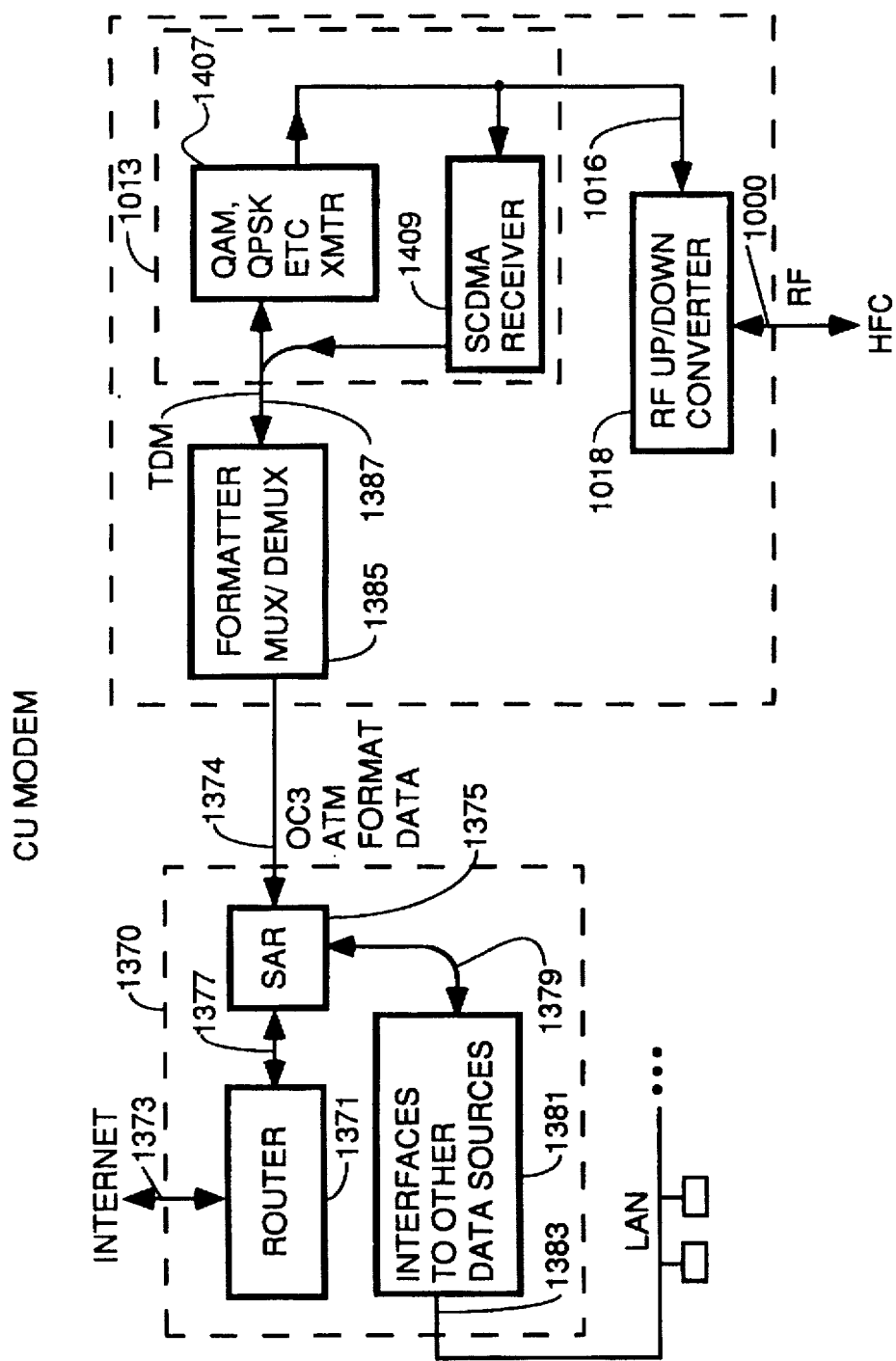
FIG. 55 is a more detailed block diagram of the circuits inside blocks 1370 and 1372 in FIG. 51.

FIG. 55 is a more detailed block diagram of the circuitry inside blocks 1370 and 1372 in FIG. 51. In the embodiment shown, the other head end equipment block 1370 includes a conventionally designed router 1371 which couples to a TCP/IP protocol wide area network such as the internet, represented by line 1373. The router communicates bidirectionally with SAR 1375 via bus 1377. Downstream data entering the SAR on bus 1377 contains data which gives the destination address of the destination peripheral coupled to the destination CPE to which the data is directed or of the destination software process in execution on a computer coupled to the destination CPE (or the Ethernet address of the destination peripheral or destination software process). The SAR is also coupled by bus 1379 to another interface circuit 1381 which is coupled to data sources which are local to the head end. Downstream data arriving on bus 1379 also includes destination address data identifying the destination peripheral or destination software process to which the data is directed. Typically, the other interface 1381 may be an Ethernet controller coupled to an Ethernet segment 1383 coupling the interface 1381 to a hub or switch. The SAR disassembles incoming packets on buses 1377 in internet protocol format and disassembles incoming packets on bus 1379 in Ethernet protocol format or other format and reassembles standard OC3 ATM protocol cells with 5 byte headers for output on bus 1374 as an OC3 data stream. The SAR uses the destination address data in the incoming data to compose the VPI address bits in the standard 5 byte ATM cell header. A multiplexer/demultiplexer 1385 similar to the multiplexer/demultiplexer 1008 in FIG. 27, converts incoming standard ATM cells on bus 1374 to optimized 2 byte header ATM cells for the downstream direction and outputs these cells in TDMA stream on bus 1387 to the SCDMA ASIC 1012. The VPI bits of the standard header are used to look up the virtual link number in a mapping table in the multiplexer/demultiplexer at the head end. The virtual link address data is then placed in the 2-byte header of each ATM cell generated at the head end to make sure the ATM cell gets to the correct CPE modem. SCDMA encoding occurs in the head end modem with each ATM cell for transmission on a particular virtual link encoded with the one or more SCDMA spreading codes currently assigned to that virtual link. There is a mapping between each virtual link and the SCDMA codes currently assigned to that link which is updated frequently as the number of codes assigned to the virtual link changes because of changing bandwidth needs. Each SCDMA code that is assigned to a virtual link is mathematically orthogonal to the SCDMA codes used to encode the ATM cell data to be transmitted on other virtual links.

The optimized system uses a two level addressing scheme and a mapping between each logical channel and the assigned SCDMA codes currently assigned to that channel. The two byte header in the downstream optimized ATM cell identifies the single logical channel upon which the data is to be transmitted, and this single logical channel corresponds to a single one of the multiple CPEs. The Ethernet address of the particular process or peripheral at the CPE to which the payload data is to be directed once it arrives at the CPE is included as several bytes in the payload data. Although only one logical channel serves each CPE, that particular CPE may have bandwidth needs that require the use of more than one SCDMA spreading code to service. Accordingly, each logical channel is mapped to the current number of SCDMA codes assigned to that CPE by the multiplexer/demultiplexer 1385 so as to handle the CPEs bandwidth requirements. Thus, downstream data headed for a particular CPE may be placed by the multiplexer/demultiplexer 1385 into multiple timeslots in the TDMA stream on bus 1387 so as to be encoded by the corresponding SCDMA codes assigned to those timeslots and to the logical channel assigned to the destination CPE. The TDMA bus 1387 is equivalent to the TDMA bus 1010 in FIG. 27, and both these buses are multiconductor buses having some conductors dedicated solely for carrying data in the downstream direction and some conductors dedicated solely for carrying data in the upstream direction, and some conductors are for carrying control signals. The same is true for the CPE TDMA bus 1026 in each CPE.

After SCDMA encoding and QAM modulation, the resulting RF signal is output on line 1016 to an RF up/down converter 1018 for conversion to the proper downstream frequency band and output on HFC link 1000.

The RF signals transmitted by the head end are received at each CPE modem, of which modems 1380 and 1382 are typical. Each of these modems has the structure illustrated in the block diagram of FIG. 52 and operates in the manner described above with reference to FIG. 27 except that each modem is coupled to an Ethernet hub instead of directly to one or more peripherals. Each of the peripherals such as digital VCR 1386 is coupled to the Ethernet hub. The modem in each CPE includes a SAR which is structured to receive Ethernet packets from the peripherals, deconstruct them and construct standard 5 byte header ATM cells and output them in a Utopia format data stream on bus 1408. Specifically, modem 1380 is coupled by Ethernet link 1381 (either 10BaseT, 10Base2, etc.) to an Ethernet hub 1384. The hub is coupled by separate Ethernet links to three peripherals illustrated by digital VCR 1386, personal computer or workstation 1388 and video server 1390. All the circuitry inside dashed line 1392 is located at the premises of customer #1. Likewise, all the circuitry inside dashed line 1394 is located at customer premises #2. A similar Ethernet setup with different peripherals exists at customer premises #2 and is coupled by Ethernet link 1396 to modem 1382. The hub is coupled to a PC or Macintosh 1398, a Sun Workstation 1400 and a Videophone 1402.

The only difference between the way modems 1380 and 1382 operate versus the operation described for the customer premises modem illustrated in FIG. 27 is that in FIG. 51, the SARs inside the modems at the customer premises translate between Ethernet packets and ATM cells. In the upstream direction, the SARs at the CPEs disassemble incoming Ethernet packets from the Ethernet hubs and reassemble and output standard ATM cells for transmission in Utopia format to the formatters. The formatters such as formatter 1030 then strip off the standard 5 byte headers for upstream cells and place the payload data of the cells in the timeslots in the TDMA stream on bus 1026 which correspond to the logical channel assigned to the particular CPE of which the formatter is a part. In the downstream direction, the SARs receive optimized 2 byte header ATM cells on bus 1408 from the formatters, disassemble them and reassemble Ethernet packets and store them in memory 1404 via DMA transactions.

In contrast, in the embodiment of FIG. 27, the CPE SAR receives upstream bytes in streams individually from each peripheral and assembles these byte streams into standard 5 byte header ATM cells for transmission to the formatter, and vice versa for the downstream direction.

Figure 52:
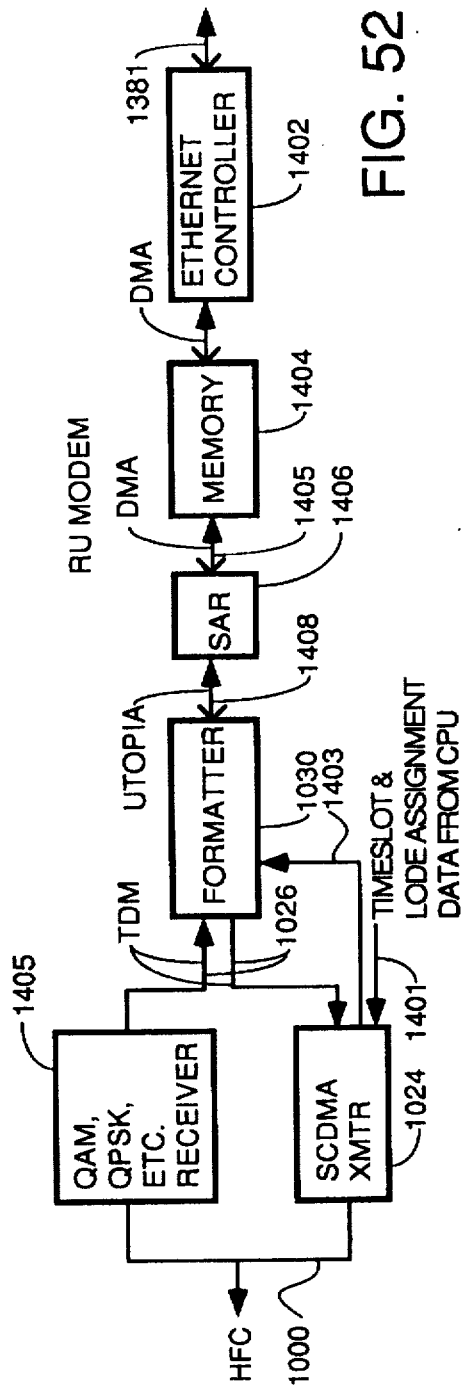
FIG. 52 is a block diagram of a CPE modem having a structure designed for use with a number of peripherals coupled to the CPE modem by an Ethernet LAN.

Referring to FIG. 52, there is shown a block diagram for the CPE modems 1380 and 1382 in FIG. 51. Each modem has an Ethernet controller 1402 which couples the modem to the Ethernet hub via an Ethernet link such as link 1381 in FIG. 51. The Ethernet receive upstream Ethernet packets and temporarily stores them by DMA transfer into memory 1404. SAR 1406 takes Ethernet packets out of memory 1404 by DMA transfer at whatever rate the current allocation of bandwidth to the CPE supports. Thus, memory 1404 serves as a buffer against different data rates on the Ethernet and SAR sides. The SAR then disassembles the Ethernet packets and uses the header and payload data information to reassemble standard 5-byte header upstream ATM cells which are output in Utopia format on bus 1408 to formatter 1030. The formatter operates on the standard ATM cells to strip off the 5-byte headers and place the payload data of each cell in the appropriate timeslot or timeslots on bus 1026 assigned to the logical channel corresponding to the CPE of which the formatter is a part. The Ethernet address of the source peripheral from which the data originated is encoded in payload 9-bit bytes and placed in the payload. A TDMA stream is output on bus 1026 to ASIC 1024 which operates as previously described to spread the energy of the data using SCDMA spreading codes implementing at least one logical channel per CPE. The formatter does the mapping between the number of SCDMA codes currently assigned to the CPE and the logical channel by virtue of placement of the payload data in the particular timeslots currently assigned to the CPE's logical channel. Note that the one logical channel per CPE may be implemented using more than one SCDMA code in a dynamic fashion such that the number of SCDMA codes used per logical channel is dynamically allocated depending upon the bandwidth needs of the CPE. The formatter receives update messages giving the changes in current timeslot and SCDMA code assignment and uses these messages to update a mapping table that maps the logical channel of the CPE of which the formatter is a part to the particular timeslots and SCDMA codes currently assigned to that logical channel. This table is consulted when placing payload data into the timeslots on the TDMA bus 1026.

The ASIC outputs an RF signal on line 1022 to the RF up/down converter circuit 1020 in FIG. 27 for translation to the proper frequency for the data direction. The upstream and downstream data are frequency division multiplexed.

One of the advantages of using standard ATM cells with 5 byte headers in an embodiment like that shown in FIG. 27 is that the full logical connection ability of the ATM protocol can be used. The 5 byte ATM header has 24 bits of addressing capability called the VPI/VCI bits. These 24 bits allow for up to approximately 16 million different logical connections at each CPE. The advantage of this is that multiple peripherals at each CPE may each have multiple processes running each of which has its own logical address. However, 16 million is more logical connections than each CPE needs. The 5 byte ATM header represents about 10% of the total number of bytes in an ATM cell. Many of the bits are present for purposes not really needed in the CATV SCDMA environment in which the invention operates. Accordingly, the 5 byte standard ATM cell headers represent wasted bandwidth. The presence of 16 million possible different logical connections also unnecessarily complicates the design of the formatters and multiplexer/demultiplexer circuits in the CPE and head end modems, respectively. Therefore, optimization of the system by better bandwidth utilization and less circuit complexity can be achieved by reducing or eliminating the size of the ATM cell headers.

However, ATM cells with 5 byte headers could also be used in the embodiment of FIG. 51 if the software and hardware of the formatters inside the CPE modems and the multiplexer/demultiplexer circuit inside the head end modem is configured properly to handle and generate these headers as well as generate the additional 2-byte virtual link header designated 1070 in FIG. 35. This provides a system where each CPE is coupled by an Ethernet LAN to as many peripherals as necessary and provides the full ATM functionality. In the preferred embodiment, the class of cable modems represented by FIG. 52 are designed to use optimized ATM cells that have only 2 byte headers in the downstream direction and no headers at all in the upstream direction. In these embodiments, the small 2 byte headers in the downstream ATM cells identify the logical channel on which each ATM cell is to be placed (to which CPE the ATM cell is directed). The Ethernet address identifying the particular peripheral coupled to the CPE to which the data is to be directed after arriving at the CPE is contained within the payload data.

The two byte headers used in the downstream ATM cells are the 16 least significant bits of the VPI/VCI bits in a standard 5 byte ATM cell header. These 16 bits***

Figure 53:
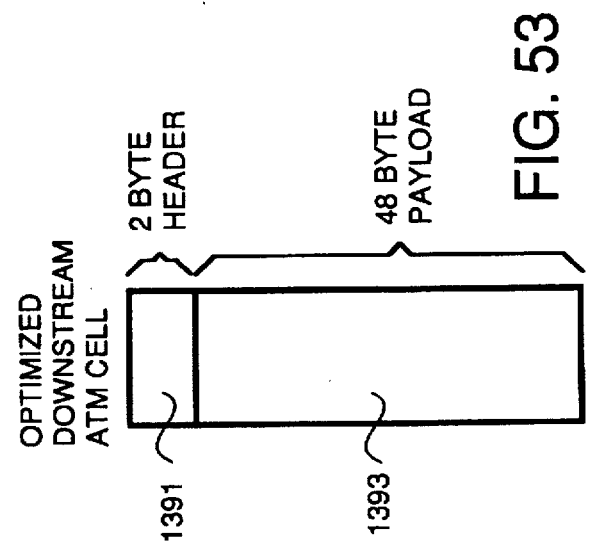
FIG. 53 is a diagram of an optimized downstream ATM cell having a 2-byte header.

FIG. 53 illustrates the optimized downstream ATM cell with 2 byte header 1400 identifying the virtual link, i.e., the single logical channel serving one CPE on which the 48 bytes of payload data 1402 is to be transmitted.

Figure 54:
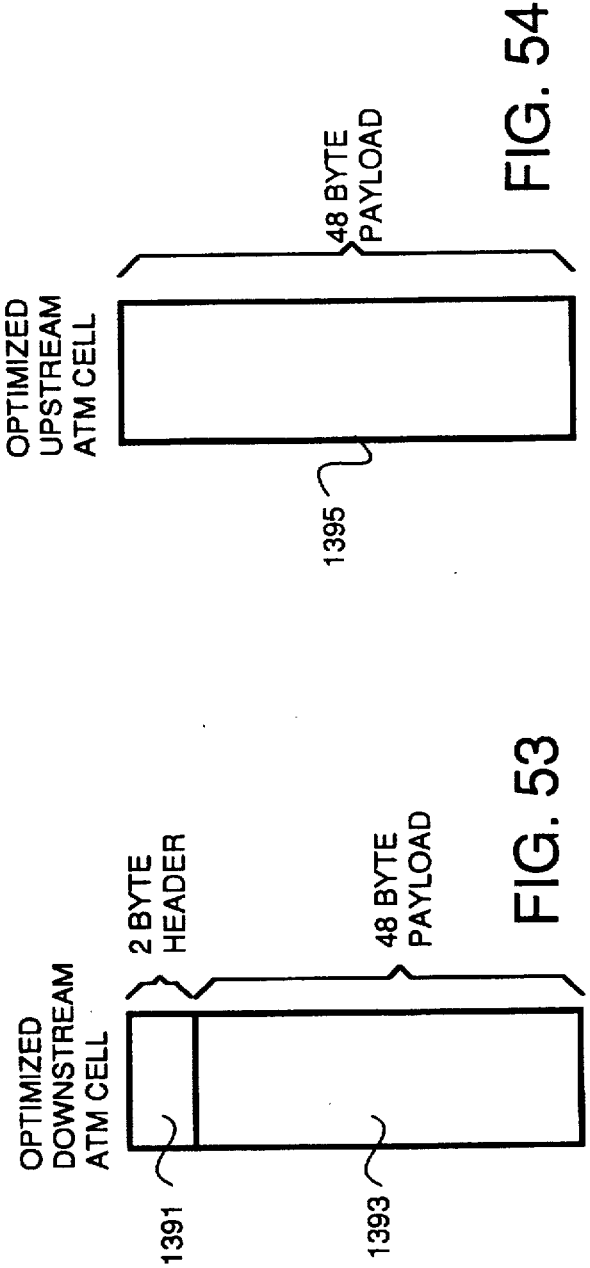
FIG. 54 is a diagram of an optimized upstream ATM cell having a 0 byte header.

FIG. 54 illustrates the optimized upstream ATM cell as including no header and only a 48 byte payload 1404. The "bytes" in the payloads of each of the upstream and downstream ATM cells are 9-bit bytes. The 9th bits are encoded with special codes which give the system the ability to distinguish between idle cells which are transmitted to maintain synchronization when there is no real data to transmit, first optimized ATM cell in a packet, a normal optimized ATM cell somewhere in the middle of the packet and the last cell in a packet.

Although the teachings of the invention have been presented herein in terms of a few preferred and alternative embodiments, those skilled in the art will appreciate numerous modifications, improvement and substitutions that will serve the same functions without departing from the true spirit and scope of the appended claims. All such modifications, improvement and substitutions are intended to be included within the scope of the claims appended hereto.

What is claimed is:

1. A process for transmitting ATM protocol format cells over a CATV network providing point-to-multipoint coupling between a head end modem and a plurality of customer premises equipment (hereafter CPE) modems for communicating with one or more peripheral devices coupled to each CPE modem, comprising:

receiving data bytes from one or more data sources directed to a plurality of destination software processes in execution on a plurality of computing devices coupled to a plurality of destination CPE modems;

converting said data so received into a plurality of ATM cells, each having payload data and a standard ATM cell header which includes a destination address identifying the destination software process to which the payload data is to be delivered, and each having a virtual link header which includes virtual link address data identifying the particular destination CPE modem to which said ATM cell is to be delivered;

encoding the data in said ATM cells so that said destination CPE modem can locate the beginning and end of each ATM cell directed to it by examining the data of the ATM cell itself;

encoding the data of each ATM cell with one or more synchronous code division multiplexing spreading code(s)(hereafter SCDMA code(s)) which are assigned to only the virtual link assigned to the destination CPE modem of the particular ATM cell being so encoded, each of the SCDMA codes assigned to a particular virtual link being mathematically orthogonal to all the other SCDMA codes, all said SCDMA codes defining an SCDMA code matrix, so as to generate SCDMA encoded data for every ATM cell;

controlling modulation of one or more radio frequency carriers with said SCDMA encoded data to generate one or more RF signals carrying the data of all said ATM cells and transmitting said RF signals to all destination CPE modems;

receiving and demodulating said RF signals in each destination CPE modem to recover said SCDMA encoded data;

decoding said SCDMA encoded data using a decoding matrix which is the transpose of said SCDMA code matrix to recover all said ATM cell data in each destination CPE modem;

decoding said recovered ATM cell data in each destination CPE modem to locate the ATM cell boundaries in each said destination CPE modem;

in each destination CPE modem, comparing the virtual link address data in the virtual link header of each said ATM cell to the virtual link number assigned to that particular destination CPE modem, and, in each destination CPE modem, discarding any ATM cell not addressed to that particular CPE modem;

in each destination CPE modem, examining the destination address data in each ATM cell not discarded which identifies the particular destination software process to which the ATM cell is directed, disassembling the ATM cell and transmitting the payload data of the ATM cell to the destination software process to which the payload data is addressed.

2. A process for transmitting ATM protocol format cells over a CATV network providing point-to-multipoint coupling between a head end modem and a plurality of customer premises equipment (hereafter CPE) modems for communication between one or more peripheral devices coupled to each CPE modem and said head end modem, comprising:

receiving at each of a plurality of CPE modems data bytes from one or more data sources coupled to said CPE modems, each data byte directed to one of a plurality of destination software processes in execution on a plurality of computing devices coupled to said head end modem;

at each said CPE modem, converting said data so received into a plurality of ATM cells, each having payload data and a standard ATM cell header which includes a destination address identifying the destination software process to which the payload data is to be delivered;

at each CPE modem, encoding the data in each of said ATM cells so that said head end modem can locate the beginning and end of each ATM cell by examining the data of the ATM cell itself;

at each CPE modem, encoding the data of each ATM cell generated at said CPE modem with one or more synchronous code division multiplexing spreading code(s) (hereafter SCDMA code(s)) which are assigned to only the virtual link assigned to that CPE modem, each of the SCDMA codes assigned to a particular virtual link being mathematically orthogonal to all the other SCDMA codes used by other CPE modems to encode the data of ATM cells generated at said other CPE modems, all said SCDMA codes used at all said OPE modems defining an SCDMA code matrix, said encoding at each CPE modem generating SCDMA encoded data at each CPE modem for every ATM cell generated at said CPE modem;

at each CPE modem, controlling modulation of one or more radio frequency carriers with said SCDMA encoded data generated at that CPE modem to generate one or more RF signals carrying the data of all said ATM cells generated at said CPE modem, and combining all said RF signals generated at all CPE modems for transmission on said CATV network to said head end modem;

receiving and demodulating said combined RF signals at said head end modem to recover said SCDMA encoded data generated at all said CPE modems;

decoding said SCDMA encoded data at said head end modem using a decoding matrix which is the transpose of said SCDMA code matrix so as to recover all said ATM cell data;

at said head end modem, decoding said recovered ATM cell data to locate the ATM cell boundaries of each ATM cell;

at said head end modem, examining the destination address data in each ATM cell which identifies the particular destination software process coupled to said head end modem to which the ATM cell is directed, and disassembling each ATM cell and transmitting the payload data of the ATM cell to the particular destination software process to which the payload data is addressed.

3. A process for transmitting ATM protocol format cells over a CATV network providing point-to-multipoint coupling between a head end modem and a plurality of customer premises equipment (hereafter CPE) modems for communicating with one or more peripheral devices coupled to each CPE modem, comprising:

receiving a first plurality of data bytes from a first data source coupled to said head end modem in the form of 8-bit bytes which are directed to a particular peripheral device coupled to a first CPE modem or are directed to a particular software process in execution on a computer coupled to said first CPE modem (hereafter referred to as the first destination device or process), said data containing destination address information identifying the address of the first destination device or process;

receiving a second plurality of data bytes from a second data source, which may or may not be the same as said first data source, and which is coupled to said head end modem in the form of 8-bit bytes which are directed to a particular peripheral device coupled to a second CPE modem, which may or may not be the same CPE modem as said first CPE modem, or are directed to a particular software process in execution on a computer coupled to said second CPE modem (hereafter referred to as the second destination device or process), said data containing destination address information identifying the address of the second destination device or process;

composing a first downstream ATM format cell from said first plurality of data bytes received from said first data source, said first downstream ATM cell having a predetermined number of 8-bit payload data bytes and a predetermined number of 8-bit header bytes which includes destination address information composed from said destination address information in said first plurality of data bytes received from said first data source and identifying the address of said first destination device or process;

composing a second downstream ATM format cell from said second plurality of data bytes received from said second data source, said second downstream ATM cell having a predetermined number of 8-bit payload data bytes and a predetermined number of 8-bit header bytes which includes destination address information composed from said destination address information in said second plurality of data bytes received from said second data source and identifying the address of second destination device or process;

appending to said first downstream ATM cell a virtual link header containing one or more 8-bit bytes of virtual link address data identifying one or more logical channels comprising a virtual link between said head end modem and first CPE modem to which the data of said first downstream ATM cell is directed (hereafter referred to as the first destination CPE);

appending to said second downstream ATM cell a virtual link header containing one or more 8-bit bytes of virtual link address data identifying one or more logical channels comprising a virtual link between said head end modem and second CPE modem to which the data of said second downstream ATM cell is directed (hereafter referred to as the second destination CPE);

adding a 9th bit to each 8-bit byte in each of said first and second downstream ATM cells, and encoding a predetermined number of said 9th bits starting with the 9th bit of the first byte of said virtual link header byte or bytes of each of said first and second downstream ATM cells with a predetermined, unique start code to indicate where each of said first and second downstream ATM cells starts such that ATM cell boundaries can be determined at said first and second destination CPE modems;

assigning one or more numbered timeslots defining a first set of timeslots occurring during a first frame of timeslots on a first time division multiple access bus (hereafter first TDMA bus), said first TDMA bus for transmitting a plurality of frames of data within said head end modem, each frame comprised of a plurality of numbered timeslots each of which may contain data and including timeslots having numbers which correspond to said first and second set of timeslots, said first set of timeslots assigned to the one or more virtual links assigned to said first destination CPE modem;

assigning one or more timeslots defining a second set of numbered timeslots of said first frame on said first TDMA bus, said second set of numbered timeslots assigned to the one or more virtual links assigned to said second destination CPE modem and which may or may not be interleaved with the numbered timeslots comprising said first set of timeslots;

placing one or more of said 9-bit bytes defining said first downstream ATM cell in said one or more numbered timeslots of said first set of timeslots during said first frame, and continuing during second and subsequent frames to put sequential 9-bit bytes from said first downstream ATM cell in sets of numbered timeslots which correspond in timeslot numbers to said first set of timeslots until all 9-bit bytes of said first downstream ATM cell have been transmitted on said time division multiple access bus;

placing one or more of said 9-bit bytes defining said second downstream ATM cell in said one or more numbered timeslots of said second set of timeslots during said first frame, and continuing during second and subsequent frames to put sequential 9-bit bytes from said second downstream ATM cell in sets of numbered timeslots which correspond in timeslot numbers to said second set of timeslots until all 9-bit bytes of said second downstream ATM cell have been transmitted on said time division multiple access bus;

receiving the data in said first set of timeslots and encoding said 9-bit bytes in said first set of timeslots with one or more synchronous code division multiplexing spreading codes (hereafter SCDMA codes) defining a first set SCDMA codes which are assigned to the logical channel corresponding to said first destination OPE to generate first SCDMA encoded data;

receiving the data in said second set of timeslots and encoding said 9-bit bytes in said second set of timeslots with one or more synchronous code division multiplexing spreading codes defining a second set SCDMA codes which orthogonal to said first set of SCDMA codes and which are assigned to the logical channel corresponding to said second destination CPE to generate second SCDMA encoded data where said first and second SCDMA encoded data may or may not be interleaved, and wherein said first and second sets of SCDMA codes define at least part of a first code matrix;

using said first and second SCDMA encoded data to modulate one or more radio frequency carriers having center frequencies in a band of frequencies assigned to downstream traffic from the head end to the CPEs and combining the modulated radio frequency carrier signals so as to generate one or more downstream radio frequency signals;

transmitting said one or more downstream radio frequency signals to all said CPE modems over said CATV system;

receiving and demodulating said one or more downstream radio frequency signals at each CPE modem to recover said first and second SCDMA encoded data;

decoding said first and second SCDMA encoded data at said first destination CPE modem using a second code matrix, said second code matrix being the transpose of said first code matrix so as to recover the data which was transmitted on said first TDMA bus during said first and second sets of timeslots and continuing this process during second and subsequent frames until all 9-bit bytes of said first and second ATM cells are recovered;

decoding said first and second SCDMA encoded data at said second destination CPE modem using a second code matrix, said second code matrix being the transpose of said first code matrix so as to recover the data which was transmitted on said first TDMA bus during said first and second sets of timeslots and continuing this process during second and subsequent frames until all 9-bit bytes of said first and second ATM cells are recovered;

transmitting said 9-bit bytes of said first and second ATM cells in individual timeslots on a second TDMA bus located in said first destination CPE modem to a cell timing recovery circuit in said first destination CPE modem;

transmitting said 9-bit bytes of said first and second ATM cells in individual timeslots on a third TDMA bus located in said second destination CPE modem to a cell timing recovery circuit in said second destination CPE modem;

decoding said 9th bits of the 9-bit bytes of said first and second ATM cells in said first destination CPE modem to recover the cell boundaries of said first and second ATM cells;

decoding said 9th bits of the 9-bit bytes of said first and second ATM cells in said second destination CPE modem to recover the cell boundaries of said first and second ATM cells;

comparing in said first destination CPE modem the virtual link address data in said virtual link headers of said first and second ATM cells to the virtual link number assigned to said first destination CPE, and discarding said second ATM cell because of a mismatch of its virtual link address data to the virtual link number assigned to said first destination CPE and stripping off said virtual link header of said first ATM cell;

comparing in said second destination CPE modem the virtual link address data in said virtual link headers of said first and second ATM cells to the virtual link number assigned to said second destination CPE, and discarding said first ATM cell because of a mismatch of its virtual link address data to the virtual link number assigned to said first destination CPE and stripping off said virtual link header of said second ATM cell;

transmitting said first ATM cell minus its virtual link header but still having a standard ATM cell header in Utopia format to a segmentation and reassembly circuit in said first destination CPE;

transmitting said second ATM cell minus its virtual link header but still having a standard ATM cell header in Utopia format to a segmentation and reassembly circuit in said second destination CPE;

in said first destination CPE modem, comparing said destination address data in said standard ATM cell header of said first ATM cell to the destination addresses of the peripheral devices coupled to said first destination CPE modem and any software processes in execution on computers coupled to said first destination CPE modem so as to locate the destination device or process of said first ATM cell;

disassembling said first ATM cell and transmitting the payload data thereof to said destination device or process of said first ATM cell coupled to said first destination CPE modem;

in said second destination CPE modem, comparing said destination address data in said standard ATM cell header of said second ATM cell to the destination addresses of the peripheral devices coupled to said second destination CPE modem and any software processes in execution on computers coupled to said second destination CPE modem so as to locate the destination device or process of said second ATM cell;

disassembling said second ATM cell and transmitting the payload data thereof to said destination device or process of said second ATM cell coupled to said second destination CPE modem.

* * * * *